US012387246B2

(12) United States Patent
Wilson et al.

(10) Patent No.: US 12,387,246 B2
(45) Date of Patent: Aug. 12, 2025

(54) SYSTEMS AND METHODS FOR PROVIDING RESULTS BASED ON NODAL INTERRELATIONSHIPS AND UPDATING NODAL INTERRELATIONSHIP STRENGTHS BASED ON FEEDBACK REGARDING THE RESULTS

(71) Applicant: NARA LOGICS, INC., Boston, MA (US)

(72) Inventors: Nathan R. Wilson, Cambridge, MA (US); Emily A. Hueske, Cambridge, MA (US); Thomas C. Copeman, Boston, MA (US)

(73) Assignee: Nara Logics, Inc., Boston, MA (US)

( * ) Notice: Subject to any disclaimer, the term of this patent is extended or adjusted under 35 U.S.C. 154(b) by 712 days.

(21) Appl. No.: 17/396,396

(22) Filed: Aug. 6, 2021

(65) Prior Publication Data

US 2022/0207575 A1 Jun. 30, 2022

Related U.S. Application Data

(63) Continuation of application No. 14/687,720, filed on Apr. 15, 2015, now Pat. No. 11,151,617, which is a
(Continued)

(51) Int. Cl.
*G06Q 30/0282* (2023.01)
*G06N 3/02* (2006.01)
(Continued)

(52) U.S. Cl.
CPC .......... *G06Q 30/0282* (2013.01); *G06N 3/02* (2013.01); *G06Q 20/203* (2013.01); *G06Q 30/02* (2013.01);
(Continued)

(58) Field of Classification Search
CPC .. G06Q 30/0282; G06Q 20/203; G06Q 30/02; G06Q 30/0269; G06N 3/02;
(Continued)

(56) References Cited

U.S. PATENT DOCUMENTS 5,819,245 A 10/1998 Peterson et al.
6,012,051 A 1/2000 Sammon, Jr. et al.
(Continued)

FOREIGN PATENT DOCUMENTS

CN 101971175 A 2/2011
EP 2207348 1/2009
(Continued)

OTHER PUBLICATIONS

Xiang et al. ("Modeling Relationship Strength in Online Social Networks", 2010 pp. 981-990) (Year: 2010).*
(Continued)

*Primary Examiner* — Michael J Huntley
*Assistant Examiner* — Imad Kassim
(74) *Attorney, Agent, or Firm* — Gardella Alciati

(57) ABSTRACT

A neural network connects entities, individuals, and attributes with a first subset of nodes each corresponding to a respective entity, a second subset of nodes each corresponding to a respective individual, and a third subset of nodes each corresponding to a respective attribute. The connections of the neural network each reflect a strength of an interrelationship between at least two nodes. Responsive to a user requesting results corresponding to one or more entities, the neural network is used to identify one or more results based on nodal connections. The user may submit, through a user interface, at least one feedback indication, each characterizing approval or disapproval of a respective result. The neural network may be updated, using the feedback indication(s), by adjusting the strength of interre-
(Continued)

lationship reflected by strengths of one or more of the connections.

20 Claims, 39 Drawing Sheets

Related U.S. Application Data continuation-in-part of application No. 14/537,319, filed on Nov. 10, 2014, now Pat. No. 9,208,443, which is a continuation of application No. 14/267,464, filed on May 1, 2014, now Pat. No. 8,909,583, which is a continuation of application No. 13/919,301, filed on Jun. 17, 2013, now Pat. No. 8,756,187, said application No. 14/687,720 is a continuation of application No. 13/842,165, filed on Mar. 15, 2013, now abandoned, said application No. 13/919,301 is a continuation of application No. 13/416,945, filed on Mar. 9, 2012, now Pat. No. 8,515,893, which is a continuation of application No. 13/247,289, filed on Sep. 28, 2011, now Pat. No. 8,170,971.

(51) Int. Cl.
| | |
|---|---|
| *G06Q 20/20* | (2012.01) |
| *G06Q 30/02* | (2023.01) |
| *G06Q 30/0251* | (2023.01) |
| *H04L 67/52* | (2022.01) |
| *H04W 4/021* | (2018.01) |
| *H04W 4/21* | (2018.01) |

(52) U.S. Cl.
CPC ......... *G06Q 30/0269* (2013.01); *H04L 67/52* (2022.05); *H04W 4/021* (2013.01); *H04W 4/21* (2018.02)

(58) Field of Classification Search
CPC ........... G06N 3/08; H04L 67/52; H04L 41/12; H04L 67/306; H04L 67/53; H04L 67/568; H04L 67/02; H04W 4/021; H04W 4/21
See application file for complete search history.

(56) References Cited

U.S. PATENT DOCUMENTS

| | | | |
|---|---|---|---|
| 6,041,311 A | 3/2000 | Chislenko et al. | |
| 6,112,186 A | 8/2000 | Bergh et al. | |
| 6,247,001 B1 | 6/2001 | Tresp et al. | |
| 6,266,668 B1 | 7/2001 | Vanderveldt et al. | |
| 6,404,424 B1 | 6/2002 | Davis | |
| 6,408,288 B1 | 6/2002 | Ariyoshi | |
| 6,412,012 B1 | 6/2002 | Bieganski et al. | |
| 6,460,060 B1 | 10/2002 | Maddalozzo, Jr. et al. | |
| 6,487,541 B1 | 11/2002 | Aggarwal et al. | |
| 6,556,211 B2 | 4/2003 | Davis | |
| 6,757,691 B1 | 6/2004 | Welsh et al. | |
| 6,775,664 B2 | 8/2004 | Lang et al. | |
| 6,782,375 B2 | 8/2004 | Abdel-Moneim et al. | |
| 6,865,565 B2 | 3/2005 | Rainsberger et al. | |
| 6,988,109 B2 | 1/2006 | Stanley et al. | |
| 7,069,256 B1 | 6/2006 | Campos | |
| 7,080,052 B2 | 7/2006 | Busche | |
| 7,102,067 B2 | 9/2006 | Gang et al. | |
| 7,113,917 B2 | 9/2006 | Jacobi et al. | |
| 7,155,401 B1 | 12/2006 | Cragun et al. | |
| 7,328,216 B2 | 2/2008 | Hofmann et al. | |
| 7,366,707 B2 | 4/2008 | De Lacharriere et al. | |
| 7,389,201 B2 | 6/2008 | Chickering et al. | |
| 7,392,231 B2 | 6/2008 | Basak et al. | |
| 7,412,042 B2 | 8/2008 | Henry | |
| 7,437,368 B1 | 10/2008 | Kolluri et al. | |
| 7,505,962 B2 | 3/2009 | Shariff et al. | |
| 7,542,951 B1 | 6/2009 | Chakrabarti et al. | |
| 7,584,159 B1 | 9/2009 | Chakrabarti et al. | |
| 7,624,095 B2 | 11/2009 | Majumder | |
| 7,657,493 B2 | 2/2010 | Meijer et al. | |
| 7,657,523 B2 | 2/2010 | Ebanks | |
| 7,660,459 B2 | 2/2010 | Busche | |
| 7,689,682 B1 * | 3/2010 | Eldering | H04L 67/104 715/753 |
| 7,743,067 B2 | 6/2010 | Ducheneaut et al. | |
| 7,756,753 B1 | 7/2010 | McFarland | |
| 7,734,609 B2 | 8/2010 | Manfredi et al. | |
| 7,792,761 B2 | 9/2010 | Murakami et al. | |
| 7,813,965 B1 | 10/2010 | Robinson et al. | |
| 7,853,622 B1 * | 12/2010 | Baluja | G06Q 30/02 707/999.1 |
| 7,885,986 B2 | 2/2011 | Anderson et al. | |
| 7,890,871 B2 | 2/2011 | Etkin | |
| 7,904,530 B2 | 3/2011 | Partridge et al. | |
| 7,908,183 B2 | 3/2011 | Jacobi et al. | |
| 7,953,673 B2 | 5/2011 | Augusto et al. | |
| 7,958,066 B2 | 6/2011 | Pinckney et al. | |
| 7,958,079 B2 | 6/2011 | Fogel et al. | |
| 7,966,282 B2 | 6/2011 | Pinckney et al. | |
| 7,991,841 B2 | 8/2011 | Anderson et al. | |
| 7,996,255 B1 | 8/2011 | Shenoy et al. | |
| 8,010,470 B2 | 8/2011 | Jackson | |
| 8,019,707 B2 | 9/2011 | Shani et al. | |
| 8,019,743 B2 | 9/2011 | Ebanks | |
| 8,032,425 B2 | 10/2011 | Yi | |
| 8,032,480 B2 | 10/2011 | Pinckney et al. | |
| 8,032,481 B2 | 10/2011 | Pinckney et al. | |
| 8,090,625 B2 | 1/2012 | Yi | |
| 8,091,032 B2 | 1/2012 | Fischer | |
| 8,095,153 B2 | 1/2012 | Jenkins et al. | |
| 8,095,432 B1 | 1/2012 | Berman et al. | |
| 8,108,414 B2 | 1/2012 | Stackpole | |
| 8,108,501 B2 | 1/2012 | Birnie et al. | |
| 8,145,661 B1 | 3/2012 | Billman et al. | |
| 8,166,013 B2 | 4/2012 | Bandaru et al. | |
| 8,170,971 B1 | 5/2012 | Wilson et al. | |
| 8,185,487 B2 | 5/2012 | Tuzhilin et al. | |
| 8,234,150 B1 | 7/2012 | Pickton et al. | |
| 8,234,151 B1 | 7/2012 | Pickton et al. | |
| 8,234,688 B2 | 7/2012 | Grandison et al. | |
| 8,244,721 B2 | 8/2012 | Morris et al. | |
| 8,249,941 B2 | 8/2012 | Saul et al. | |
| 8,250,096 B2 | 8/2012 | Su et al. | |
| 8,271,352 B2 | 9/2012 | Lifson | |
| 8,290,964 B1 | 10/2012 | Guha | |
| 8,315,953 B1 | 11/2012 | Hansen et al. | |
| 8,316,000 B2 | 11/2012 | Srivastava et al. | |
| 8,333,316 B2 | 12/2012 | Heath et al. | |
| 8,341,111 B2 | 12/2012 | Patil et al. | |
| 8,364,528 B2 | 1/2013 | Selinger et al. | |
| 8,365,167 B2 | 1/2013 | Beaty et al. | |
| 8,380,639 B2 | 2/2013 | Aleong et al. | |
| 8,386,406 B2 | 2/2013 | Bolivar et al. | |
| 8,417,698 B2 | 4/2013 | Yoo | |
| 8,423,323 B2 | 4/2013 | Bonabeau | |
| 8,429,106 B2 | 4/2013 | Downs et al. | |
| 8,429,160 B2 | 4/2013 | Osann | |
| 8,442,891 B2 | 5/2013 | Mendelsohn | |
| 8,447,760 B1 | 5/2013 | Tong et al. | |
| 8,452,865 B1 | 5/2013 | Heller et al. | |
| 8,468,155 B2 | 6/2013 | Sureka | |
| 8,484,142 B2 | 7/2013 | Pinckney et al. | |
| 8,484,226 B2 | 7/2013 | Elliott-Mccrea et al. | |
| 8,489,515 B2 | 7/2013 | Mathur | |
| 8,489,527 B2 | 7/2013 | Van Coppenolle et al. | |
| 8,494,897 B1 | 7/2013 | Dawson | |
| 8,494,946 B2 | 7/2013 | Lortscher, Jr. | |
| 8,515,893 B2 | 8/2013 | Wilson et al. | |
| 8,539,359 B2 | 9/2013 | Rapaport et al. | |
| RE44,559 E | 10/2013 | Flinn et al. | |
| 8,572,129 B1 | 10/2013 | Lee et al. | |
| 8,583,524 B2 | 11/2013 | Selinger et al. | |
| 8,612,134 B2 | 12/2013 | Zheng et al. | |
| 8,620,822 B2 | 12/2013 | Wiseman et al. | |
| 8,621,563 B2 | 12/2013 | Sathish | |

(56) References Cited

U.S. PATENT DOCUMENTS

| | | |
|---|---|---|
| 8,644,688 B2 | 2/2014 | Fishman et al. |
| 8,661,050 B2 | 2/2014 | Varshavsky et al. |
| 8,666,844 B2 | 3/2014 | Shaya et al. |
| 8,732,101 B1 | 5/2014 | Wilson et al. |
| 8,756,187 B2 | 6/2014 | Wilson et al. |
| 8,909,583 B2 | 12/2014 | Wilson et al. |
| 8,972,314 B2 | 3/2015 | Pinckney et al. |
| 8,972,394 B1 | 3/2015 | Tong et al. |
| 8,977,612 B1 | 3/2015 | Tong et al. |
| 9,037,531 B2 | 5/2015 | Pinckney et al. |
| 9,159,034 B2 | 10/2015 | Pinckney et al. |
| 9,183,504 B2 | 11/2015 | Moore et al. |
| 9,208,443 B2 | 12/2015 | Wilson et al. |
| 11,151,617 B2 | 10/2021 | Wilson et al. |
| 2002/0055890 A1 | 5/2002 | Foley |
| 2002/0116458 A1 | 8/2002 | Bricklin et al. |
| 2003/0025694 A1 | 2/2003 | Davis |
| 2003/0061607 A1 | 3/2003 | Hunter et al. |
| 2004/0044677 A1 | 3/2004 | Huper-Graff et al. |
| 2004/0172267 A1 | 9/2004 | Patel et al. |
| 2005/0120052 A1 | 6/2005 | Miller et al. |
| 2005/0243784 A1 | 11/2005 | Fitzgerald et al. |
| 2006/0106655 A1 | 5/2006 | Lettovsky et al. |
| 2006/0229932 A1 | 10/2006 | Zollo et al. |
| 2006/0271568 A1* | 11/2006 | Balkir .............. G06Q 10/10 |
| 2007/0050235 A1 | 3/2007 | Ouimet |
| 2007/0060114 A1 | 3/2007 | Ramer et al. |
| 2007/0097959 A1* | 5/2007 | Taylor .............. H04L 67/1061 |
| | | 370/352 |
| 2007/0244747 A1 | 10/2007 | Nikovski |
| 2008/0010258 A1 | 1/2008 | Sureka |
| 2008/0045236 A1 | 2/2008 | Nahon et al. |
| 2008/0059284 A1 | 3/2008 | Solotorevsky et al. |
| 2008/0059455 A1 | 3/2008 | Canoy et al. |
| 2008/0097821 A1 | 4/2008 | Chickering et al. |
| 2008/0183678 A1 | 7/2008 | Weston et al. |
| 2008/0189330 A1 | 8/2008 | Hoos et al. |
| 2008/0214204 A1 | 9/2008 | Ramer et al. |
| 2008/0214210 A1 | 9/2008 | Rasanen et al. |
| 2008/0215610 A1 | 9/2008 | De Lacharriere et al. |
| 2008/0222064 A1 | 9/2008 | Larimer |
| 2008/0319935 A1 | 12/2008 | Chandak |
| 2009/0076997 A1 | 3/2009 | Ducheneaut et al. |
| 2009/0106040 A1 | 4/2009 | Jones |
| 2009/0112989 A1* | 4/2009 | Anderson .............. G06Q 30/02 |
| | | 709/204 |
| 2009/0119258 A1 | 5/2009 | Petty |
| 2009/0119268 A1 | 5/2009 | Bandaru et al. |
| 2009/0210246 A1 | 8/2009 | Patel et al. |
| 2009/0210475 A1 | 8/2009 | Gadanho et al. |
| 2009/0216563 A1 | 8/2009 | Sandoval et al. |
| 2009/0216626 A1 | 8/2009 | Lund |
| 2009/0222322 A1 | 9/2009 | Anderson et al. |
| 2009/0234876 A1 | 9/2009 | Schigel et al. |
| 2009/0240676 A1 | 9/2009 | Gruen et al. |
| 2009/0287687 A1 | 11/2009 | Martire et al. |
| 2009/0300008 A1 | 12/2009 | Hangartner et al. |
| 2009/0307238 A1 | 12/2009 | Sanguinetti et al. |
| 2009/0319338 A1 | 12/2009 | Parks et al. |
| 2009/0327181 A1 | 12/2009 | Lee et al. |
| 2010/0030569 A1 | 2/2010 | Okano et al. |
| 2010/0030578 A1 | 2/2010 | Siddique et al. |
| 2010/0058224 A1 | 3/2010 | Chai et al. |
| 2010/0076951 A1 | 3/2010 | Fyle et al. |
| 2010/0076968 A1 | 3/2010 | Boyns et al. |
| 2010/0082516 A1 | 4/2010 | Basu et al. |
| 2010/0088649 A1 | 4/2010 | Kemp |
| 2010/0145770 A1 | 6/2010 | Hanson et al. |
| 2010/0145771 A1 | 6/2010 | Figler et al. |
| 2010/0169160 A1 | 7/2010 | Wu et al. |
| 2010/0210364 A1 | 8/2010 | York et al. |
| 2010/0217730 A1 | 8/2010 | Zhao et al. |
| 2010/0223093 A1 | 9/2010 | Hubbard |
| 2010/0250337 A1 | 9/2010 | Kassaei |
| 2010/0262556 A1 | 10/2010 | Shaya et al. |
| 2010/0262658 A1 | 10/2010 | Mesnage |
| 2010/0268574 A1 | 10/2010 | Butcher et al. |
| 2010/0268661 A1 | 10/2010 | Levy et al. |
| 2010/0287282 A1 | 11/2010 | MacLaughlin |
| 2010/0293026 A1 | 11/2010 | Vojnovic et al. |
| 2010/0312644 A1 | 12/2010 | Borgs et al. |
| 2010/0312724 A1 | 12/2010 | Pinckney et al. |
| 2010/0325205 A1 | 12/2010 | Murphy et al. |
| 2011/0016001 A1 | 1/2011 | Schieffelin |
| 2011/0071969 A1 | 3/2011 | Doctor et al. |
| 2011/0087661 A1 | 4/2011 | Quick et al. |
| 2011/0099122 A1 | 4/2011 | Bright et al. |
| 2011/0112976 A1 | 5/2011 | Ryan et al. |
| 2011/0153528 A1 | 6/2011 | Bailey et al. |
| 2011/0178839 A1 | 7/2011 | Adra |
| 2011/0201317 A1 | 8/2011 | Karandikar et al. |
| 2011/0207440 A1 | 8/2011 | Ruuspakka et al. |
| 2011/0208822 A1 | 8/2011 | Rathod |
| 2011/0213661 A1 | 9/2011 | Milana et al. |
| 2011/0238608 A1 | 9/2011 | Sathish |
| 2011/0270774 A1 | 11/2011 | Varshavsky et al. |
| 2011/0302117 A1 | 12/2011 | Pinckney et al. |
| 2011/0307327 A1 | 12/2011 | Bixby et al. |
| 2011/0307478 A1 | 12/2011 | Pinckney et al. |
| 2012/0005016 A1 | 1/2012 | Graff |
| 2012/0005201 A1 | 1/2012 | Ebanks |
| 2012/0030198 A1 | 2/2012 | Beck et al. |
| 2012/0066072 A1 | 3/2012 | Kanigsberg et al. |
| 2012/0089328 A1 | 4/2012 | Ellanti et al. |
| 2012/0089623 A1 | 4/2012 | Sobotka et al. |
| 2012/0095862 A1 | 4/2012 | Schiff et al. |
| 2012/0095863 A1 | 4/2012 | Schiff et al. |
| 2012/0109749 A1 | 5/2012 | Subramanian et al. |
| 2012/0130976 A1 | 5/2012 | Cone et al. |
| 2012/0136852 A1 | 5/2012 | Geller |
| 2012/0158720 A1 | 6/2012 | Luan et al. |
| 2012/0166232 A1 | 6/2012 | Neubardt |
| 2012/0166432 A1 | 6/2012 | Tseng |
| 2012/0166960 A1 | 6/2012 | Salles |
| 2012/0173324 A1 | 7/2012 | Vallery et al. |
| 2012/0185262 A1 | 7/2012 | Dalesandro et al. |
| 2012/0185481 A1 | 7/2012 | Bjork et al. |
| 2012/0190386 A1 | 7/2012 | Anderson |
| 2012/0226701 A1* | 9/2012 | Singh .............. G06Q 50/01 |
| | | 709/204 |
| 2012/0303415 A1 | 11/2012 | Edelson |
| 2012/0303569 A1 | 11/2012 | Tuzhilin et al. |
| 2012/0303676 A1 | 11/2012 | Tuzhilin et al. |
| 2012/0323725 A1 | 12/2012 | Johnston et al. |
| 2013/0013595 A1 | 1/2013 | Tseng et al. |
| 2013/0024449 A1 | 1/2013 | Chatterji et al. |
| 2013/0024456 A1 | 1/2013 | Goodson et al. |
| 2013/0024464 A1 | 1/2013 | Berner et al. |
| 2013/0024465 A1 | 1/2013 | Schiff et al. |
| 2013/0024471 A1 | 1/2013 | Mitrovic |
| 2013/0041896 A1 | 2/2013 | Ghani et al. |
| 2013/0054407 A1 | 2/2013 | Sabur |
| 2013/0054662 A1 | 2/2013 | Coimbra |
| 2013/0054698 A1 | 2/2013 | Lee et al. |
| 2013/0060744 A1 | 3/2013 | Roychoudhuri et al. |
| 2013/0066821 A1 | 3/2013 | Moore et al. |
| 2013/0066973 A1 | 3/2013 | Macadaan et al. |
| 2013/0073336 A1 | 3/2013 | Heath |
| 2013/0073422 A1 | 3/2013 | Moore et al. |
| 2013/0073473 A1 | 3/2013 | Heath |
| 2013/0080364 A1 | 3/2013 | Wilson et al. |
| 2013/0085844 A1 | 4/2013 | Neystadt et al. |
| 2013/0103667 A1 | 4/2013 | Minh |
| 2013/0117329 A1 | 5/2013 | Bank et al. |
| 2013/0124449 A1 | 5/2013 | Pinckney et al. |
| 2013/0138512 A1 | 5/2013 | Sandoval et al. |
| 2013/0159826 A1 | 6/2013 | Mason et al. |
| 2013/0173485 A1 | 7/2013 | Ruiz et al. |
| 2013/0198203 A1 | 8/2013 | Bates et al. |
| 2013/0218667 A1 | 8/2013 | Mohamed |
| 2013/0218713 A1 | 8/2013 | Gottfurcht et al. |
| 2013/0268468 A1 | 10/2013 | Vijayaraghavan et al. |
| 2013/0275511 A1 | 10/2013 | Wilson et al. |
| 2013/0304691 A1 | 11/2013 | Pinckney et al. |

(56) References Cited

U.S. PATENT DOCUMENTS

| | | |
|---|---|---|
| 2014/0032325 A1 | 1/2014 | Weiss et al. |
| 2014/0058990 A1 | 2/2014 | Benson et al. |
| 2014/0059213 A1 | 2/2014 | Ollikainen et al. |
| 2014/0067901 A1 | 3/2014 | Shaw et al. |
| 2014/0129371 A1 | 5/2014 | Wilson et al. |
| 2014/0279196 A1 | 9/2014 | Wilson et al. |
| 2014/0280226 A1 | 9/2014 | Wilson et al. |
| 2014/0244562 A1 | 12/2014 | Wilson et al. |
| 2014/0358836 A1 | 12/2014 | Moore et al. |
| 2015/0066830 A1 | 3/2015 | Wilson et al. |
| 2015/0127585 A1 | 5/2015 | Pinckney et al. |
| 2015/0127586 A1 | 5/2015 | Pinckney et al. |
| 2015/0127587 A1 | 5/2015 | Pinckney et al. |
| 2015/0127597 A1 | 5/2015 | Pinckney et al. |
| 2015/0127598 A1 | 5/2015 | Pinckney et al. |
| 2015/0142711 A1 | 5/2015 | Pinckney et al. |
| 2015/0220835 A1 | 8/2015 | Wilson et al. |
| 2015/0278225 A1 | 10/2015 | Weiss et al. |

FOREIGN PATENT DOCUMENTS

| | | |
|---|---|---|
| WO | 200039725 | 7/2000 |
| WO | 2001033410 | 5/2001 |
| WO | 2001037193 | 5/2001 |
| WO | 2002097701 | 12/2002 |
| WO | 2009111211 | 9/2009 |
| WO | 2013049829 | 4/2013 |

OTHER PUBLICATIONS

ISR issued Feb. 12, 2014 in PCT/US2013/057136, filed Aug. 28, 2013. (previously submitted in related U.S. Appl. No. 14/687,720).
Written Opinion issued Feb. 12, 2014, in PCT/US2013/057136, filed Aug. 28, 2013. (previously submitted in related U.S. Appl. No. 14/687,720).
ISR issued Dec. 17, 2012 in PCT/US2012/057780 (previously submitted in related U.S. Appl. No. 14/687,720).
Written Opinion issued in PCT/US2012/057780 on Dec. 17, 2012. (previously submitted in related U.S. Appl. No. 14/687,720).
Yu, Shijun., Contextualized and Personalized Location-based Services. BSc in Computer Science and Technology, Norther Jiatong University, Chine et de nationalite chinoise, 2008. (previously submitted in related U.S. Appl. No. 14/687,720).
"Elements of Artificial Neural Networks", Mehrotra, 1998 MIT Press (previously submitted in related U.S. Appl. No. 14/687,720).
Koren, Yehuda et al.: "Matrix Factorization Techniques for Recommender Systems"; 2009; IEEE; pp. 30-37. (previously submitted in related U.S. Appl. No. 14/687,720).
Koren, Yehuda et al.: "Collaborative Filtering with Temporal Dynamics"; 2010; ACM; Communications of the ACM, vol. 53, No. 4; pp. 89-97. (previously submitted in related U.S. Appl. No. 14/687,720).
Ricci, Francesco et al.; "Recommender Systems Handbook"; Oct. 29, 2010; Springer; 847 pages. (previously submitted in related U.S. Appl. No. 14/687,720).
O'Dell, "Google Unveils Hotpot, a Recommendation Engine for Places," Mashable, Nov. 16, 2010, http://mashable.com/2010/11/15/google-hotpot/.3pp. (previously submitted in related U.S. Appl. No. 14/687,720).
Extended European Search Report issued Mar. 18, 2015 in Patent Application No. 12837162.2 (previously submitted in related U.S. Appl. No. 14/687,720).
European Communication pursuant to Rule 70 (2) and 70 a (2) EPC issued Apr. 7, 2015 in Patent Application No. 12837162.2 (previously submitted in related U.S. Appl. No. 14/687,720).
Combined Chinese Office Action and Search Report issued Aug. 2, 2016 in Patent Application No. 201280047476.X (previously submitted in related U.S. Appl. No. 14/687,720).
"An introduction to programming and problem solving with Pascal": Schneider, 1982, John Wiley and Sons (previously submitted in related U.S. Appl. No. 14/687,720).
Non-Final Office Action issued in U.S. Appl. No. 14/687,720 on Aug. 11, 2017.
Final Office Action issued in U.S. Appl. No. 14/687,720 on Feb. 7, 2018.
Notice of Allowance issued in U.S. Appl. No. 14/687,720 on Mar. 23, 2021.
Corrected Notice of Allowance issued in U.S. Appl. No. 14/687,720 on Apr. 26, 2021.
Notice of Allowance and Fee(s) due mailed Dec. 21, 2022 in U.S. Appl. No. 16/653,867.
Notice of Allowance and Fee(s) due mailed Jan. 19, 2023 in U.S. Appl. No. 17/526,369.
Corrected Notice of Allowability mailed Apr. 14, 2023 in U.S. Appl. No. 17/526,369.
Yildirim, H. (2011), Scalable Reachability Indexing for Very Large Graphs (Order No. 3514789), Available from ProQuest Dissertations & Theses Global, (1022175652), Retrieved from https://www.proquest.com/dissertations-theses/scalable-reachability-indexing-very-large-graphs/docview/1022175652/se-2 (Year:2011).

* cited by examiner

FIG. 3

Ratings (1-5 Stars)

| | Reviewer 1 | Reviewer 2 | Reviewer 3 | Reviewer 4 | Reviewer 5 | Reviewer 6 | Reviewer 7 |
|---|---|---|---|---|---|---|---|
| Restaurant 1 | 2 | | | | | | 3 |
| Restaurant 2 | | 1 | | | | 2 | 2 |
| Restaurant 3 | | 2 | | | | 2 | |
| Restaurant 4 | 4 | 4 | 3 | | | | |
| Restaurant 5 | 3 | | 3 | 4 | | | 1 |
| Restaurant 6 | | | 1 | 4 | | | 3 |
| Restaurant 7 | | 5 | | | | | 3 |
| Restaurant 8 | 2 | | | 4 | | | 2 |
| Restaurant 9 | | | | 3 | | 3 | 4 |
| Restaurant 10 | | | | 2 | | 2 | |
| Restaurant 11 | | 4 | | 1 | | | 1 |
| Restaurant 12 | 3 | | 2 | | | 3 | 2 |

FIG. 4

Venue Attributes

| | City | State | Price | Cuisine | Hours of Operation | Attire | Neighborhood |
|---|---|---|---|---|---|---|---|
| Restaurant 1 | Boston | MA | 1 | Japanese | xxxx | Casual | 02163 |
| Restaurant 2 | Boston | MA | 1 | Italian | xxxx | Casual | 02199 |
| Restaurant 3 | Boston | MA | 1 | American | xxxx | Casual | 02199 |
| Restaurant 4 | Boston | MA | 2 | Japanese | xxxx | Casual | 02163 |
| Restaurant 5 | Boston | MA | 1 | Italian | xxxx | Casual | 02199 |
| Restaurant 6 | Boston | MA | 1 | American | xxxx | Casual | 02199 |
| Restaurant 7 | Boston | MA | 2 | Japanese | xxxx | Casual | 02163 |
| Restaurant 8 | Boston | MA | 2 | Italian | xxxx | Formal | 02199 |
| Restaurant 9 | Boston | MA | 4 | American | xxxx | Formal | 02199 |
| Restaurant 10 | Boston | MA | 3 | Japanese | xxxx | Formal | 02163 |
| Restaurant 11 | Boston | MA | 3 | Italian | xxxx | Formal | 02199 |
| Restaurant 12 | Boston | MA | 2 | American | xxxx | Formal | 02199 |

Reviewer Attributes

| | Gender | Age | Profession Code | Education Code | Marital Status Code | # of Children | # of Reviews | Review Accuracy |
|---|---|---|---|---|---|---|---|---|
| Reviewer 1 | F | 42 | xxxx | xxxx | xxxx | 1 | 19 | 8 |
| Reviewer 2 | F | 28 | xxxx | xxxx | xxxx | 2 | 23 | 9 |
| Reviewer 3 | F | 49 | xxxx | xxxx | xxxx | 3 | 24 | 9 |
| Reviewer 4 | F | 62 | xxxx | xxxx | xxxx | 2 | 22 | 9 |
| Reviewer 5 | M | 21 | xxxx | xxxx | xxxx | 1 | 26 | 6 |
| Reviewer 6 | M | 38 | xxxx | xxxx | xxxx | 4 | 38 | 7 |
| Reviewer 7 | M | 57 | xxxx | xxxx | xxxx | 3 | 27 | 7 |

FIG. 5

User Attributes

| | Gender | Age | Profession | Education | Marital Status | # of Children | Favorite Venue 1 | Favorite Venue 2 | Favorite Venue 3 | Favorite Venue 4 |
|---|---|---|---|---|---|---|---|---|---|---|
| User 1 | M | 40 | xxxx | xxxx | xxxx | 1 | xxxx | xxxx | xxxx | xxxx |
| User 2 | M | 38 | xxxx | xxxx | xxxx | 1 | xxxx | xxxx | xxxx | xxxx |
| User 3 | M | 33 | xxxx | xxxx | xxxx | 1 | xxxx | xxxx | xxxx | xxxx |
| User 4 | M | 24 | xxxx | xxxx | xxxx | 3 | xxxx | xxxx | xxxx | xxxx |
| User 5 | F | 35 | xxxx | xxxx | xxxx | 3 | xxxx | xxxx | xxxx | xxxx |
| User 6 | F | 34 | xxxx | xxxx | xxxx | 2 | xxxx | xxxx | xxxx | xxxx |
| User 7 | F | 41 | xxxx | xxxx | xxxx | 2 | xxxx | xxxx | xxxx | xxxx |

FIG. 6

Content-based Venue Links

| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
|---|---|---|---|---|---|---|---|---|---|---|---|---|
| Restaurant 1 | | | | | | | | | | | | |
| Restaurant 2 | +0.25 (same attire) | | | | | | | | | | | |
| Restaurant 3 | +0.25 (same attire) | +0.25 (same attire) | | | | | | | | | | |
| Restaurant 4 | +1.25 (same neighborhood), +1 (same genre), +0.25 (same attire) | +0.25 (same attire) | +0.25 (same attire) | | | | | | | | | |
| Restaurant 5 | +0.25 (same attire) | +1.25 (same neighborhood), +1 (same genre), +0.25 (same attire) | +0.25 (same attire) | +0.25 (same attire) | | | | | | | | |
| Restaurant 6 | +0.25 (same attire) | +0.25 (same attire) | +1.25 (same neighborhood), +1 (same genre), +0.25 (same attire) | +0.25 (same attire) | +0.25 (same attire) | | | | | | | |
| Restaurant 7 | +1.25 (same neighborhood), +1 (same genre) | | | | +1.25 (same neighborhood), +1 (same genre) | | | | | | | |

FIG. 7A

| | | | | | | | | | | |
|---|---|---|---|---|---|---|---|---|---|---|
| | | | | | | | | | | |
| | | | | | | | | | | +0.25 (same attire) |
| | | | | | | | | | +0.25 (same attire) | +0.25 (same attire) |
| | | | | | | +0.25 (same attire) | | +0.25 (same attire) | +0.25 (same attire) | +1.25 (same neighborhood), +1 (same genre), +0.25 (same attire) |
| | | | | +0.25 (same attire) | | +0.25 (same attire) | +0.25 (same attire) | +1.25 (same neighborhood), +1 (same genre), +0.25 (same attire) | +0.25 (same attire) | |
| | | +0.25 (same attire) | +0.25 (same attire) | +1.25 (same neighborhood), +0.25 (same attire) | | +0.25 (same attire) | | +0.25 (same attire) | | +1.25 (same neighborhood), +1 (same genre) |
| | +1.25 (same neighborhood), +1 (same genre) | +0.25 (same attire) | +0.25 (same attire) | | | +1.25 (same neighborhood), +1 (same genre) | | | | |
| | | | +1.25 (same neighborhood), +1 (same genre) | | | | | | | |
| | | +1.25 (same neighborhood), +1 (same genre) | | | | | | | +1.25 (same neighborhood), +1 (same genre) | |
| Restaurant 8 | +1.25 (same neighborhood), +1 (same genre) | | | | | +1.25 (same neighborhood), +1 (same genre) | | | | |
| Restaurant 9 | | | | | | | | | | |
| Restaurant 10 | +1.25 (same neighborhood), +1 (same genre) | | | | | | | | | |
| Restaurant 11 | | | | | | | | | | |
| Restaurant 12 | | | | | | | | | | |

FIG. 7B

Collaborative Venue Links

| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
|---|---|---|---|---|---|---|---|---|---|---|---|---|
| Restaurant 1 | | | | | | | | | | | | |
| Restaurant 2 | | | | | | | | | | | | |
| Restaurant 3 | +1 (both rated 4 by Reviewer 1) | | | | | | | | | | | |
| Restaurant 4 | | | | | | | | | | | | |
| Restaurant 5 | | | +1 rated 5 by Reviewer 2) -0.5 (opposite affinity expressed by Reviewer 1) | | | | | | | | | |
| Restaurant 6 | | | | | | | | | | | | |
| Restaurant 7 | +1 (both rated 4 by Reviewer 1) | | +1 (both rated 4 by Reviewer 2) +0.75 (opposite affinity expressed by Reviewer 1) | +1 (both rated 4 by Reviewer 2) | -1.00 (strong opposite affinity expressed by Reviewer 1) | -1.00 (strong opposite affinity expressed by Reviewer 1) | +1.5 (both rated 5 by Reviewer 1) | | | | | |
| Restaurant 8 | | | +1 (both rated 4 by Reviewer 1) | | +1 (both rated 4 by Reviewer 1) +1.25 (both rated 4 or 5 by Reviewer 5) | | | | -0.35 (opposite affinity expressed by Reviewer 1) | | | |

FIG. 8A

| | | | |
|---|---|---|---|
| | | | |
| | | | |
| | | +0.75 (opposite affinity expressed by Reviewer 4) | +1 (both rated 2) +1.00 (strongly opposite affinity expressed by Reviewer 4) |
| | | +1 (both rated 4 by Reviewer 7) +0.75 (opposite affinity expressed by Reviewer 7) | |
| | | +1.25 (both rated 4 or 5 by Reviewer 4) +0.75 (opposite affinity expressed by Reviewer 4) +0.75 (opposite affinity expressed by Reviewer 4) | +0.75 (opposite affinity expressed by Reviewer 4) |
| +1.00 (strongly opposite affinity expressed by Reviewer 3) | +0.75 (opposite affinity expressed by Reviewer 3) +1.25 (both rated 4/5 by Reviewer 2) | +1.00 (strongly opposite affinity expressed by Reviewer 3) | +1.25 (both rated 4 or 5 by Reviewer 4) |
| +1.00 (strongly opposite affinity expressed by Reviewer 3) | | | |
| +0.75 (opposite affinity expressed by Reviewer 3) | | +1.25 (both rated 4 or 5 by Reviewer 4) +1.00 (strongly opposite affinity expressed by Reviewer 3) | +0.75 (opposite affinity expressed by Reviewer 4) |
| +0.75 (opposite affinity expressed by Reviewer 2) | +1 (both rated 4 by Reviewer 2) | | +1 (both rated 4 by Reviewer 2) |
| +0.75 (opposite affinity expressed by Reviewer 2) | +1 rated 4 by Reviewer 2 | +0.75 (opposite affinity expressed by Reviewer 1) | |
| | | | |
| +0.75 (opposite affinity expressed by Reviewer 2) | +1 rated 4 by Reviewer 2 | | +1 (both rated 4 by Reviewer 2) |
| Restaurant 9 | Restaurant 10 | Restaurant 11 | Restaurant 12 |

FIG. 8B

| Recommendation Generation for American Restaurant based on User Affinity for Restaurant 7 | | | | | | |
|---|---|---|---|---|---|---|
| | Content-based link strength 901 | Weighting factor 902 | Collaborative link strength 903 | Weighting factor 904 | Content - collaborative link strength 905 | Weighting factor 906 | Overall link strength 907 |
| Restaurant 3 | 0 | 0.35 | 0.25 | 0.4 | 0.5 | 0.25 | 0.225 |
| Restaurant 6 | 0 | 0.35 | 1.5 | 0.4 | 0.7 | 0.25 | 0.775 |
| Restaurant 9 | 0.25 | 0.35 | -1 | 0.4 | 0.4 | 0.25 | -0.2125 |
| Restaurant 12 | 0.25 | 0.35 | 1.25 | 0.4 | 0.8 | 0.25 | 0.7875 |

FIG. 9

Connection Growth from Collaborative Venue Links for Restaurant 8

| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
|---|---|---|---|---|---|---|---|---|---|---|---|---|
| Restaurant 1 | | | | | | | | | | | | |
| Restaurant 2 | | | | | | | | | | | | |
| Restaurant 3 | | | | | | | | | | | | |
| Restaurant 4 | | | | | | | | | | | | |
| Restaurant 5 | | | +0.2% (both positively linked to Restaurant 8) | | | | | | | | | |
| Restaurant 6 | | | | | | | | | | | | |
| Restaurant 7 | | | | | | | | | | | | |
| Restaurant 8 | | | | | | | | | | | | |
| Restaurant 9 | | | | | | | | +0.5% (both negatively linked to Restaurant 8) | | | | |
| Restaurant 10 | | | | | | | | | | | | |
| Restaurant 11 | | | | | | | | | | | +0.05 (both negatively linked to Restaurant 8, but substantially different magnitude) | |
| Restaurant 12 | | | | | | | | | | | | |

FIG. 10

| Normalization of Collaborative Venue Links: Pre-Normalization Data | | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | 8.23 | | | | | | | | | | | |
| Restaurant 3 | 2.02 | 14.16 | | | | | | | | | | |
| Restaurant 4 | 10.05 | 11.52 | 4.18 | | | | | | | | | |
| Restaurant 5 | 1.71 | 8.52 | 4.68 | 8.33 | | | | | | | | |
| Restaurant 6 | 2.97 | 4.36 | 13.24 | 13.49 | 2.38 | | | | | | | |
| Restaurant 7 | 3.40 | 1.55 | 1.70 | 4.53 | 4.45 | 3.23 | | | | | | |
| Restaurant 8 | 5.38 | 5.33 | 9.03 | 6.09 | 11.68 | 4.11 | 0.68 | | | | | |
| Restaurant 9 | 11.00 | 2.92 | 12.70 | 2.22 | 11.22 | 5.97 | 1.05 | 12.97 | | | | |
| Restaurant 10 | 14.40 | 11.49 | 3.68 | 3.20 | 6.87 | 7.11 | 9.97 | 1.94 | 13.80 | | | |
| Restaurant 11 | 12.33 | 9.08 | 4.70 | 6.24 | 4.09 | 12.05 | 8.00 | 11.95 | 5.70 | | | |
| Restaurant 12 | 6.21 | 6.39 | 4.03 | 8.13 | 14.00 | 6.68 | 5.04 | 3.52 | | | 12.26 | |

FIG. 11

Normalization of Collaborative Venue Links: Post- Normalization Data

| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
|---|---|---|---|---|---|---|---|---|---|---|---|---|
| Restaurant 1 | | | | | | | | | | | | |
| Restaurant 2 | 3.28 | | | | | | | | | | | |
| Restaurant 3 | 7.02 | 0.16 | | | | | | | | | | |
| Restaurant 4 | 6.06 | 6.64 | 5.18 | | | | | | | | | |
| Restaurant 5 | -0.71 | 1.48 | -0.32 | 3.33 | | | | | | | | |
| Restaurant 6 | -2.59 | -0.04 | 0.24 | 0.49 | 7.62 | | | | | | | |
| Restaurant 7 | -1.80 | -5.66 | -3.00 | -5.33 | -5.45 | -1.72 | | | | | | |
| Restaurant 8 | 0.38 | -1.97 | 4.05 | 1.59 | 6.60 | 3.11 | 3.77 | | | | | |
| Restaurant 9 | 0.60 | 2.08 | 7.75 | 2.76 | 6.22 | 0.97 | 3.36 | 7.87 | | | | |
| Restaurant 10 | 0.43 | 0.49 | -1.93 | -4.74 | -1.67 | -2.11 | 0.23 | -6.34 | 9.86 | | | |
| Restaurant 11 | 7.33 | -4.88 | -0.30 | 1.24 | -5.09 | -7.05 | -1.48 | 6.85 | -1.70 | 7.25 | | |
| Restaurant 12 | 1.21 | -4.04 | -0.03 | 3.13 | -9.89 | 1.68 | 0.04 | | | | | |

FIG. 12

| | Connection Creep from Restaurant 10 | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | | | | | | | | | | | | |
| Restaurant 3 | | | | | | | | | | | | |
| Restaurant 4 | | | | | | | | | | | | |
| Restaurant 5 | | | | | | | | | | | | |
| Restaurant 6 | | | | | | | | | | | | |
| Restaurant 7 | | | | | | | | | | | | |
| Restaurant 8 | | | | | | | | | | | | |
| Restaurant 9 | | | | | | | | | | | | |
| Restaurant 10 | -1.5 | +0.5 | | | | +0.5 | +0.5 | (No Change Because Above Threshold) | | | | |
| Restaurant 11 | | | | | | | | | | | | |
| Restaurant 12 | | | | | | | | | | | | |

Data Repository of Previous Recommendations

| | Price | Genre | Hours | Attire | Neighborhood | Reviewers | Age | Children |
|---|---|---|---|---|---|---|---|---|
| User 2 | | | | | | | | |
| Rec #1 | 3 | Italian | XXXX | Casual | 02196 | 2, 4, 6, 7 | 30 | 0 |
| Rec #2 | 3 | Italian | XXXX | Casual | 02196 | 2, 4, 6, 7 | 30 | 0 |
| Rec #3 | 2 | Italian | XXXX | Formal | 02196 | 1, 4, 5, 6, 7 | 31 | 1 |
| User 4 | | | | | | | | |
| Rec #1 | 8 | Italian | XXXX | Formal | 02196 | 1, 3, 5, 6, 7 | 54 | 0 |
| Rec #2 | 6 | Japanese | XXXX | Formal | 02163 | 1, 2, 4, 5 | 55 | 0 |
| Rec #3 | 9 | Japanese | XXXX | Formal | 02163 | 1, 2, 3, 7 | 55 | 0 |
| Rec #4 | 5 | American | XXXX | Casual | 02199 | 1-6 | 55 | 0 |
| User 7 | | | | | | | | |
| Rec #1 | 1 | Japanese | XXXX | Casual | 02163 | 1, 2, 4, 6, 7 | 35 | 3 |
| Rec #2 | 3 | Italian | XXXX | Casual | 02196 | 2, 4, 6, 7 | 35 | 3 |
| Rec #3 | 2 | American | XXXX | Casual | 02199 | 3, 4, 5 | 35 | 3 |
| Rec #4 | 1 | Japanese | XXXX | Casual | 02163 | 1, 2, 4, 6, 7 | 35 | 4 |

FIG 18

| | | | Aggregate Repository Recommendation Data | | | | | |
|---|---|---|---|---|---|---|---|---|
| | # of Recs | Price | Genre | Hours | Attire | Neighborhood | Age | Children |
| User 2 | 3 | 3 (2), 2 (1) | Italian (3) | XXXX | Casual (2) Formal (1) | 02196 (3) | 30.33 | 0 (2), 1 (1) |
| User 4 | 4 | 8 (1), 6 (1), 9 (1), 5 (1) | Italian (1) Japanese (2) American (1) | XXXX | Casual (1) Formal (3) | 02196 (1) 02163 (2) 02199 (1) | 52.5 | 0 (4) |
| User 7 | 4 | 1 (2), 3 (1), 2 (1) | Japanese (2) Italian (1) American (1) | XXXX | Casual | 02163 (2) 02196 (1) 02199 (1) | 35 | 3 (3), 4 (1) |

FIG 19

Recommendation Generation for an American Restaurant with Casual Attire Based on User Affinity for Restaurant 5

| | Content-based link strength 2100 | Weighting Factor 2102 | Collaborative link strength 2104 | Weighting Factor 2106 | Content-Collaborative link strength 2208 | Weighting Factor 2110 | Overall link strength 2112 |
|---|---|---|---|---|---|---|---|
| Restaurant 3 | 0 | 0.35 | 0 | 0.4 | 0.3 | 0.25 | 0.075 |
| Restaurant 6 | 0.25 | 0.35 | -1.0 | 0.4 | 0.5 | 0.25 | -0.1875 |
| Restaurant(s) X | A | B | C | D | E | F | G |

FIG. 21A

Geometric Contextualization of Recommended Values

| User 2 | Venue | Overall Link Strength 2114 | Number of Recommendations in Filter State 2116 | Quality of Recommendations: Quality Factor 2118 | Diversity of Recommendations 2120 | Normalized Link Strengths 2122 |
|---|---|---|---|---|---|---|
| Rec #1 | Restaurant 3 | 0.075 | 3 | XXXX | XXXX | 0.25 |
| Rec #2 | Restaurant 6 | -0.1875 | | | | -0.0125 |
| Rec #3 | Restaurant X1 | 0.08 | | | | 0.255 |

Geometric Contextualization of Recommended Values

| User 2 | Venue | Overall Link Strength 2114 | Number of Recommendations in Filter State 2116 | Quality of Recommendations: Quality Factor 2118 | Diversity of Recommendations 2120 | Normalized Link Strengths 2122 |
|---|---|---|---|---|---|---|
| Rec #1 | Restaurant 3 | 0.075 | XXXX | 0.65 | XXXX | 0.3 |
| Rec #2 | Restaurant 6 | -0.1875 | | 0.55 | | 0.255 |
| Rec #3 | Restaurant X1 | 0.08 | | 0.15 | | 0.1 |

FIG. 21D

Geometric Contextualization of Recommended Values

| User 2 | Venue | Overall Link Strength 2114 | Number of Recommendations in Filter State 2116 | Quality of Recommendations: Quality Factor 2118 | Diversity of Recommendations 2120 | Normalized Link Strengths 2122 |
|---|---|---|---|---|---|---|
| Rec #1 | Restaurant 3 | 0.075 | XXXX | XXXX | 0.75 | 0.1 |
| Rec #2 | Restaurant 6 | -0.1875 | | | 0.25 | 0.3 |
| Rec #3 | Restaurant X1 | 0.08 | | | 0.4 | 0.255 |

| | Ratings (1-5 Stars) | | | |
|---|---|---|---|---|
| | Reviewer 1 | Reviewer 2 | Reviewer 3 | Reviewer 4 |
| Restaurant A (New York) | 5 | | 4 | 1 |
| Restaurant B (New York) | 4 | 2 | | |
| Restaurant C (New York) | | | | |
| Restaurant D*** (Boston) | 1 | 2 | 5 | 4 |
| Restaurant E (Boston) | | 4 | | |
| Restaurant F (Boston) | 5 | 4 | | 4 |

FIG. 23

Collaborative Venue Links

| | Restaurant A | Restaurant B | Restaurant C | Restaurant D | Restaurant E | Restaurant F |
|---|---|---|---|---|---|---|
| Restaurant A | | | | | | |
| Restaurant B | +1.25 (both rated 4 or 5 by Reviewer 1) | | | | | |
| Restaurant C | | | | | | |
| Restaurant D | -1.0 (strongly opposite affinity expressed by Reviewer 1) | -0.75 (opposite affinity expressed by Reviewer 1) +0.25 (both rated 2 by Reviewer 2) | | | | |
| Restaurant E | +1.0 (both rated 4 or 5 by Reviewer 3) -0.75 (Opposite affinity expressed by Reviewer 4) | | | | | |
| Restaurant F | +1.5 (both rated 5 by Reviewer 1) -0.75 (Opposite affinity expressed by Reviewer 4) | +1.25 (both rated 4 or 5 by Reviewer 1) -0.5 (Opposite affinity expressed by Reviewer 2) | | -1.0 (strongly opposite affinity expressed by Reviewer 1) -0.5 (Opposite affinity expressed by Reviewer 2) | +1.25 (both rated 4 by Reviewer 4) | |

FIG. 24

Venue Attributes

|  | City | State | Price | Genre | Hours | Attire | Neighborhood |
|---|---|---|---|---|---|---|---|
| Restaurant A | New York | NY | 5 | Japanese | XXXX | Casual | 10001 |
| Restaurant B | New York | NY | 7 | Italian | XXXX | Formal | 10002 |
| Restaurant C | New York | NY | 2 | American | XXXX | Casual | 10065 |
| Restaurant D | New York | NY | 8 | Japanese | XXXX | Formal | 10001 |
| Restaurant E | New York | NY | 5 | American | XXXX | Casual | 10065 |

FIG. 26A

Restaurant 6
(Price: 2, Genre: American, Attire: Casual)

|  | Price | Genre | Attire | Congruency Factor |
|---|---|---|---|---|
| Restaurant A | 5 | Japanese | Casual | 0.24 |
| Restaurant B | 7 | Italian | Formal | 0.15 |
| Restaurant C | 2 | American | Casual | 0.85 |
| Restaurant D | 8 | Japanese | Formal | 0.10 |
| Restaurant E | 5 | American | Casual | 0.50 |

Restaurant 10
(Price: 6, Genre: Japanese, Attire: Formal)

|  | Price | Genre | Attire | Congruency Factor |
|---|---|---|---|---|
| Restaurant A | 5 | Japanese | Casual | 0.65 |
| Restaurant B | 7 | Italian | Formal | 0.40 |
| Restaurant C | 2 | American | Casual | 0.18 |
| Restaurant D | 8 | Japanese | Formal | 0.75 |
| Restaurant E | 5 | American | Casual | 0.30 |

FIG. 26B

Venue Attribute Data

| ID | Name | Price | Genre | Hours of Operation | Attire | Neighborhood | Latitude | Longitude |
|---|---|---|---|---|---|---|---|---|
| 001 | Restaurant 1 | 4 | American, Western | XXX | Formal, Romantic | 02163 | 42.0123 | -71.0911 |
| 002 | Restaurant 2 | 3 | Italian, Pizza | XXX | Family, Upscale | 02196 | 42.0245 | -71.0901 |
| 003 | Restaurant 3 | 2 | Pastries | XXX | Casual | 02199 | 41.973 | -71.1213 |
| 004 | Restaurant 4 | 3 | Chinese, Japanese | XXX | Casual, Family | 02163 | 41.992 | -71.2495 |
| 005 | Restaurant 5 | 4 | American, French | XXX | Hipster | 02196 | 42.345 | -71.0025 |
| 006 | Restaurant 6 | 1 | Desserts | XXX | Casual | 02199 | 42.1251 | -71.1167 |

FIG. 29

User Attributes

| | Gender | Age | Children | Favorite Venue(s) | Price | Genre | Hours | Attire | Neighborhood |
|---|---|---|---|---|---|---|---|---|---|
| User 1 | M | 40 | 1 | 1, 2, 3 | 1-3 | Japanese, American | > 8:00 PM | Casual, Hipster | 02163 |
| User 2 | M | 30 | 1 | 2, 6 | 3 | Italian | XXX | Casual | 02199 |
| User 3 | M | 33 | 1 | 3 | 7 | American | XXX | Formal | 02196 |
| User 4 | M | 54 | 0 | 1, 2 | 8 | Chinese, Japanese | XXX | Romantic | 02199 |
| User 5 | F | 35 | 3 | 2, 5 | 6 | Italian | XXX | Casual | 02163 |
| User 6 | F | 34 | 2 | 4 | 1 | Pizza | XXX | Casual, Family | 02196 |
| User 7 | F | 41 | 2 | 1, 5 | 5 | Dessert | XXX | Formal | 02196 |

FIG. 30

| | User Weighting Values | | | | |
|---|---|---|---|---|---|
| | Price | Genre | Hours | Attire | Neighborhood |
| User 1 | 1-3 = 0.9<br>4-6 = 0.5<br>7-9 = 0.2 | Japanese = 0.8<br>American = 0.7<br>Other = 0.5 | > 8:00 PM = 0.8 | Casual = 0.8<br>Formal = 0.5<br>Hipster = 0.6 | 02163 = 0.8<br>02196 = 0.2 |
| User 2 | 3 = 0.9<br>1-2 = 0.6<br>4-5 = 0.6<br>7-9 = 0.3 | Italian = 1.0<br>Other = 0.0 | > 5:00 PM & <<br>6:00 PM = 0.8 | Casual = 0.8<br>Family = 0.7 | 02196 = 0.6<br>02199 = 0.6<br>02163 = 0.6 |
| User 3 | 7 = 0.8<br>1 = -0.2 | American = 0.7 | XXX | Formal = 0.7<br>Casual = 0.2 | 02199 = 0.8 |
| User 4 | 8 = 0.8<br>< 6 = 0.4 | Chinese = 0.9<br>Japanese = 0.8<br>Other = 0.4 | XXX | Romantic = 0.8<br>Formal = 0.7<br>Casual = -0.2 | 02163 = 0.7<br>02196 = 0.6<br>Other = 0.3 |
| User 5 | 6 = 0.6 | Italian = 0.7 | XXX | Casual = 0.7 | No Preference |
| User 6 | 1 = 0.8<br>> 2 = 0.4 | Pizza = 0.8<br>Italian = 0.6 | XXX | Casual = 0.6<br>Family = 0.8<br>Formal = 0.2 | 02163 = 0.7 |
| User 7 | 5 = 0.6 | Dessert = 0.6 | XXX | Formal = 0.6 | 02196 = 0.6 |

FIG. 31

Massachusetts in a Geospatial grid

| Keyed Segmentation Data | |
|---|---|
| Reference Point Coordinate Data | Venue ID & Offset Data |
| Key | |
| 001  r_4175_-07125 | <003, 2230, 1298>, <004, 2420, 0005> |
| 002  r_4200_-07125 | <001, 0123, 1699>, <002, 0245, 1598>, <006, 1251, 1343> |
| 003  r_4225_-07125 | <005, 0950, 2475> |

FIG. 34

Encoding Scheme

| Position | Data | Type | Values |
|---|---|---|---|
| 1 | Restaurant ID | Numeric | XXX |
| 2 | Price | Numeric | 1=Low, 5=Medium, 10=High |
| 3 | Genre | Character | P=pizza, p=pastries, A=American, W=Western, C=Chinese, J=Japanese, D=Desserts |
| 4 | Attire | Character | c=casual, h=hipster, f=formal, r=romantic, F=family, u=upscale |
| 5 | Longitude | Numeric | XX.XX_XXXX |
| 6 | Latitude | Numeric | XX.XX_XXXX |

FIG. 36

Encoded Segmentation Data

| Key | Reference Point Coordinate Data | Encoded Data |
|---|---|---|
| 001 | r_4175_-07125 | 003_2_p_c_2230_1298 |
| | | 004_3_C-j_c-f_2420_0005 |
| 002 | r_4200_-07125 | 001_4_A-W_F-R_0123_0699 |
| | | 002_3_j-P_f-U_0245_1598 |
| | | 005_1_D_c_1251_1343 |
| 003 | r_4225_-07125 | 005_4_A-F-h_0950_2475 |

FIG. 37

SYSTEMS AND METHODS FOR PROVIDING RESULTS BASED ON NODAL INTERRELATIONSHIPS AND UPDATING NODAL INTERRELATIONSHIP STRENGTHS BASED ON FEEDBACK REGARDING THE RESULTS

CROSS-REFERENCE TO RELATED APPLICATIONS

The present application is a continuation of U.S. application Ser. No. 14/687,720, filed Apr. 15, 2015, which is continuation-in-part of U.S. application Ser. No. 14/537,319, filed Nov. 10, 2014, now U.S. Pat. No. 9,208,443, which is a continuation of U.S. application Ser. No. 14/267,464, filed May 1, 2014, now U.S. Pat. No. 8,909,583, which is a continuation of U.S. application Ser. No. 13/919,301, filed Jun. 17, 2013, now U.S. Pat. No. 8,756,187, which is a continuation of U.S. application Ser. No. 13/416,945, filed Mar. 9, 2012, now U.S. Pat. No. 8,515,893, which is a continuation of U.S. application Ser. No. 13/247,289, filed Sep. 29, 2011, now U.S. Pat. No. 8,170,971, and said U.S. application Ser. No. 14/687,720 is a continuation of U.S. application Ser. No. 13/842,165, filed Mar. 15, 2013, the entire contents of each of which are incorporated herein by reference.

BACKGROUND

Search engines may output lists of hyperlinks for web pages that include information of interest. Some search engines base the determination of corresponding hyperlinks on a search query entered by the user. The goal of the search engine is to return links for high quality, relevant sites based on the search query. Most commonly, search engines accomplish this by matching the terms in the search query to a database of stored web pages or web page content. Web pages that include the terms in the search query are considered "hits" and are included in the list of hyperlinks presented to the user.

To increase efficacy of the search, a search engine may rank the list of hits or hyperlinks according to the relevance or quality. For example, the search engine may assign a grade or rank to each hit, and the score may be assigned to correspond to the relevance or importance of the web page. Conventional methods of determining importance or relevance are based on the content of each web page including the link structure of the web page.

Many conventional search engines utilize an indexing system for identifying web pages available on the Internet. The indexing system identifies words in the pages and creates an index of those words. The system responds to user queries by analyzing the index and identifying the pages that are most relevant to the users query.

The relevance ranking or determination can be executed in various ways. The citation of one site or page by other sites or pages is sometimes used as one measure of relevance. Web page metadata is also sometimes used in a determination of relevance.

Neural networks have also been used in the field of Internet searching. It is assumed, for purposes of this description, that the reader is familiar with how neural networks operate. A neural network can consist of three basic aspects—a neuron or node, definitions of how the neurons or nodes are interconnected or related to each other, and the manner in which that topology is updated over time.

Further, a shift in consumer technology from desktop computing to mobile applications has led to a pronounced emphasis on computation and interfaces that incorporate a user's location. By utilizing geographic location information with respect to a users, systems can provide particular information of interest arising out of that geographic location. For example, upon detecting that a user has entered a new city or neighborhood, a mobile application may provide local restaurants or shopping areas of interest to the user in that area.

Whether processing data based on geographical considerations or different data types, in order to provide this information or recommendations in an accurate and effective manner, systems must have increasingly immense computational resources and storage capacity to process the large volume of available data. This leads to increased costs to maintain and upgrade existing systems in order to continuously provide effective information to users in a timely manner. Further, current systems cannot pre-calculate the required information for holistic searching due to the variety and immense number of combinations. Therefore, a need exists for a system and associated methodology that provide timely and accurate recommendations without requiring extensive and expensive computational resources.

SUMMARY

In selected embodiments a recommendation generator builds a network of interrelationships among venues, reviewers and users based on their attributes and reviewer and user reviews of the venues. Each interrelationship or link may be positive or negative and may accumulate with other links (or anti-links) to provide nodal links the strength of which are based on commonality of attributes among the linked nodes and/or common preferences that one node, such as a reviewer, expresses for other nodes, such as venues. The links may be first order (based on a direct relationship between, for instance, a reviewer and a venue) or higher order (based on, for instance, the fact that two venue are both liked by a given reviewer). The recommendation engine in certain embodiments determines recommended venues based on user attributes and venue preferences by aggregating the link matrices and determining the venues which are most strongly coupled to the user. The system architecture in various embodiments may permit efficient, localized updating of the neural network in response to alteration of the attributes of various nodes.

In certain implementations, data is spatially segmented into a variety of grids having particular keyed location data. Items of interest located within the boundaries of each grid are identified and stored in association with the grid information. Data with respect to attributes of items of interest is encoded and stored in association with corresponding grid data. The system will identify a grid or grids based on a recommendation request or based on the user data and will generate a list of items of interest in that grid and neighboring grids. This information is filtered based on the particularities of the user request to form a final filter set. The encoded information is then parsed to determine venue attributes of the final filter set. User attribute weights are then applied to the final filter set to determine an overall score for each item of interest. Items of interest are provided as recommendations to the user based on the overall scores.

The details of one or more implementations are set forth in the accompanying drawing and description below. Other features, objects, and advantages will be apparent from the description and drawings, and from the claims.

BRIEF DESCRIPTION OF FIGURES

FIG. 3 is chart including reviewer ratings according to one example.

FIG. 4 is a chart including venue attributes according to one example.

FIG. 5 is a chart including reviewer attributes according to one example

FIG. 6 is a chart including user attributes according to one example.

FIGS. 7A and 7B show a matrix of content-based venue links according to one example.

FIGS. 8A and 8B show a matrix of collaborative venue link according to one example.

FIG. 9 is a chart illustrating a recommendation generation according to one example.

FIG. 10 is a chart illustrating a connection grown according to one example.

FIG. 11 is a chart illustrating pre-normalization matrix data according to a second example.

FIG. 12 is a chart illustrating post-normalization matrix data according to a second example.

FIG. 13 is a chart illustrating connection creep according to a second example.

FIG. 14 is a user interface according to one example.

FIG. 18 is a chart illustrating the data repository of previous recommendations served to users according to one example.

FIG. 19 is a chart illustrating aggregate data repository recommendation data according to one example.

FIGS. 21A-21D illustrate recommendation generation and recommended data values after geometric contextualization according to one example.

FIG. 23 is a chart illustrating reviewer ratings between different locales according to one example.

FIG. 24 shows a matrix of collaborative venue links based on the reviewer ratings illustrated in FIG. 23 according to one example.

FIG. 26A is a chart illustrating venue attributes according to one example.

FIG. 26B is a chart illustrating congruency factors determined via interconnectivity augmentation according to one example.

FIG. 29 is chart including venue attributes according to one example.

FIG. 30 is a chart including user attributes according to one example.

FIG. 31 is a chart illustrating user attribute weight data according to one example.

FIG. 34 is a chart including keyed segmentation data according to one example.

FIG. 36 is a chart including encoding parameters according to one example.

FIG. 37 is a chart including encoded data according to one example.

Like reference symbols in various drawing indicate like elements.

DETAILED DESCRIPTION OF ILLUSTRATIVE IMPLEMENTATIONS

Overview of Selected Embodiments

Figure 1A:
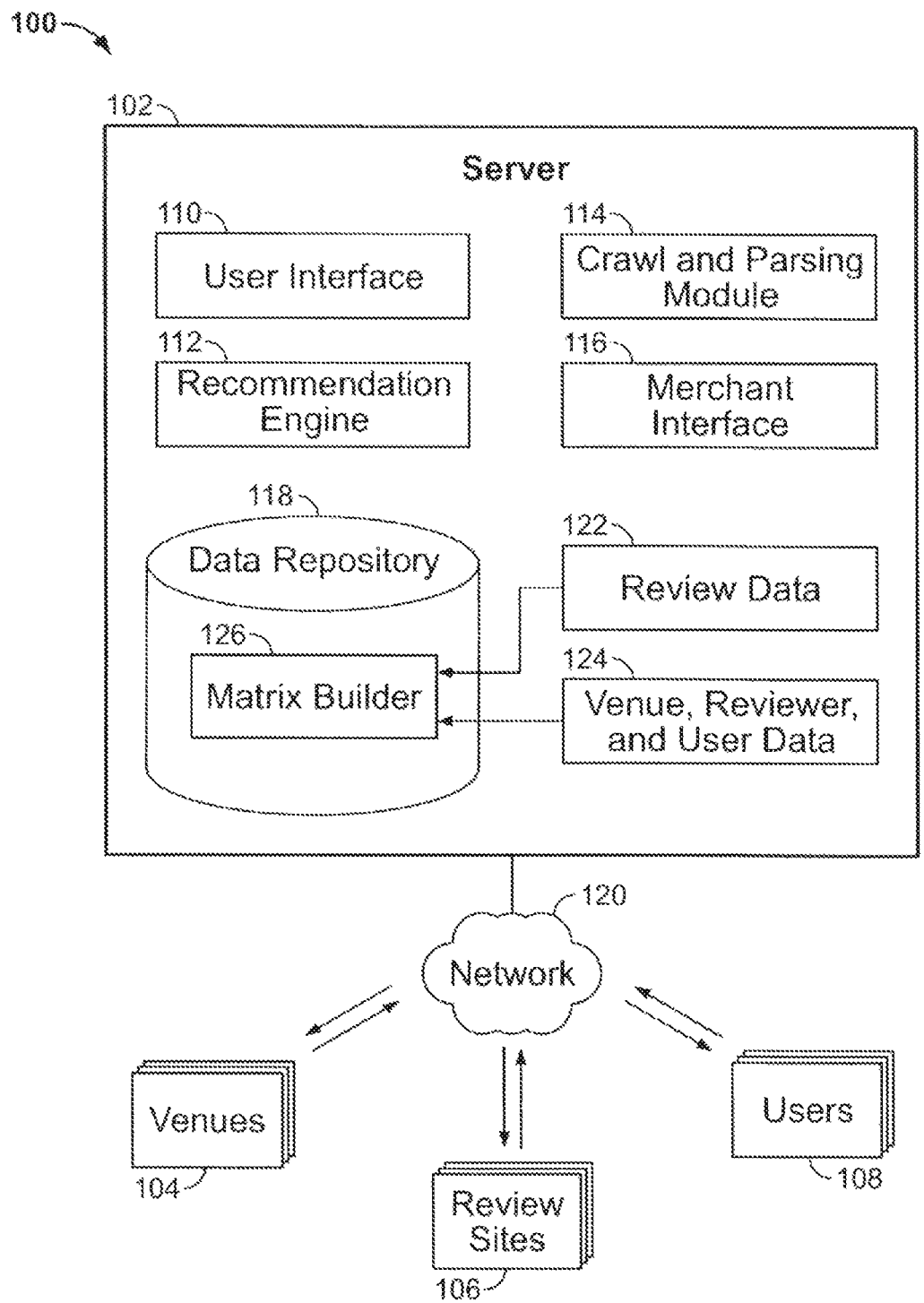
FIG. 1A is a block diagram of an environment for developing and utilizing a network of interrelated nodes.

In certain implementations a recommendation engine may generate recommendations based on attributes and data associated with venues, users, reviewers and reviews. The system may harvest reviews generated by various reviewing entities parse those reviews into an organized database of review data. That data may include attributes of the venue (such as a restaurant) and the rating or assessment provided by the reviewer. The system may also gather or generate data concerning the attributes of reviewer, such as gender, age, profession, marital status, review frequency and review accuracy. The system, in one implementation, also gathers data concerning the attributes of user, such as gender, age, profession, marital status, and affinity (whether positive or negative) for certain venues.

The exemplary system may generate a neural network of interrelationships based on venue attributes and reviewer attributes. For instance, venues may be linked by common features such as price, genre, attire, location, or affinity expressed by the same reviewer. Reviewers may be linked by personal characteristics or common affinities for certain venues. Reviewers and venues may be linked by common attributes of reviewers with a given affinity for a specific venue or common venue attributes for venues liked by a given reviewer.

The system may create interrelationships between and amongst venues and reviewers of different species. For instance, interrelated venues may include restaurants, theaters, events and institutions. Interrelated reviewers may include periodicals and individual reviewers.

Each link may incrementally strengthen or weaken the overall interrelationship between two venues, a venue and a reviewer, or two reviewers. Each link may affect neighboring links, either by causing the neighboring links to strengthen or weaken based on the magnitude of the origin link. When two reference nodes (e.g. venues) are each connected to a common node (e.g., a venue), the system can generate an additional link or interrelationship between the two reference nodes.

The interrelationships can be broadly categorized as collaborative and content-based. Collaborative relationships are a function of affinities expressed by a given reviewer.

Stated another way, collaborative links are usually between things a given user likes, often irrespective of why the user likes them. Content-based relationships are a function of the features held in common among venues in a given subset. Stated another way, content-based links are usually between things within a group which have common features. Hybrids of these approaches may also be used, for example, a link may identify venues among those liked by a given reviewer which have features in common.

The neural network of interrelationships grows dynamically as further review, reviewer and venue data is added. The system may continuously analyze the data to add positive or negative collaborative links, content links, or content-collaborative links. The system may create new derivative links, normalize the data to adjust for data skew, and adjust links based on neighboring link values.

In various implementations the system may generate recommendations based on user attributes and data associated with a recommendation request. The system may provide a plurality of recommendations based overall link strengths that factor in collaborative and content-based interrelationships. The recommendations may include venues complementary to that specifically requested, for instance, in response to a user request for a restaurant recommendation the system may generate a theater or night club recommendation as well.

In certain implementations a recommendation engine may generate recommendations based on attributes and data associated with venues, users, and reviews. The system harvests this information from throughout the Internet and stores it in a data repository. In certain implementations, geographic data is spatially segmented into a variety of grids having particular keyed location data. Each grid can be associated with other neighboring grids. Further, items of interest located within the geographic boundaries of each grid are identified and stored in association with the grid location information. Data with respect to venue attributes is encoded and stored in association with corresponding grid location data.

In certain implementations, users of the system will request recommendations or the system will automatically provide recommendations based on the grid data and encoded data. The system will identify a location of the request or the user and generate a list of items of interest in that location and neighboring locations. This information is then filtered based on the particularities of the user request to form a final filter set. User attribute weights determined from user affinity data are then applied to the final filter set to determine an overall score for each item of interest. Items of interest having an overall score above a predetermined threshold are then provided as recommendations to the user.

Exemplary System Architecture

FIG. 1A illustrates an exemplary network architecture for a server-based recommendation generation system 100. It will be understood that some or all of the functionality described herein may be relocated to a client device application (such as a smart phone application) based on the client device's communication, data storage and computational capabilities.

The server 102 hosts a plurality of engines and modules. In this application the user interface module 110 resides on the server 102 and serves web pages or suitable content to a client side application. The crawl and parsing module 114 executes the web crawling and source data collection operations described below. The recommendation engine 112 accesses the matrices of interrelationships and generates the recommendations according to the techniques described herein. The merchant interface provides the functionality described below concerning venue operators' interaction with the server and accessing projections and reports generated thereby.

The data repository 118 stores the matrices of interrelationships. The repository includes a matrix builder 126 which builds the data structures reflecting the nodal interrelationships based on review data 122 which is collected from review sites 106 by the crawl and parsing module 114. The matrix builder also incorporates venue, reviewer and user data 124 collected from users 108, venues 104 and other web pages (by the crawl and parsing module 114).

The network 120 includes in certain embodiments the Internet or world-wide web. The network may also comprise proprietary and semi-propriety networks such as cellular data networks, intranets, VPNs, or extranets.

Those skilled in the art will understand that the techniques described herein may be implemented in various system and database topologies and consistent with various computational methodologies. Topologies and methodologies suitable for aspects of various embodiments are described in K. R. Nichols, A Reconfigurable Computing Architecture for Implementing Artificial Neural Networks on FPGA, Master's Thesis, The University of Guelph, December 2003; F. Rosenblati, The Perception: A Probabilistic Model For Information Storage And Organization In The Brain, Psycho!, Rev., 65(6):386-408, 1958; K. Steinbuch and U. A. W. Piske; Learning Matrices and their Applications. IEEE Trans. Electron. Computers; 12:846-862, 1963; J. A Bamden, High-level Reasoning, Computational Challenges for Connectionism, and the Composit solution. Appl. Intell., 5(2):103-135, April 1995; B. Denby, P. Garcia, B. Granado, C. Kiesling, J. C. Prevotet and A. Wassatch, Fast Triggering in High Energy Physics Experiments Using Hardware Neural Networks, IEEE Trans. On Neural Networks, 14(5):1010-1027, September 2003; R. O. Duda, P. E. Hart, and D. G. Stork. Pattern Classification. John Wiley & Sons, New York, 2nd edition, 2001; H. Eichenbaum, The Cognitive Neuroscience of Memory: An Introduction, Oxford University Press, New York, 2002; K. Fukushima, Cognitron: A Self-Organizing Multilayered Neural Network, Biol. Cybern, 20(3-4): 127-136, 5 Nov. 1975; K. Fukushima and S. Miyake. A Self-Organizing Neural Network With A Function Of Associative Memory: Feedback Type Cognitron, Biol. Cybern., 28(4): 201-208, 3 Mar. 1978; J. M. Fuster. Cortex and Mind: Unifying Cognition. Oxford University Press, New York, 2002; R. Gadea, J. Cerda, F. Ballesterand A. Mocholi, Artificial Neural Network Implementation On A Single FPGA Of A Pipelined On-Line Backpropagation, ISSS 2000, Madrid, Spain, September 2000; S. Grossberg, Adaptive Pattern Classification And Universal Recoding: I. Parallel Development And Coding Of Neural Feature Detectors. Biol. Cybern., 23(3):121-134, 30 Jul. 1976; S. Grossberg, Adaptive Pattern Classification And Universal Recoding: IL Feedback, Expectation, Olfaction, Illusions, Biol. Cybern., 23(4):187-202, 30 Aug. 1976; S. Haykin. Neural Networks: A Comprehensive Foundation. Prentice Hall, Upper Saddle River, N.J., 2nd edition, 1999; R. Hecht-Nielsen, Neurocomputing, Addison Wesley, Reading, Mass., 1989; R. Hecht-Nielsen, A Theory Of Thalamocortex, in R. Hecht-Nielsen and T. McKenna, editors, Computational Model!. for Neuroscience: Human Cortical Information; S. Y. Kung, M. W. and S. H. Lin., Biometric Authentication: A Machine Learning Approach. Prentice Hall PTR, Upper Saddle River, N.J., 2005; B. Widrow and M. Kamenetsky, On The Efficiency Of Adaptive Algorithms, In S. Haykin and B. Widrow, editors, Least-Mean-Square Adaptive Filters, John Wiley & Sons, New York, 2003; B. Widrow and M. Kamenetsky, Statistical Efficiency Of Adaptive Algorithms, Neural Netw., 16(5-6):735-744, June-July 2003; B. Widrow and M. A. Lehr, 30 Years Of Adaptive Neural Networks: Perception, Madaline, and backpropagation, Proc. IEEE, 78(9): 1415-1442, September 1990; U.S. Pat. No. 7,840,569, entitled "Enterprise relevancy ranking using a neural network," which is incorporated herein by reference; U.S. Pat. No. 7,895,140, entitled "Neural Network Learning Device, Method, And Program," which is incorporated herein by reference; and U.S. Pat. No. 7,979,370, entitled "Neural Network For Electronic Search Applications," which is incorporated herein by reference.

Node/Venue Types

The nodes in the neural network in one implementation are venues such as restaurants, theaters, night clubs, hotels, concerts and other events. However, due to the flexibility of the systems and methodologies described herein they may be applied in a variety of other manners. Nodes in the network may be sub-venue items such as specific mend items or specific rooms inside a hotel. The nodes may also be style consumables such as clothing, furniture or wine or rather content such as music, books, magazines, TV shows, or movies. The nodes are optionally set to be services such as mechanics, barbers, transportation, doctors, dentists, landscape architects, interior designers, or nanny services. In other implementations the nodes may be neighborhoods or cities in which to live, colleges to apply to, careers that are a good fit, or grocery stores. In still other applications the nodes may be associated with social aspects such as friends and activities the user might like. The nodes in other embodiments are medical conditions or treatments.

The techniques described herein may also be used for fraud detection by providing predictions of what a user is unlikely to do, which in turn is more likely to be associated with fraudulent use of a credit card (for instance). The techniques may also be used for marketing/co-branding opportunities by predicting brand affinity even across disparate categories. The techniques may also be applied to actuarial/risk assessment applications by analyzing co-occurences between a user's fine-scale likes and dislikes, which can be utilized as indicators of risk. The techniques may also be used to predict financial market behavior or trends by aggregating markets into "group users" and predicting behavior of that group user as described hereinbelow. In a similar vein predictions on mass human behavior can be achieved with respect to geographic movement (migratory patterns) and thereby census and demographic projections over time may be generated for use by retailers, real estate developers, and others. Moreover, the techniques may be used to gauge affinity for certain types of media (such a television shows) or media channels (cable or web).

As will be appreciated from the following description, in each such implementation the nodal attributes, reviewer attributes and the interrelationships will be selected to correspond in part to the factors which are causally associated with reviewer's preferences for certain nodes. For instance, in a system designed to provide career suggestions the nodal attributes may includes skills associated with each profession and user attributes may include aptitude scores or survey questionnaire results.

Hereinbelow the system 100 is described in connection with exemplary systems in which the nodes are venues such as restaurants, hotels or theaters. For convenience the term "venue" is used to refer to neural network nodes. It should be understood that the term "venue" in the following sections is used broadly to refer to any entity or item that is interrelated in the network with other network nodes such as users and/or reviewers.

Identification of Venue Reviews

A user's or reviewer's affinity (again, positive or negative) for a venue is derived from both evaluations and assessments of venues, such as reviews or ratings, and implicit data sources such as ant trails. Individuals may publish ratings on social webpages, review forums and websites or blogs. Ratings may also be published by votes placed via "Like" or "Ding" buttons disposed on various websites. As one example, user reviews of restaurants can be found at menuism.com, dine.com, opentable.com, google.com, reviewsahoy.com, and realeats.com. An individual's affinity for certain venues can also be discerned from their spending habits or purchase history, data of which can be gleaned from financial transaction records such as credit card statements. An individual's web browsing history or ant trail can also provide insight into affinity for certain venues, as discerned from cookies or the various reviews an individual generates across multiple forums, including but not limited to websites associated with each venue. An individual's website navigation bookmarks and browsing history also reflect browsing behavior and may likewise be mined for source data. The geographic position of an individual over time, such as derived from cellular GPS data, can likewise be correlated with venues and thereby generate data reflective of venue affinity. This approach may provide dwell time data as well, which can be used to sort or arrange the data. Magazine subscriptions information may also be used as indicators of an individual's affinity for given venues (as that term is broadly used herein). An individual's professional licenses can also be used as data sources for affinity for venues, including but not limited to organizations.

The foregoing sources of data concerning venue affinity can be prioritized based on factors germane to the strength of the correlation between the data and the affinity of interest. Data or sites that refer to a greater number of venues might be more probative since such sites are more likely to compare, contrast or rank venues. Similarly, sites that specify a greater number of properties, such as in structured fields, for each venue or reviewer tend to be more effective or probative. Sites with a greater number of reviews per venue and/'or reviews per reviewer are, on balance, to include more reliable affinity. The inclusion of "related items," "also viewed," or "people who purchased this also purchased" fields or boxes can also be considered as indicators that the site's data will be strongly correlated to actual affinities. In a similar vein, a site's inclusion of geographically proximate recommendations, recommendations based on social networking, and recommendations based of complementary venues (e.g. hotel and restaurant) may be indicative of more reliable data. The behavior of the more effective or accurate reviewers also can be analyzed to differentiate various data sources, for example, by determining where those reviewers tend to post reviews. The existence of grouping structures, such as data structures associated with a plurality of socially networked individuals, can also be used as a metric to grade or rate the potential value of the site's data. Blogs may also be crawled to determine which reviews or ratings sites are the most commonly referenced.

In one embodiment, numeric values are associated with some or all of the foregoing variables and weights are assigned to each variable based on the system designer's estimation of the relative strength of correlation between the variable and the predictive value of the review data on the site. For instance, the density of the best reviewers on a site may be weighted more heavily than the number of venues referenced on a site. The resulted weighted numerical grades can be used to prioritize harvesting operations.

Harvesting Venue Reviews and Reviewer Data

The reviews may be harvested using web crawling techniques such as those described in U.S. Pat. No. 6,631,369, entitled "Method and System for Incremental Web Crawling" and assigned to IBM Corporation, which is incorporated herein by reference. According to that technique, in an initial crawl, the crawler creates a first full index for the document store after which incremental crawls are executed.

Alternatively or in addition, the system 100 may target cached web pages served by commercial search engines. A suitable protocol for rebuilding content sites from search engine caches is as follows. First, a complete venue listing for a category by crawling a directory such as a Yellow Pages or other suitable directory. For each item in the directory, the system 100 runs a series of search queries in various search engines, each query restricted to results for the content site of interest, such as dine.com. The search results are parsed and the URLs for the relevant cached pages are retrieved. The cached pages are then retrieved and in a repository, after which they are parsed based on the name, city, phone number, and other data fields associated with a venue of interest. In this manner the cached review page for the venue of interest may be identified. This process is optionally repeated across search engines and across multiple venues, targeting the sites prioritized as set forth in the preceding section, to collect the desired array of source data.

The data may optionally be validated by checking parsed venue or reviewer content for blank fields. Venue or reviewer content may also be checked against unique identification information (a venue phone number or a reviewer email address or screen name) to ensure sure that it corresponds to the target venue or reviewer.

After validation, the pages may be parsed to extract the data of interest. Parser code may be used to segregate out the structured fields of interest, the reviews, and other information of interest as described above. The extracted data may be uploaded in database tables or files to be analyzed for computing personalization. Techniques such, as those taught in U.S. Pat. No. 7,788,293, entitled "Generating Structured Information" assigned to Google Inc., the contents of which are herein incorporated by reference, may be used for this purpose.

The same approaches can be used to harvest data concerning reviewers or users (discussed in more detail below). The data is preferentially in a structured format on a public site and is predictive of personality and affinities. The data sources may be prioritized or ranked as set forth in the preceding section, such as according to the number of reviews, given by the reviewer, the citation of a reviewer's reviews on other sites and the alignment of a reviewer's reviews with overall ratings generated by the system 100 (as discussed below) and third party review sites from which data is harvested. The reviewer data is then selectively crawled and parsed as explained above.

The crawl and parser module 114 may be configured to coordinate the crawling and digestion of certain web or network nodes. Due to practical limitations the entire World Wide Web cannot be crawled and parsed simultaneously. The crawling and parsing process may be coordinated across different content-gathering computers or agents. Multiple remote crawling engines (at remote network nodes) may be deployed, each of which can check data sources (such as web pages or cached web pages) for the properties described above and recruit crawling and parsing nodes in the event rich data sources are located. The remote crawling nodes can coordinate their crawling based on real-time breaking news events, or optimize content gathering in response to shifts in mass user behavior as reflected in the data matrices described herein.

Figure 1B:
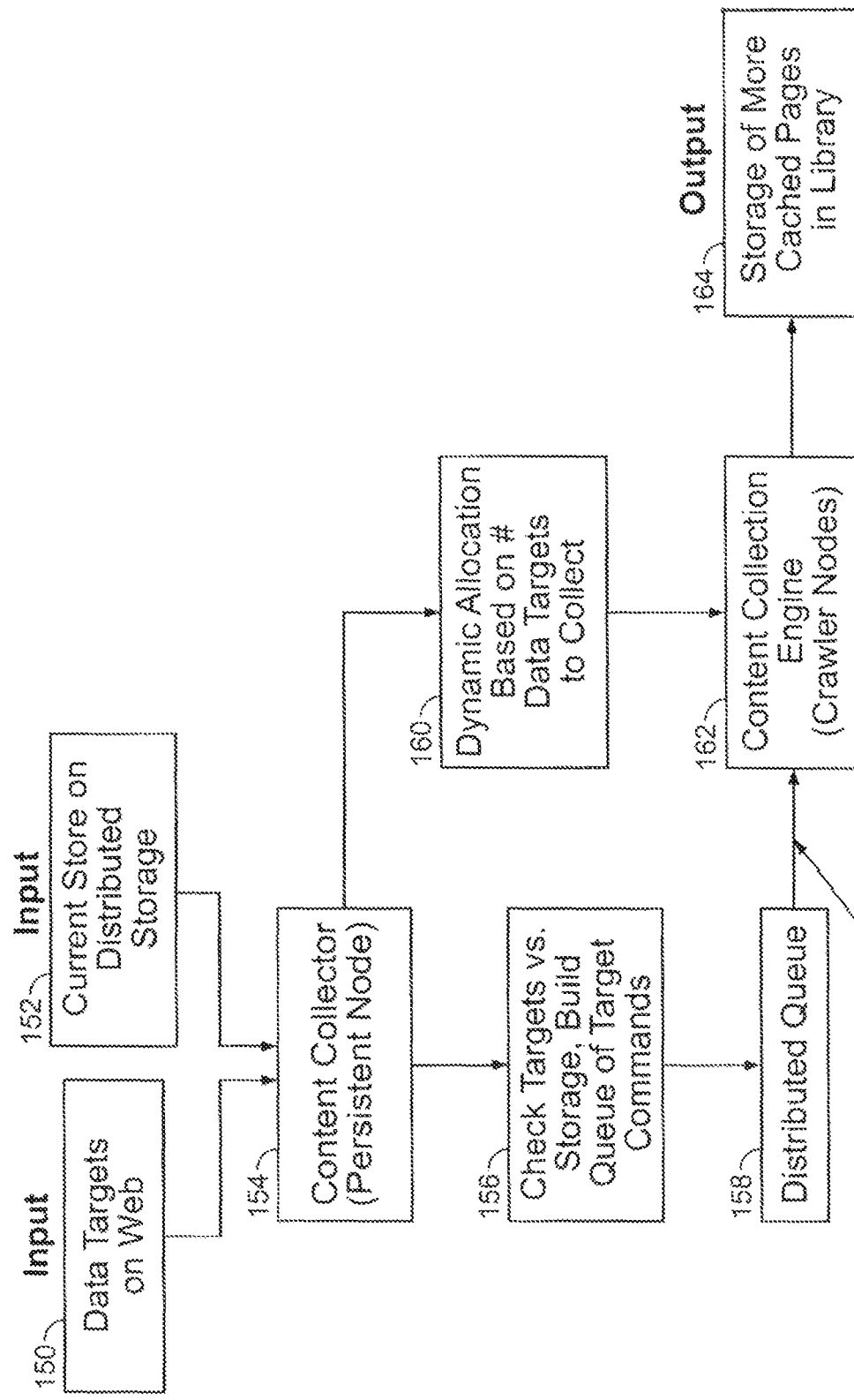
FIG. 1B is a diagram of a process flow executed by an exemplary content collection system.
Figure 1C:
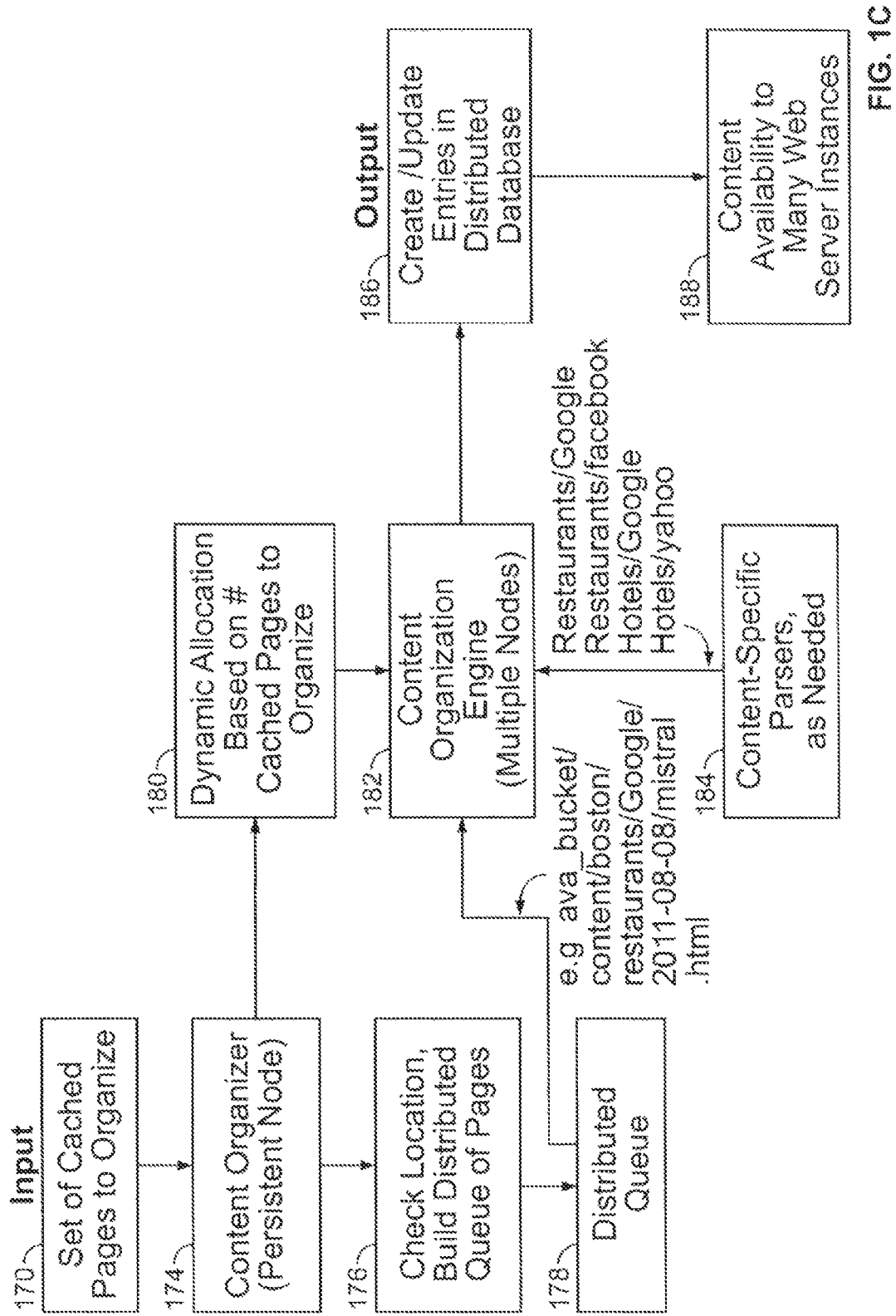
FIG. 1C is a diagram of a process flow executed by an exemplary content organization system.

Examples of content collection and content organization systems and process flows are shown in FIGS. 1B and 1C. FIG. 1B illustrates the process executed by the content collection system, which may include the crawl and parsing module 114. At box 150 the crawl and parsing module 114 identifies subject matter targets, such as rock-climbing, are needed in the neural network. The targets may also take the form of specific URLs or collections thereof. At box 152 the module 114 identifies the current content, in the form of previously collected web pages (or representations thereof), that already resides within the system's storage network. At step 154 the content collector, which in one embodiment takes the form of a persistent system network node, determines from a comparison and analysis of the two inputs which subject matter or URLs are to be gathered by the module 114. The content collector verifies the addresses and content of the target sites containing the subject matter which is to be collected and creates a queue of items to be crawled and parsed by the module 114. As an example, the distributed queue's first entry might be [Boston, restaurants, google.com, 'air] which corresponds to a request that the crawler nodes collect all cached pages associated with google.com's reviews of any Boston area restaurant. The content collector may also dynamically allocate certain queue items to specific crawling nodes based on their relative priority (160). At step 162 the content collection engine, which includes a distributed array of crawler nodes, receives or access the distributed queue and dynamically assigned collection commands from the content collector. The content collection engine, under the control of crawl and parsing module 114, collects cached web pages as discussed above. The output is a library of cached web content which is parsed according to the methods described herein.

FIG. 1C shows an exemplary process executed by the content organizer, which may comprise the matrix builder 116. At step 174 the content organizer receives or accesses the library of cached pages to be parsed and added to the network. The content organizer may be a persistent system network node in various embodiments. The content organization engine (see step 182) may include a distributed array of parsing nodes that access a distributed queue of parsing assignments and receive assignments which are dynamically assigned, optionally to specific crawling nodes or crawling nodes having certain attributes such as bandwidth or throughput. The content organization engine also accesses an array of site-specific parsers which are specially designed to parse data as it is presented on certain sites. For instance, because Google.com may present its hotel data in a format different than restaurants, a parser engine specific to Google's hotel pages is presented to the content organization engine for use in parsing corresponding cached web pages. Other examples, as shown in FIG. 1C include a parser specific to Facebook.com's venue or event pages. This architecture may facilitate modification of parser engines as sites alter the manner in which they present data. For example, Local.yahoo.com may alter the data format of its hotel pages, in response to which a single parser engine can be updated. The output of the content organization engine (182) is used by the matrix builder 114 to create additional nodes and matrices of interrelationships as described herein. The resulting matrices and databases of web content are presented for simultaneous access by multiple instances of web servers which present the user interface described below or which communicate with mobile device client applications as discussed herein.

Collection of User Data

Upon creation of an account or in response to another triggering event such as a request for a new recommendation the system 100 may require a user to input various data including gender, age, marital status, children ages, children gender, third parties with whom the user is socially networked, hobbies, interests, favorite venue information (in one or more venue categories), preferred or non-preferred reviewing entities (if any).

The user is then asked to list favorite or preferred venues. As an example, the user may list favorite restaurants. The system 100 asks for alternative favorites in the event the restaurant is not included within the neural network.

The system 100 optionally may crawl the web for additional information concerning the user and then parse and validate the data according to the methods described above. This supplemental data may be added to the user's profile, data from which will be used in various operations as set forth below. Further discussion of user data is provided below at least with respect to FIGS. 30 and 31.

Creating Nodal Interrelationships

Nodes in the data network represent venues, venue properties, users, user properties, reviewers, reviewer properties, and the like. Links or links represent relations between those nodes. The number of links between two items might therefore grow as data on two items grows. The strength of each link denotes the affinity between the two connected items, such as similarity of star rating (in a review of a venue), number of attributes held in common. Links can be either positive or negative in sign.

Figure 2:
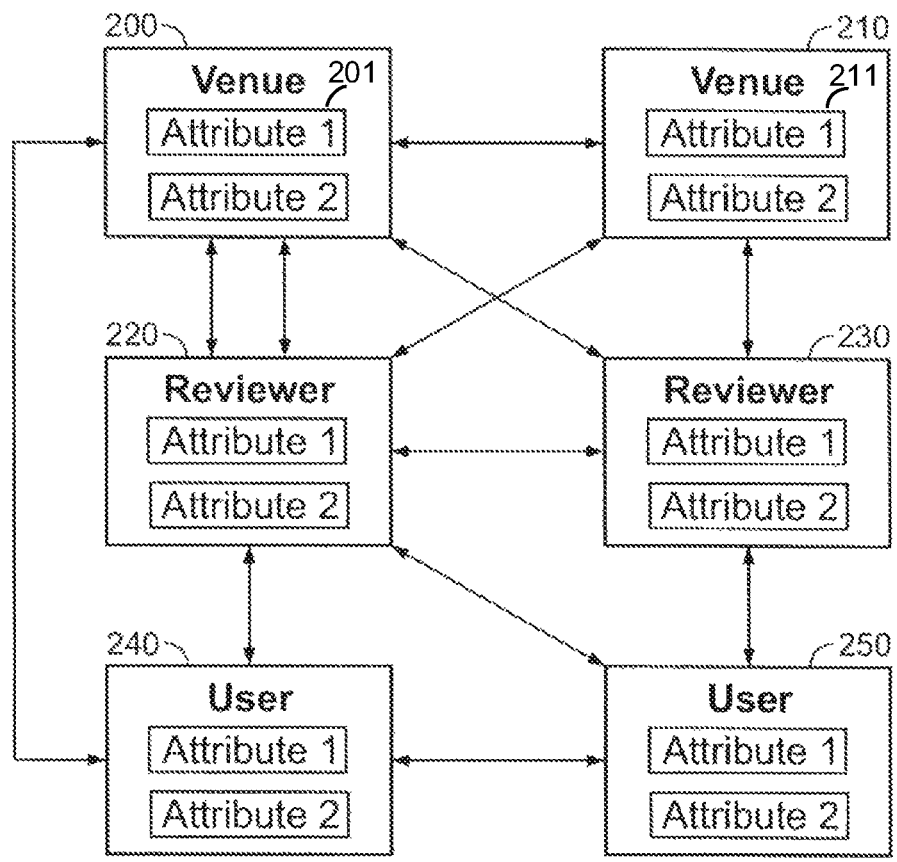
FIG. 2 is a diagram showing the interrelationships between venues, reviewers and users.

Links can be associated to designate affinity between and amongst, venues, properties of venues, users, reviewers, content sources, or any combination thereof. For instance, as shown in FIG. 2, two venues 200, 210 may be interrelated in that they have several attributes 201, 211 in common, namely that they are both Italian restaurants in the same neighborhood. Reviewers 220, 230 are related in that they likewise have multiple attributed in common. Users 240, 250 are likewise interrelated by shared attributes. Reviewer 220 is interrelated with both venues 200 and 210 in that Reviewer delivered a review to both venues and that in turn creates an additional relationship between venues 200 and 210 (namely, they were reviewed by the same reviewer. User 250 is related to both Reviewers 220 and 230 via shared attributes and User 240 is related only to Reviewer 220 via the shared attributes. Reviewers 220 and 230 are thus interrelated also in that they share attributes of user 240. User 240 is also directly linked to venue 200 by virtue of the fact that the user has expressed an affinity for that specific venue. Reviewers 220 and 230 thus have a second order relationship with venue 200 through user 240.

This data architecture permits links, or interrelationships, to be adjusted independently from one another. Links touching the same node can be adjusted for one partner node but not others. Links on the same node can be "scaled" together to maintain relative values of each of their partners while changing the overall drive/influence to that node.

In selected embodiments, subtractive or "anti-related" links can weaken relationships from one node onto another. Subtractive nodes also can be added to the network to normalize the total positive timbre of local nodes where the average link values are too strongly positive. Subtractive nodes also can serve to mediate competition between nodes to influence one another, as the strength of the link dictates the effect one node will have on the other. Subtractive nodes can help sharpen, or focus, the positive influence cast by a given node.

Links can in various implementations be sorted according to priority of influence over (or strength of link to) their downstream node. Links may interact and influence one another, where the addition of one changes the strength or presence of another, in a manner that is restricted or targeted to other links on the same node.

Links from reviewer nodes can be normalized based on how positive or negative they are. In other words, if a given reviewer is an "easy grader" his or her reviews may be lessened in magnitude to normalize the reviews to a statistic goal or mean. Links from reviewer nodes may also be normalized to lessen the influence of those links where, for instance, a reviewer has an extraordinarily high number of reviews (each of which creates a link) and thus that single reviewer's opinion would unduly influence the data network if not scaled appropriately. Conversely, the strength of a reviewer link make by scaled upwards based on measured or perceived effectiveness or accuracy of the reviewer. This may be executed, for instance, through rankings or ratings of reviewers or statistical feedback whereby accuracy or predictiveness of reviewers is measured.

Weighting or normalization may also be used to alter a link's strength based on the number of attributes in held in common. For instance, the system 100 may be configured to give each additional link of a given type a linearly or exponentially decreasing affect, such as where a substantial number of interrelated reviewers given a venue a similar review. Links between nodes which are hyper-connected may be likewise be scaled downward to reduce the effect that one of the two nodes has on the extended network. The converse—giving cumulative links escalating effect or increasing link strength for under-connected nodes—may also be implemented with the opposite effects.

Links may also be weighted based on the predictiveness of the reviewer. For instance, reviewers may be graded based on number of reviews, number of citations on other web sites, or ratings of reviewers on third party sites crawled by the system. The links created based on each reviewer's reviews may accordingly be scaled linearly or non-linearly according to the relative grade of the reviewer. Reviews provided by more highly rated reviewers may be assigned correspondingly higher values or strengths.

Reviewers may be weighted on a user-specific basis as well. For example, the neural network of links may be reweighted based on the fact that the user requesting a recommendation has affinities or attributes held in common with certain reviewers. Reviewers' ratings may be correspondingly weighted more heavily or more lightly in correspondence to the link between the user and the various reviewers.

Reviewers may optionally be pruned from the network if they have below a threshold level of relevance as measured by a corresponding grade or effectiveness. As noted elsewhere herein, the grades of reviewers may be based on ratings of reviewers at third party sites and/or feedback of users of the system 100 concerning agreement or disagreement with recommendations which were calculated in part based on a given reviewer's review. If a reviewer is pruned from the system the remaining reviewer's weightings may be adjusted upwards to maintain normalization.

The links in the neural network may be bidirectional (as shown in the figures) or unidirectional. In certain circumstances, the predictiveness of a link may be asymmetrical or unidirectional. For example, it may be the case that almost everyone who likes restaurant A likes restaurant B, but very few who like restaurant B also like restaurant A. In that case the links associated with affinity for restaurant A may unidirectionally point to (be linked to) restaurant B but the converse would not be true—node B would not have a positive link to restaurant A based on this data point. For simplicity of illustration the figures address the simpler scenario wherein all data points are symmetrical but in various implementations some or all of the links are unidirectional or have asymmetric strengths (such as +1.5 in one direction and +0.5 or −0.5 in the other direction).

The data network may be refined based on an active feedback loop from concerning the effectiveness of the recommendations provided by the system 100. Links can be refined (in either direction) based on feedback for how effective the recommendation was. One measure of the effectiveness of the recommendation is whether funds were spent by the user based on the recommendation, which in turn might be measured via data provided by partners such as financial transaction card issuers. Another measure may be feedback provided by the user in response to a query or survey concerning the recommendation or venue in question. Yet another measure of recommendation effectiveness is a user's browsing behavior and the fact that the user left a positive review for the recommended venue on a third party site (which review is collected and parsed as set forth above). Still another technique to assess effectiveness of a recommendation is geographic dwell time at a physical location associated with a venue as measured by mobile device GPS data, for instance.

It should be noted that not only first order connections are updated based on feedback. Rather, in various implementations second and higher order connections are optionally updated based on feedback. For instance, when a reviewer's ranking or grade is updated the second order connection between two restaurants which are both liked by the reviewer is updated or correspondingly modified as well.

Mismatch between the recommendation and the user's evaluation can drive a reduction or weakening of the links between the associated nodes and the converse could also be executed. In response to positive feedback between a reviewer node's recommendation the links between that node and neighboring nodes may be strengthened. Similarly, links created by the reviewer's reviews may be assigned a greater strength.

The nodal structure facilitates computations and scaling of the network. As will be seen, the nodal network creates a natural look-up table that is convenient to search and operate over. The nodal structure with inter-node links of varying types provides a convenient way to update the structure as new pieces of information are added, and in certain embodiments this is executed without losing the original information as in traditional databases that represent affinity as single number weights between items. The data in various embodiments is represented as either an indexed rows of databases, linked lists, or distributed files.

The matrix of interrelationships or links can be broadly categorized as content-based interrelationships, collaborative interrelationships and content-collaborative interrelationships. The first type, content-based links, are in certain embodiments premised on venue attributes for multiple venues reviewed by same reviewer. The content-based links establish interrelationships between venues based on shared attributes. The strength of the link (or anti-link) is dependent on the number of things held in common, comparative ratings and other factors as described herein.

Collaborative venue interrelationships associate venues that are liked by same reviewer, often without any dependency or relation to the reason(s) why the reviewer likes the venue. The strength of the link (or anti-link) is dependent on reviewer rating, proximity on same list, and other factors described herein. Collaborative links arise when two venues co-occur, for example, in the same person's list of favorite or preferred venues, on the same "top 10" or other grouping lists on ranking or recommendation sites, or on the same search engine search results. Proximity within the list may be used as a variable to control link strength. Ant trails may also be used to create collaborative links by tracking people's surfing behavior and linking venues a given user often visits, independent of spiderwebbing. In this way, restaurant A may be deemed interrelated to museum B if many tracked users visit both of those sites, the user's dwell time at each site or the fact that a user left a rating or review may also factor into whether a link is created. In certain embodiments, this tracking is accomplished without the use of cookies, rather by collecting from the web data concerning the user's activities on rating and review sites according to the techniques described elsewhere herein.

Content-collaborative interrelationships or links arise from common (or anti-common) reviewer attributes for reviewers who liked (or disliked) the same venue. The venue attributes may be analyzed for common or anti-common features and links may be established between either a specific venue and reviewer attributes or between venue attributes and reviewer attributes. The strength of link may depend on the incidence of an attribute among reviewers giving venue a certain grade or similar comparative ratings.

The exemplary architecture illustrated in FIGS. 3-12 facilitates in certain embodiments dynamic updating and adapting of the network. For example, when a new restaurant or review is added to the network, those nodes each create first, second and higher order links which are added to the network. The affected links can be updated by a relatively computationally simple (and non-resource intensive) addition or other arithmetic operation and the neural network need not be substantially entirely recalculated or reformed.

Generating Recommendations

Either the system or users may trigger the recommendation engine. The users may do so by entering through a web portal, client application or electronic message a request that a recommendation be generated based on provided venue attributes such as type, geography or price. The system 100 may access a user profile to collect data from the user profile such as other venues liked, gender, profession, or age. The system 100 may also automatically generate recommendations for inclusion in electronic messages, such as text messages or email messages, sent to targeted users or for presentation on a web portal or client application accessed by users.

The recommendation engine responsively identifies the venues with strongest links according to the following protocols in selected embodiments. Based on the identified "liked venue(s)" the system 100 identifies the top N venues that have strongest link value to that the identified venue and which have the specified venue attributes. Alternatively or in addition, based on highest rated venue(s) having specified attributes the system 100 identifies the top N venues that have strongest link value to that the identified venue. Still another alternative which can be used alone or in combination with the foregoing is to, based on the highest rates venue(s) having specified attributes and being recommended by friends or selected reviewers, identify the top N venues that have strongest link value to that the identified venue. The recommendation engine may also generate recommendations based on the user's attributes, for instance by identifying the top N venues that have strongest link to user attributes.

Further, in selected embodiments a recommendation threshold at which the nodal link strengths have to cross may be implemented such that the recommendation engine will not recommend venues with link strengths below the recommendation threshold.

In certain embodiments, a plurality of these techniques are used and resulting venue recommendations are weighted based on empirical observations concerning the predictiveness or accuracy of each protocol. The weight factors may be simple coefficients or first, second or higher order equations.

In the case of recommendations provided for a group of users, these same techniques may be used but with the modification that the user attributes are selected to match the group, either by direct user input or by arithmetic blending or averaging the user attribute values to arrive at a composite group user profile.

Recommendations may also be provided based on real-time location information, such as that provided by smartphone GPS data. As described more fully below, the system 100 may send an electronic message or alert either including a recommendation based in part on the location and/or time or prompting the user to access an interface to receive the recommendation. For instance, if a user is known to be proximate to a theater shortly before a show which the recommendation engine ranks highly for that particular user the system 100 may generate an electronic alert to the user including the recommendation, a hyperlink to the system 100 web portal, or a link to active a client recommendation application which can launch the interface described herein.

Alerts or recommendations may be accompanied by, and be generated based on, promotional offers related to the venues. For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen links nodes associated with promotional offers and thus the engine will factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

EXAMPLE

FIGS. 3-12 illustrate one simplified implementation of the recommendation engine described herein. Those skilled in the art will understand that this example can be extended to incorporate any or all of the additional features described herein. Selected of these substitutions and extensions will be mentioned below and those explanations are not intended to be limiting.

FIG. 3 shows an exemplary matrix of reviewer ratings. Reviewer 1 has provided reviews for nine out of the twelve restaurants, the ratings spanning from one star to five, five being the highest. Reviewers 2-7 have likewise each provided ratings for a different subset of the twelve restaurants. In other embodiments the venues could be venues of different types, such as four restaurants, four night clubs and four theaters. The ratings may use a wider numerical or alphabetic scale, integer or non-integer.

FIG. 4 shows the corresponding matrix of attributes for the venues of FIG. 3. In this example each restaurant is in Boston, Massachusetts and the price varies on a ten point scale. Attire is assigned alphabetic codes (formal and casual), although numeric codes are used in certain embodiments. Zip codes are used as neighborhood values in this example. The hours of operations is assigned a code selected from a predetermined library of operational hours and in other embodiments the hours of operation is provided various fields, one for each day of the week.

FIG. 5 shows the reviewer attributes for Reviewers 1-7, as shown in FIG. 3. In this example, reviewer attributes are limited to gender, age, profession, education, marital status, number of children, number of reviews, and review accuracy. The codes may be selected from predetermined libraries. The number of reviews is based on the data collected as described above. The review accuracy may be calculated based on the feedback control data as discussed above. Alternatively, a composite reviewer grade may be used which optionally factors in number of reviews, citations of reviews on other sites, number sites hosting reviews and/or consistency of recommendation with positive user feedback.

FIG. 6 is a chart showing an array of user attributes for seven users. The methodology is similar to that set forth above for reviewers but additional or different data fields are used for the users. In this embodiment, each user is asked for four favorite venues. In other embodiments, a list of preferred venues in various different venue categories is included in the user profile. This user data, as noted above, may be input by each user and/or collected from web data sources in the manner set forth above.

FIGS. 7A and 7B are an array of content-based venue links based on the venue attributes of FIG. 4. Restaurant 4 has one link with Restaurant 2 associated with common attire. The value of the link, +0.25, is less than the other links such that it has a lesser impact on the recommendation, as will be seen. In other words, the link is relatively weak. Restaurant 4 has three links with Restaurant 1, +1.25 associated with the common neighborhood, +1 based on the common genre and +0.25 based on the same attire. The net value of the content-based links between links Restaurant 4 and Restaurant 1 is +2.50. This matrix could optionally include links associated with a plurality of additional venue attributes and could also include anti-links, or negative links, associated with anti-common properties as will be illustrated in connection with FIG. 8.

FIGS. 8A and 8B are a matrix of collaborative venue links based on the reviews set forth in FIG. 3. Taking as an example the association between Restaurant 7 and Restaurant 3, there is a +1 link associated with the fact that Reviewer 2 rated both of these restaurants as four star. Restaurants 6 and 7 are given a stronger positive link based on common positive reviews because Reviewer 3 rated both restaurants as five star. Returning to the link between Restaurant 7 and 3, an anti-link of –0.75 is assigned based on the opposite affinity for these restaurants expressed by Reviewer 1 (who gave the Restaurant 3 four stars and Restaurant 7 one star). A higher negative magnitude could be used where a review rated restaurants in a more strongly opposite manner (i.e. one star and five star) as shown in the link between Restaurant 11 and Restaurant 5. There a –1.00 anti-link is shown based on the one star/five star ratings of Reviewer 5. As noted above, a greater array of different links could be assigned based on commonalities or anti-commonalities—these are merely representative.

A matrix of content-collaborative interrelationships (not shown) may reflect links arising from common or anti-common features between each venue and each reviewer. For example, reviewers may have a characteristic called "genre affinity" and when that matches the venue genre a link of predetermined strength may be created. Additionally, the content-collaborative matrix may show links between affinity for a venue and reviewer attributes. In that example, common attributes among reviewers who rated a venue highly are linked to the venue. For instance, reviewers aged 31-35 may disproportionately rate a venue poorly, in which case an anti-link is created between the venue and the reviewer attribute "age 31-35."

FIG. 9 shows illustrative outputs of the recommendation engine based on a query for a recommendation for an American restaurant and a user affinity for Restaurant 7 (taken from the subject user's profile of FIG. 6). In other embodiments more inputs may be used, such as venue attributes and other preferred venues. In this example the recommendation is a blending of the content-based link strength 901, collaborative link strength 903, and content-collaborative link strength 905. Each link strength is assigned a distinct weighting factor 902, 904, 906, although in other embodiments the blending equation is a second order or higher order equation rather than a first order sum of products. The values 910-914 derives from the fact that Restaurant 3 and Restaurant 7 have no link shown in FIG. 7. The same is true for Restaurant 6/7, while Restaurants 9/7 and 12/7 show a +0.25 link. Similarly, the matrix in FIG. 9 shows the cumulative link strengths 915-918 for restaurant links 3/7, 6/7, 9/7 and 12/7, respectively. The content-collaborative link strength are based on the content-collaborative link matrix (not shown). The weighting factors 902, 904, 906 are constant but may be set to vary according to the predictiveness or accuracy of each type of link (based on feedback control as discussed above). The resulting recommendation values 920-923 reflect the overall link strength 907 between each restaurant and restaurant 7 as shown above. Second order relationships could also be included in the link matrices used to calculate overall link strength. For example, Restaurant 8 is liked by both Reviewer 4 and Reviewer 5. Those reviewers, in turn, both like Restaurant 5. Restaurant 5 could be assigned a direct +0.25 link to Restaurant 8 based on this second order relationship. That link could operate in the matrix independently of the nodes associated with Reviewer 4 or Reviewer 5.

An alternative form of second order relationship is shown in FIG. 10. FIG. 10 illustrates second order links arising, from collaborative venue links. As shown in FIG. 8, Restaurant 8 is positively linked to both Restaurant 3 and Restaurant 5, so a +0.25 link is created directly between Restaurants 3 and 5. Restaurants 12 and 7 are both negatively linked to Restaurant 8 so a +0.15 link is created to reflect the belief that this anti-link is weaker than the positive link previously mentioned. In a similar vein, an even weaker second order link is established between Restaurants 11 and 12 because while both are negatively linked to Restaurant 8 the links are substantially different in magnitude.

These second order relationships can be added directly to the related matrices or otherwise computationally combined when calculating overall link strength between two nodes.

FIG. 11 shows an arbitrary set of link values in a more complex system that factors in a wider variety of links (such as second order links) across the same nodes. It can be seen that the values are strongly positive and few values are negative. This can be observed where the data has a skew associated with reviewer tendency to give generous ratings, for instance. If the data of FIG. 11 is content based it may have a skew different than parallel matrices for collaborative links or content-collaborative links. Accordingly, it may be useful to normalize the data of FIG. 11 to facilitate computational combination with links in the other matrices.

FIG. 12 shows the data after an exemplary correction operation. In this example, a constant value of five was subtracted from all data points. In other embodiments, the value subtracted may be selected such that the data set hits a common or desired mean or median.

In other embodiments normalization is accomplished by multiplication or division, For example, a certain percentage may be subtracted like a tax from affected links by multiplying the link strengths by (1-X), wherein X is a tax rate from 0 to 1. The tax rates in this approach may be progressive to accommodate the tendency of users and reviewers to aggregate toward a small number of more popular venues, which as discussed herein can cause those venues to cast too large a shadow or have an undue influence on the remainder of the neural network.

It should be noted that normalization can occur at local level or at the network level. At the local level, all links connected to a certain nodes may be normalized or all links coming to or going from a certain node may be normalized (recalling that links may be unidirectional or asymmetric). Alternatively, normalization may occur at the data matrix level. For example, content-based link matrices may be normalized or other data subsets of network may be normalized.

FIG. 13 shows another form of higher order connection, connection creep. In this example the link between Restaurant 10 and Restaurant 1 in FIG. 12 is considered too high in that it might have an undue influence on the connected nodes. Accordingly, 1.5 of link strength is subtracted from link 10/1 and 0.5 is added to the less strongly positive links 10/2, 10/7 and 10/8. No portion of link 10/1's strength is reassigned to link 10/9 because it is already above a predetermined threshold above which links are not to have connection creep bonuses added or above which no higher order links should be added.

User Interface

Figure 14:
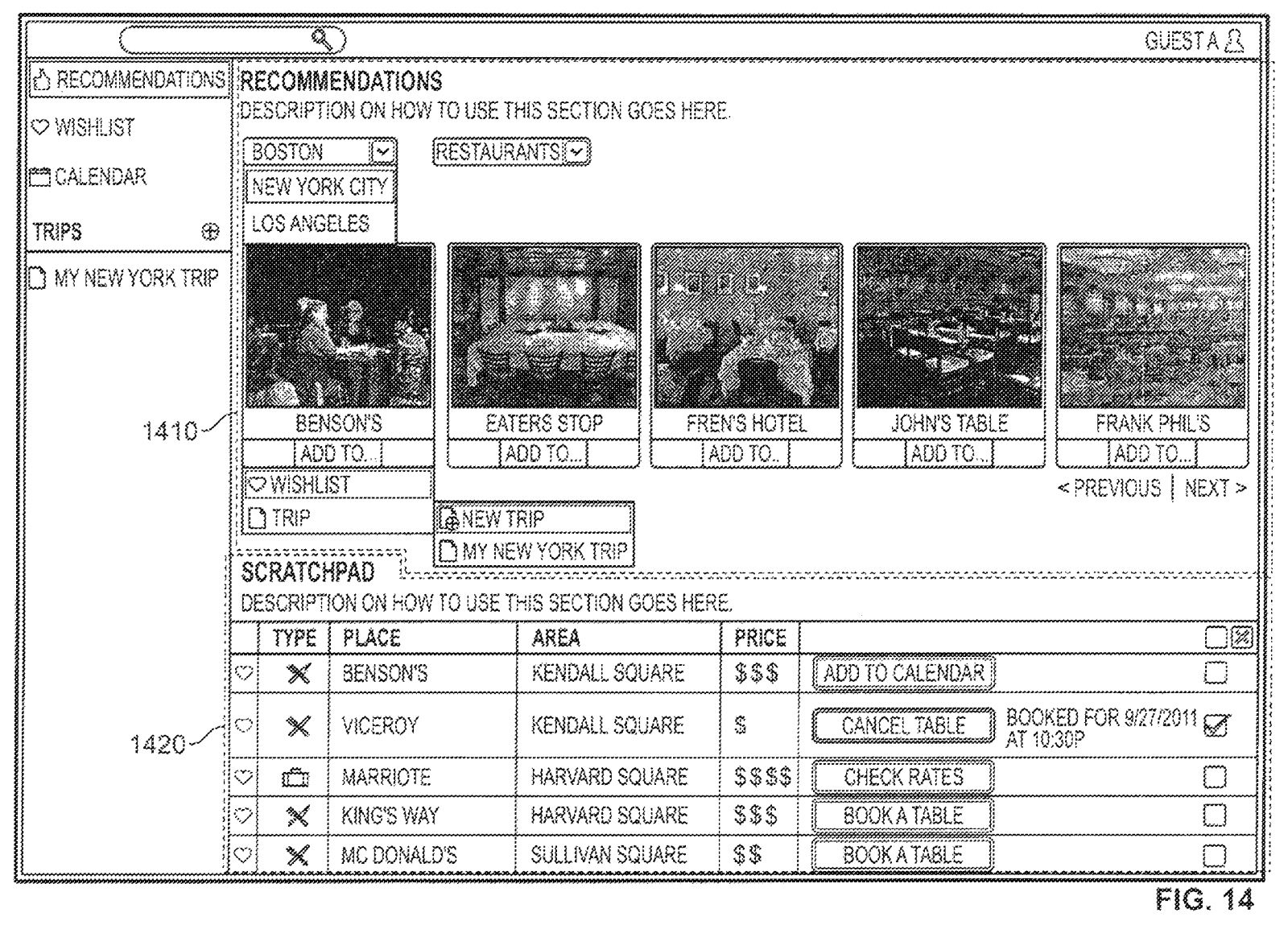

FIG. 14 is an exemplary user interface for deployment at a web portal or client device such as a desktop computer, smart phone, tablet PC, automotive multimedia interface or other mobile computing device. The server or local application provides an evolving personalized brand logo and personalized audio soundtrack to match the displayed itinerary. The sound track may persist and "travel" with the user as he or she navigates different functionalities or pages through the interface. The interface is also designed to provide bio-visual data feedback to the user. The system permits users to state their goals and intentions based on the feedback they have received from the system.

FIG. 14 is an overview page that provides users with an immediate perspective on options, a space for collection/comparison/pre-screening/deliberation, and the ability to immediately act. Specifically, the overview page has three distinct sections and functionalities.

First, at the recommendation panel 1410, a plurality of recommendations are presented. In preferred embodiments, there are five recommendations provided as shown in FIG. 14. In other embodiments, two to seven, three to six, four to six, four to eight, four to nine, or two to ten recommendations are provided. The number of recommendations may be on a per-venue basis so that five recommendations are provided for restaurants and a like number of hotels are recommended. Alternatively, a lesser number of complementary venue (e.g. hotel) recommendations are provided.

Second, the collection and comparison panel 1420 provides a place to compare and contrast recommendations of interest. The panel provides venue genre or type, the venue name, geographic area, and price. The panel also provides buttons to book a reservation or check availabilities or rates for the various venues. Buttons for adding the event to the Ava calendar (discussed below) are optionally provided adjacent each venue. Also provided are status identifiers indicating the current state of activities and/or bookings for each venue. Optionally, buttons may be provided to launch a window or image that depicts the venue on a map.

Third, the calendar panel (not shown) will feed or import a view of the user's personal Ava calendar and provide interactivity for immediate assessment of the user's schedule and available times. The calendar permits import of the user's other appointments and export of the Ava calendar items to any third party calendar systems such as Outlook, Google, and iCal.

These three panels are arranged down the page so that decision-making flows down the page from menu of options (top), to deliberation and comparison (middle), to arriving at a decision, and finally to scheduling/booking/publishing/sharing/taking action (bottom). This arrangement may in certain embodiments facilitate decision-making.

A user can directly book a recommendation at any of these three stages, or add to calendar at either of the first two stages. This arrangement may in certain embodiments enhance the likelihood that a user makes reservation or booking based on the recommendations.

Additional optional functionalities (not shown) include a transportation reservation interface. For example, the interface may present a transportation button that launches an booking or reservation portal which communicates with a third party transportation provider, such as a taxi service, and makes a reservation corresponding to a restaurant or other reservation. The interface may also permit the arrangement of transportation services between and amongst a plurality of other recommended events spanning one or more days.

In similar vein, booking functionality may be provided for a variety of complementary venues, services or activities. Examples include hotel rooms, airline reservations, movie tickets, theatre tickets, museum tickets, music tickets, sporting events, product delivery (such as flowers), real estate services, or moving services (such as inter-city packing and transportation services).

The interface may selectively suggest alternative actions or venues based on a first booked venue or action. For instance, the booking of a restaurant reservation may prompt the generation of night club or theater recommendations. As another example, the booking of a real estate tour through a real estate agency may prompt a recommendation for moving services. Subsequent bookings may in turn generate additional recommendations complementary to the most recent booking, the earlier booking, or both.

These follow-on recommendations may be filtered and selected according to the techniques set forth above. In particular, the recommendations may be function of the user's profile, attributes, venue preferences, past booking behavior and/or previous feedback concerning certain venues. For instance, the recommendations may be filtered as set forth above according to the user's most recent reservations and the user's expressed preferences for given venues that are linked to potential secondary or tertiary recommendations.

Recommendations may also be provided based on real-time location information, such as that provided by smart-phone GPS data. The system 100 may send an electronic message or alert either including a recommendation based in part on the location and/or time or prompting the user to access an interface to receive the recommendation. For instance, if a user is known to be proximate to a theater shortly before a show which the recommendation engine ranks highly for that particular user the system 100 may generate an electronic alert to the user including the recommendation, a hyperlink to the system web portal, or a link to active a client recommendation application which can launch the interface described herein.

Alerts or recommendations may be accompanied by, and be generated based on, promotional offers related to the venues. For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen links nodes associated with promotional offers and thus the engine will factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

Users may be provided a profile page or "my account" page that provides analytics on that data and any other data collected or contributed to provide perspective and insight into behavior. The page provides a feedback mechanisms to the user that is "habit honing" in that analytics on self activity is provided in a visual format. For example, the page may present graphical trends of actions within customizable goal categories such as health (gym, yoga), family (museums, travel, dining), and errands (dentist, mechanic, groceries). Based on user defined goals, the overview page suggestions can be featured to highlight relevant activities to fill existing calendar time-slots.

The interface may also provide other prompts to facilitate action and hone habits. For example, the interface may provide cues and triggers embedded in mobile device applications to cue initiation of plans and transitions between scheduled events. For instance, the mobile client application may trigger chimes upon next scheduled event, music to reduce anxiety surrounding errands, tailored music transitions upon the occurrence of the next scheduled event, or visual (blinking LED) cues upon next scheduled events.

The interfaces described herein may be presented, as noted, through a variety of devices. Still additional devices are contemplated, including television screens, third party websites (through partnerships), in-store kiosks, or personal keychains or dongles.

Bio-Visual Personalized Feedback

The user interface described above presents a plurality of recommendations to the user based on a user search query thereby allowing a user to pick various venues and/or add them to a calendar. However, based on this view, a user may not fully grasp the interrelationships between the venues that led the recommendation engine 112 to recommend the venues in the first place. Further, as long as the recommendation engine 112 is providing recommendations to the user, the user may not have as much of an incentive to provide more information to the system 100 thereby enabling an enhanced neural network topology that will provide better recommendation results.

To ensure a better user understanding of the nodal links between venues within the neural network topology and to provide motivation for users to input more information into the system 100, an additional bio-visual personalized feedback interface is provided to users of the system 100. Through the bio-visual feedback user interface, the user is able to view an overall network topology of various nodes within the system 100 and the interconnections therebetween thereby allowing users to grasp the nodal link strengths and relationships between venues.

The bio-visual feedback interface is a two-dimensional interface that provides an overhead aerial "bird's eye" view of the network topology presented topographically in an easy to understand manner. For instance, at the highest level, a topographical view of the system may depict clusters of nodes in various regions with some node clusters being venues of interest to the user based on previous recommendations and/or nodal interrelationships having strong overall link values and other cluster areas may include nodes known to have low overall link scores or, in other words, nodes that would be bad recommendations to the user. To enhance the understand of the user, nodal clusters having nodes that would be strong recommendations for a user or nodes that have previously determined to have been effective to the user can be displayed in hot colors, such as red or orange, whereas other nodal clusters having poor recommendation choices can be displayed in cold colors, such as blue or purple. Nodal links may or may not be provided at this level to give the user an understanding of how various nodes are linked to each other.

The topographical view of the nodes can further be enhanced via contour mapping features. Accordingly, certain areas of the clusters which include strong nodal links therein can be presented in an "elevated" contour with a different color mapping than venues with lesser overall link strengths positioned in lower elevations. Further, nodes having antilinks with other nodes may be positioned farther apart in the aerial view and have dotted links to indicate the negative link strength therebetween. Further, nodes that do not have links to other nodes may be placed apart from the nodal clusters to represent their independence from the other nodes of the neural network.

Figure 15:
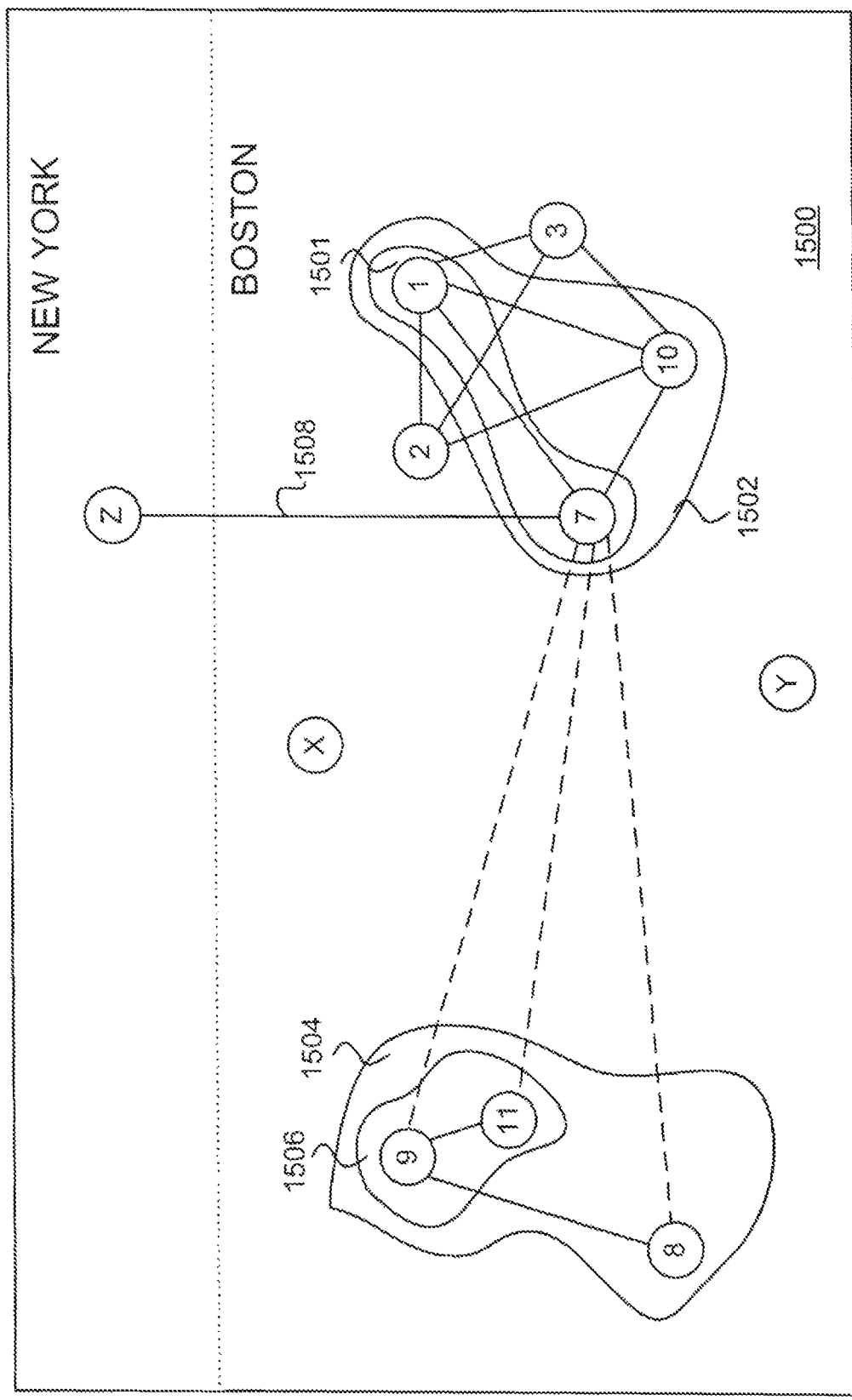
FIG. 15 illustrates a topographical world view user interface displaying the neural network topology according to one example.

FIG. 15 illustrates an exemplary bio-visual personalized feedback user interface using a topographical contour mapping system based on a user search query for Restaurant 7. As illustrated in FIG. 15, the neural network topology, or neural network "world" view 1500, includes nodes representing Restaurants 1-3, 7-11 and Restaurants X and Y. Restaurants 1-3 and 7-11 are the same Restaurants illustrated in FIG. 4 and therefore have the same venue attributes, content-based relationships, collaborative relationships and content-collaborative relationships as described above with respect to at least FIGS. 5-9. Accordingly, the links shown between the nodes are in accordance with the content-based venue links and collaborative venue links identified in FIGS. 7 and 8. Restaurants X and Y represent two venues that are not linked to any other venues within the neural network. In selected embodiments, the world view 1500 represents the "highest" aerial view the user can obtain via the bio-visual feedback user interface.

As described above, Restaurants 1-3 and 10 represent a cluster of venues having strong overall link strengths with Restaurant 7 and as such may be represented using hot colors. Restaurant 7 itself may be indicated in a neutral color to identify that it is the restaurant expressed in the search query by the user. Further, Restaurant 7 could be displayed larger than the other nodes in the topology depicted in FIG. 15 to identify it as a restaurant that was part of a search query. Restaurants 8, 9 and 11 may be depicted in cold colors as they have low recommendation values based on low overall link strengths with respect to Restaurant 7. Further, as illustrated in FIG. 15, the links between Restaurant 7 and Restaurants 8, 9 and 11 are dashed as they represent antilinks having negative overall link strengths.

FIG. 15 further includes elevated contour zones 1501, 1502, 1504 and 1506. These topographical contours represent elevated nodal areas containing nodes having strong overall link strengths with a node or nodes included in a search query. Accordingly, contour zone 1501 includes Restaurant 7 and Restaurant 1 and is depicted as having the highest elevation as Restaurant 1 has strong content-based and collaborative venue link strength. Further, contour zone 1502 has a median elevation and includes Restaurant 10 which has a higher overall link strength with Restaurant 7 than Restaurants 2 and 3 but has a lower overall link strength than Restaurant 1. As Restaurants 2 and 3 have the lowest overall link strengths with Restaurant 7 when compared to Restaurant 1 and Restaurant 10, they are depicted at the lowest elevation or "ground" level. Therefore, contour zones 1501 and 1505 provide the user with an easy-to-understand view of restaurants that would be good recommendations with respect to Restaurant 7. On the hand, contour zones 1504 and 1506 represent elevations containing nodes that would be bad recommendations as contour zones 1504 and 1506 contain nodes having lower overall link strengths with respect to Restaurant 7. For instance, contour zone 1506 includes Restaurant 9 and Restaurant 11 which have comparable negative overall link strength values with respect to Restaurant 7 but that are elevated higher than Restaurant 8 as Restaurant 8 has a lower negative overall link strength value with respect to Restaurant 7. Accordingly, alternatively from the depiction of Restaurants 2 and 3, the lowest elevation or ground level may be depicted via a contour zone.

The system 100, as illustrated in FIG. 15, can also display links to nodes in other locales. For example, in selected embodiments, the world view 1500 may include different locales such as New York and Boston. As such, link 1508 identifies a connection between Restaurant 7 of Boston and Restaurant Z of New York. The link between different locales may be represented in various manners such as a squiggly line in order to indicate to the user that the link represents a connection to a different area. Further, as the line is solid and not dashed it represents a positive overall link strength between Restaurant 7 and Restaurant Z as described above. While not shown, New York will likely have its own neural network topology with corresponding contours and internodal connections. Accordingly, the bio-visual personalized feedback user interface provides the user with the ability to quickly identify restaurants in different locales that may be strongly connected to known restaurants in the users location. In other words, if the user is planning on traveling to New York he can "virtually travel" over transit link 1508 to determine restaurants in New York that he may want to visit based on their relationship with Restaurant 7.

To further aid the understanding of the user upon a close or cursory inspection of the bio-visual feedback user interface, the contour zones may also be colored using hot or cold colors based on overall link strength with respect to a designated restaurant. The more information the system 100 contains, the more detailed and comprehensive contour map can be provided to the user. Accordingly, by interacting with the bio-visual feedback user interface, the user is motivated to provide more information to the system in order to discover new avenues of connectability with respect to the nodes of the neural network topology. This in turn enables the system 100 to provide more accurate information to the user for future recommendation requests.

In addition to viewing network topology via the bio-visual feedback user interface, the user may interact with the nodes in order to redefine and redisplay the neural network image. For instance, world view 1500 identifies the neural network topology with respect to Restaurant 7 but the user may designate, via a mouse, speech or other input device, another node in which to view the network topology. The system 100 will then recalculate the overall link strengths as previously described herein and will redisplay the world view 1500 based on the newly designated node. Therefore, the bio-visual feedback user interface allows the user to easily grasp interconnections between a variety of different nodes and to realize an expansion of internodal links based on input provided by the user.

While FIG. 15 illustrates a world view 1500 representation, the system 100 also allows the user to zoom into lower levels of "aerial coverage". Accordingly, if there are too many connections between nodes in various clusters, the user may not be able to fully grasp specific connections between specific nodes. Therefore, the user can zoom in on a particular portion of the world view 1500 to see more granular arrangements of nodes and connections therebetween. The user may zoom in by clicking a magnification button (not shown), by right clicking a specific node which pops up a dropdown menu having an option to zoom in with respect to that node, by speech, touch or any other method as would be understood by one of ordinary skill in the art.

Figure 16:
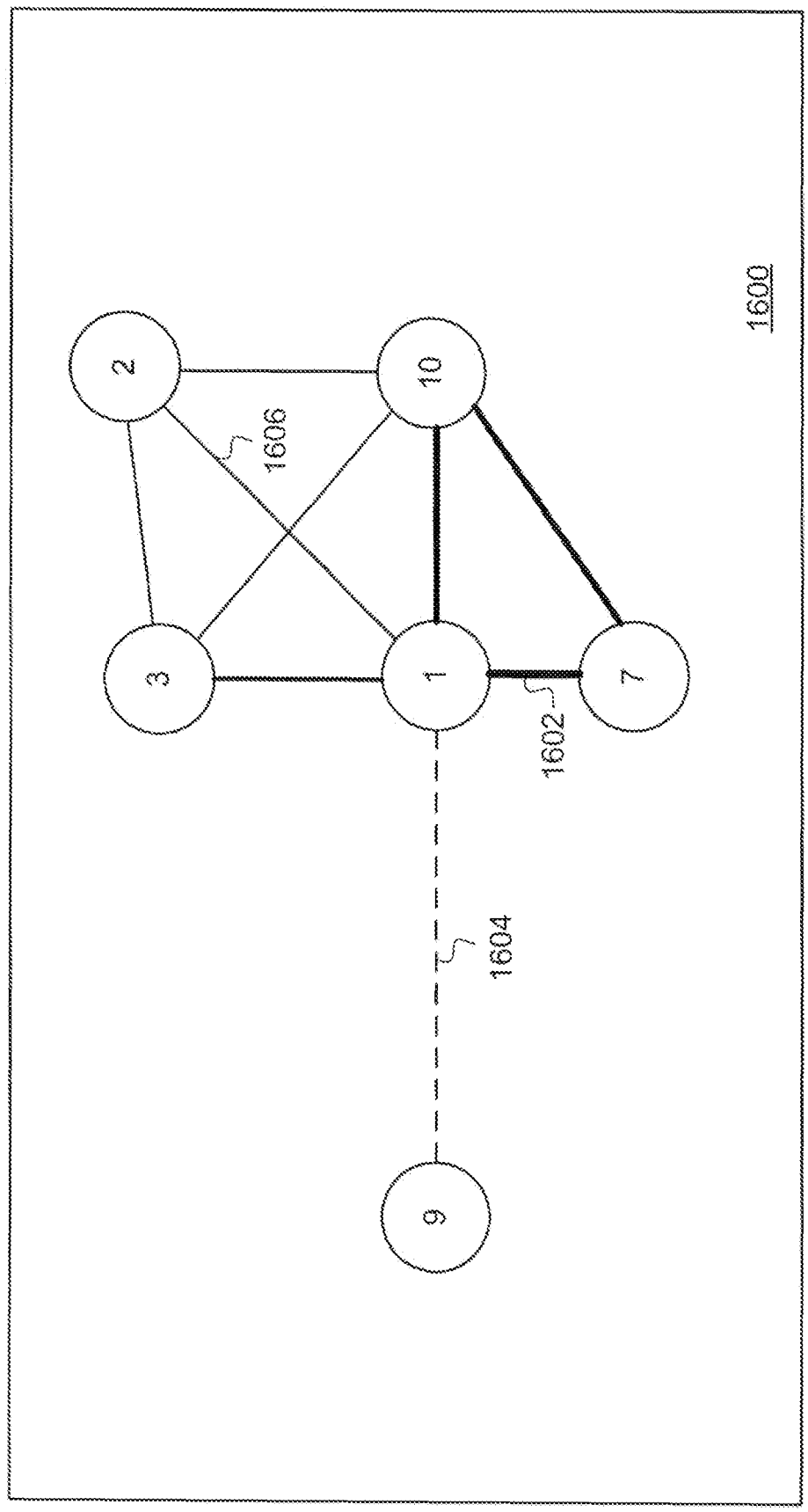
FIG. 16 illustrates a topographical local view user interface displaying the neural network topology according to one example.

FIG. 16 represents a local view 1600 of the world view 1500 of FIG. 15 based upon a command from the user to zoom in with respect to Restaurant 1. In other words, the local view 1500 illustrated in FIG. 15 depicts nodal connections based on Restaurant 1. In selected embodiments, the system, whether in the world view 1500 or local view 1600, may center on the screen whichever node has been selected by the user. FIG. 16 is intended to be exemplary and therefore only a handful of the connections are illustrated for the ease of explanation. Accordingly, Restaurant 1 has a variety of connections with Restaurants 2, 3, 7, 9 and 10 and the user is able to grasp a better understanding of these connections as compared with the world view 2500. For instance, different link strengths are represented by different link thicknesses and anti-links are represented by dashed lines. The user can further designate particular lines themselves and the system 100 will display the overall link strength values for that particular connection.

As illustrated in FIG. 16, link 1602 connecting Restaurants 1 and 7 has the thickest line as compared to other connections as they share the same neighborhood and genre and both received highly positive reviews from Reviewer 2. Link 1606 connecting Restaurant 1 and Restaurant 2 has a small line thickness as they only share the same attire and do not share any positive review data. Link 1604 connecting Restaurant 1 and Restaurant 9 is dashed as they share a negative overall link strength due to an opposite affinity expressed by Reviewer 2. However, the link 1604 is not that thick as the overall link strength value, while negative, is close to zero.

In the local view 1600, the links may be depicted in different colors to identify which links have strong or small overall link strengths with respect to a designated node. For instance, link 1602 may appear to be bright red due to a strong overall link strength between Restaurant 7 and Restaurant 1 and link 1604 may appear blue based on a low overall link strength value between Restaurant 1 and Restaurant 9. Alternatively, the user may request link colors solely based on the designated node such that link 1606 would be assigned a "hotter" color than link 1602 because it is a direct link with Restaurant 1. Further, links having a stronger overall link strength with respect to a designated node may appear closer to the designated node than other links. For instance, Restaurant 7 is closer in proximity to Restaurant 1 than Restaurant 3 as Restaurant 3 has a lower overall link strength with Restaurant 1 as compared to the overall link strength value between Restaurant 7 and Restaurant 1. In addition to or alternatively, other indications may be used to designate link strengths such as making nodal appearances larger than others if they have a strong overall link strength with respect to a designated node.

Figure 25:
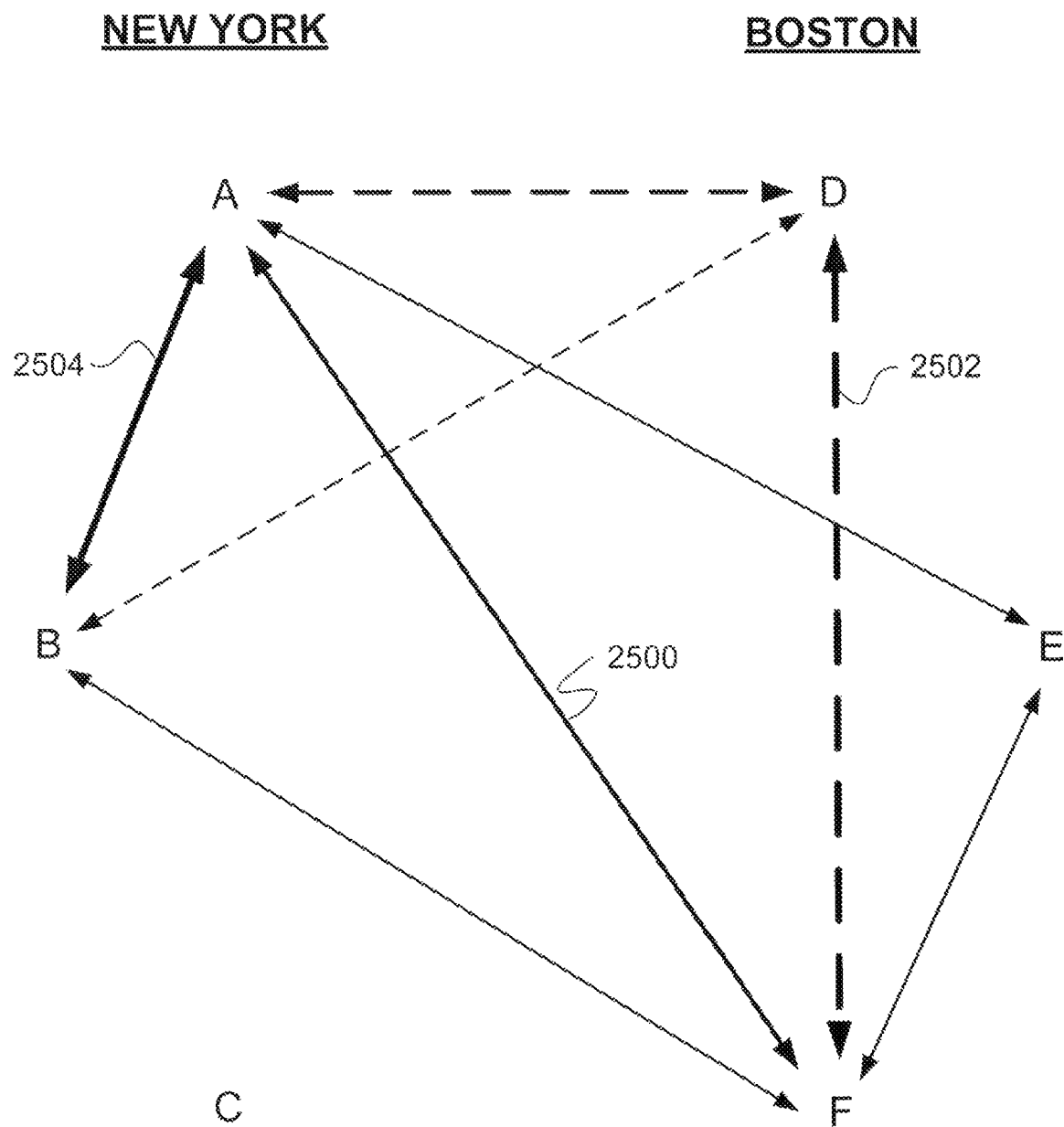
FIG. 25 illustrates inter nodal connections after interconnectivity augmentation processing according to one example.

Therefore, both the world view 2500 depicted in FIG. 25 and the local view depicted in FIG. 16 provide an easy-to-understand view of the neural network topology thereby providing the user with insight into potential recommendations while also providing an incentive to present more information to the system to bolster internodal links. While the nodes illustrated in FIG. 15 and FIG. 16 are represented by the number of the restaurant, other depictions are contemplated such as thumbnail pictures, logos and/or names of the restaurants. Further, the system in selected embodiments may display a three-dimensional view of the neural network topology thereby giving the user a real-world impression of the internodal connections. For example, in a three-dimensional system, connections with strong overall link strengths may represent highways whereas connections with low overall links strengths may be represented as dirt roads. In addition to or alternatively, venues that are located close to each other which are thereby in "walking distance" may represent strong overall link connections as opposed to venues that appear far off in the horizon.

Collaborative Decision Making

Group events can often cause problems between individuals in the group because it may be hard for everyone to come to agreement on particular topics. For instance, a group of friends that are also users of the system 100 may have plans to go out to dinner but may be unsure of which restaurant to go to or may be unable to come to an agreement with respect to a restaurant. As such, each user may have his own opinion of where the group should go based on recommendations provided by the system 100. Therefore, in addition to providing users with a variety of ways in which to view recommendation data and nodal connections between various venues, the system 100 also provides user interfaces enabling a group of users to collaboratively select venues.

Initially, the system 100 performs a group search using information provided by members of the group. Specifically, the members of the group may submit a venue choice and a list of requirements to the system 100 in which they want the search query to adhere to when determining recommended venues. As such, some members may specify the genre whereas other members may request a low price point. The recommendation engine 112 will then perform a search for each particular member based on their individual requests and recommendations are generated by the recommendation engine 112 as previously described herein such that each member has their own recommendation set.

Once the recommendation engine 112 has generated the various recommendation sets for each member of the group, the collaborative decision making user interface depicts each group member in a different row with recommendations for each corresponding member appearing in a column beneath that member. The system 100 also highlights one of the recommended venues for each member that represents the strongest overall link strength based on the venue provided by the user and the filter state input as part of the search query. The highlighted venue may be displayed in a certain color, have a varied border as compared to other recommendations, may be displayed larger than the other recommendations or may be displayed in a particular order with respect to the position of the member information.

The recommendation engine 112 will also determine, based on the information included the search queries by each member, a recommended group venue having the greatest average affinity with respect to the recommendations identified for each member. The recommendation engine may also use attribute information to prevent clashes between members of the group. For example, the system may not recommend a steakhouse as a group venue when one or more of the members of the group are known vegetarians. Further, for example, if a majority of group members dislike seafood, the recommendation engine may avoid generating a seafood restaurant as a group recommendation regardless of how close other calculations come with respect to other attributes such as price and attire. Accordingly, to generate a group recommendation, the recommendation engine 112 takes into account at least the nodal interrelationships between venues identified by the group members and user attribute data.

Once the recommendation engine 112 determines the group recommendation, the system 100 highlights the group recommendation if it already appears in the user interface and/or displays the recommended venue separately for the members of the group to see. In selected embodiments, each member of the group will have the ability to vote on the recommended venue or to select a different venue from the options listed on the display screen. The recommendation engine 112 will then continuously recalculate a recommended group venue or venues having the strongest overall affinity based on the recommendations provided by recommendation engine 112 or those voted on by the members. To prevent an endless recommendation cycle, each member may be limited to a certain number of votes and/or a time limit, such as a certain time before the planned event, may be prescribed to ensure a limited voting period.

Figure 17:
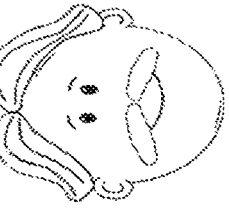
FIG. 17 illustrates a collaborative decision making user interface according to one example.

FIG. 17 illustrates an exemplary collaborative decision making user interface, or group interface. In FIG. 17, Members 1-4 represent a group of users of the system 100 who are planning to meet for dinner on Oct. 8, 2012, at 5:00 PM. In selected embodiments, one user may setup the meeting time of an event and can send invites to other users of the system 100. If these users accept the invite, the system 100 will indicate that they are part of a group. Once the group is formed, the users may each provide a venue and other filter parameters to have the recommendation engine 112 provide a recommendation set for each user. In other embodiments, the recommendation set of a founder of the group may hold more weight or may be the only recommendation set provided to the group members.

Once the recommendations have been determined by the recommendation engine 112 for each user, the system 100 displays these recommendations as illustrated in FIG. 17 such that each user is shown along with their corresponding recommendations. Within each column containing the recommendation set for each user, a recommended venue (1706, 1708, 1710 and 1714) having the strongest overall link strength with a venue provided by the user as part of the search query is highlighted. Some users may have more recommended venues in their recommendation set based on the development of the neural network with respect to the particulars of the search query made by that user. For example, Member 4 only was provided three recommendations by the recommendation engine 112. Once the individual recommendations are generated, the system 100 then calculates a group recommendation having the greatest average affinity based on the recommendations identified by the recommendation engine 112 and presents the venue as a current group recommendation 1700. The previous group recommendation 1702 may also be provided to illustrate to the members of the group that the venue has changed.

The collaborative user interface also identifies the last time at which the group recommendation was changed as well as the last vote for a venue and who placed that vote. Further, a deadline for submitted votes can be set by the group founder and/or voted upon by group members and is displayed to inform group members of the last time at which a vote may be cast. Accordingly, as the meeting time is set to 5:00 PM on Oct. 8, 2012, the group members must submit their final votes, if any, by Oct. 8, 2012, at 12:00 PM. As such, the initial group recommendation is dynamic and can change up to the deadline by receiving different votes and recalculating the group recommendation based on overall link strengths and user attribute data with respect to the newly voted venue and previously identified venues for particular group members. In other selected embodiments, the group founder may prevent voting thereby locking the group recommendation calculated by the system 100.

In the exemplary user interface illustrated in FIG. 17, the system 100 calculated Restaurant 7 as being the best group recommendation 1700 based on the individual recommendations generated for each user by the recommendation engine 112. Recommendation 1704 is highlighted to indicate that Member 4 changed his choice for a venue from Restaurant 1 to Restaurant 11 by voting for Restaurant 11. This change may have been made from the original recommendation made by the system 100 or a from a previous vote cast by Member 4. For the purposes of this example, it is assumed that the recommendation engine 112 originally generated Recommendation 1704 and based on this recommendation in conjunction with the Recommendations 1706, 1708 and 1710 for Members 1-3, the system 100 originally generated the group recommendation 1702 of Restaurant 4. However, as explained further below, the recommendation engine 112 recalculated a group recommendation of Restaurant 7 based upon the vote for recommendation 1714 by Member 4. In other selected embodiments, recommended venues other than those highlighted within the user interface are used by the system 100 to calculate a group recommendation 1700.

Group recommendations are based, in part, on recommended venue attributes such as those illustrated in FIG. 4. For instance, Recommendations 1706 and 1708 have the same genre but have different price points than Recommendation 1710 and Recommendation 1704 with Restaurant 7 being expensive and Restaurants 1 and 12 being inexpensive. However, as Recommendations 1710 and 1704 have different genres, the Japanese genre of Recommendations 1706 and 1708 is the dominant genre. Accordingly, as the predominant genre was Japanese but the price points were opposite, the system 100 originally generated the group recommendation 1702 of Restaurant 4 having the same Japanese genre but a medium price point. However, when Member 4 decided to vote for Recommendation 1714, the system 100 recalculated the group recommendation and recommended the current group recommendation 1700 of Restaurant 7. For instance, Recommendation 1714 has a high price point and therefore only one recommendation, Recommendation 12, has a low price point. Further, as Recommendation 1710 and Recommendation 1714 have different genres, the Japanese genre of Recommendations 1706 and 1708 is still predominate. Accordingly, the system calculated Restaurant 7 as the group recommendation as it has the predominate genre and a high price point. Of course, these examples are for the sake of illustration and user attributes, other venue attributes, and link strengths based on the neural network topology between the various recommendations can all be used by the system 100 to calculate a group recommendation 1700.

The collaborative user interface illustrated in FIG. 17 is exemplary and as such can be displayed in a variety of ways. Members of a group may be listed in columns with corresponding recommendations being listed in rows adjacent to the group members. Members may customize images representing their virtual user identity within the system 100. Thumbnail images, logos, or videos may be used in addition to or alternatively to the textual display of the restaurant in the recommendation slots. The strongest recommendations, such as 1706, 1708, 1710 and 1714 illustrated in FIG. 17, may be highlighted, may appear larger than other recommendations, and/or may contain animations or audio representations of the recommended venue itself. Further, video streams of group members themselves may be depicted in the collaborative user interface via an imaging device to virtually interact with each other when determining meeting times, discussing group recommendations, or taking votes. Further, a group member may vote on recommendations listed for the group member or any other group member as well as for venues not illustrated in the collaborative user interface.

The collaborative user interface illustrated in FIG. 17 thereby presents users with the option of having the system 100 generate a group recommendation when members are having a hard time determining a venue amongst themselves. The group recommendations further provide the user with the comfort of knowing that the group recommendation is not only based on strong links to the interests of the user but also to other members of the group thereby increasing the likelihood of a speedy resolution when determining venues amongst large groups. Further, in selected embodiments, the system 100 may incorporate votes may by users into the data repository 118 such that the system 100 may further update the neural network topology and enhance future recommendations. Additionally, the system 100 may in real time repopulate the recommendations within the collaborative user interface based on updated nodal links between venues with respect to votes cast by one member or other group members.

The interfaces described herein may be presented, as noted, through a variety of devices. Still additional devices are contemplated, including television screens, third party websites (through partnerships), in-store kiosks, or personal keychains or dongles.

Error Correction and Data Verification

In selected embodiments, the recommendation engine 112 generates recommendations for venues based on a variety of information such as user data, venue data and reviewer data. More specifically, the user data, venue data and reviewer data are combined as previously described herein to form link matrices the strength of which can be used to generate the recommendations for the user. However, while recommendations based on link strengths between nodes of the neural network provide a strong gauge as to the accuracy of the generated recommendations, it is possible that nodal link values can "trick" the recommendation engine 112 into generating an outlying recommendation for the user. For instance, a neural net configuration having nodal link strengths strongly geared to specific data such as venue attire, genre and price as well as reviewer data positively identifying venues having these traits may recommend a venue in a neighborhood that is quite different from the neighborhood where the user normally eats dinner. The system 100 may also strongly link user attribute data such as work hours and profession to venues having corresponding business hours and attire such that the recommendation engine 112 recommends an exorbitant venue that is drastically outside the price range of venues the user typically frequents based on past recommendations. Therefore, while the recommendation engine 112 will typically generate a recommendation set having a plurality of accurate recommendations, it is possible due to particular nodal links that the recommendation engine 112 may generate an outlying recommendation that does not "resonate" with the previous recommendations served to the user.

Referring back to FIGS. 3-8, an illustrative example of this effect is provided wherein the recommendation engine 112 generates a recommendation for a venue that is in a neighborhood the user does not typically visit or typically receive recommendations to visit. Referring, for the purposes of this example, solely to the affinity expressed by Reviewer 7, there is a +0.75 collaborative-based link formed between Restaurant 7 and Restaurant 11. Further, based on the venue attributes themselves, there is a +0.25 rating as both Restaurant 7 and Restaurant 11 have the same attire. Additional ratings could be added therebetween as described previously based on similar hours and the fact that the price points of the Restaurant 7 and Restaurant 11 are similar. Therefore, the nodal link strength between Restaurant 7 and Restaurant 11 would be quite strong upon the formation of link matrices by the Matrix Builder 126 such that the recommendation engine 112 may generate a recommendation for Restaurant 7 in response to receiving a query of Restaurant 11 by the user via the user interface. However, assuming for the purposes of this example that previous recommendations to this user were typically in neighborhood 02196 and/or rarely, if ever, involved Japanese food, the recommendation engine 112 would be providing a recommendation of Restaurant 7 that clearly does not resonate with recommendations previously made to the user.

To prevent the risk of an erroneous recommendation, one exemplary embodiment of the system 100 provides processing for error correction and data verification via the recommendation engine 112. Through this improved processing, the recommendation engine 112 can provide recommendations that correlate strongly to the content-based, collaborative-based and content-collaborative based interrelationships and that resonate with the plurality of recommendations that were previously made to the user. Accordingly, the error correction and data verification acts as a guardian against recommendations that, although based on strong nodal links of the neural network topology, do not resonate with recommendations that were previously served to the user and acted upon by the user.

The error correction and data verification processing begins, in one embodiment by storing in the data repository 118 recommendations data that was previously generated by the recommendation engine 112 and served to the user. The system 100 may designate a minimum number of recommendations that have to be stored before error correction and data verification processing is implemented but may also impose limits on the number of stored recommendations based on storage capacity and processing considerations. The recommendations data stored in the data repository 118 can in selected embodiments store not only the recommended venue itself but also the user data, venue data and review data that was considered most pertinent to the recommendations generated by the recommendation engine 112. Therefore, the data repository 118 can store a recommended venue in relation to the data values ascribed with the recommended venue itself such as genre, hours of operation, attire, neighborhood and any other value described herein or as would be understood by one of ordinary skill in the art. The data repository 118 can also store any other data strongly relied upon by the recommendation engine 112 when generating the recommendation such as reviewer information, content-based link values, collaborative-based link values and user attribute data such as age, education and profession.

FIG. 18 illustrates an exemplary data repository 118 storing previous recommendation data for User 2, User 4 and User 7. This example is of course non-limiting as the data repository can contain more entries as well as different types of recommendation data previously described herein and as would be recognized by one of ordinary skill in the art. Further, although the recommendation engine 112 can provide a recommendation set to the user consisting of a plurality of recommended venues, it is assumed for the purposes of the examples provided by FIG. 18 that each recommendation set provided to each user contained only one item of recommendation data. As it may be difficult to detect recommendation resonate outliers with a limited amount of prior recommendations, the system 100 in selected embodiments can set a minimum number of recommendation data that is required for each user before the recommendation data can be relied upon for performing error correction and data verification processing. Therefore, the system 100 may not perform error correction and data verification processing until a predetermined threshold quantity of recommendation data has been stored in the data repository 118 for the particular user. This predetermined number relating to initiation of error correction and data verification processing may be manually set by the user via the user interface or automatically set by the system 100.

In FIG. 18, each user is stored in relation with recommendation data that has been previously recommended by the recommendation engine 112. For example, the first recommended venue for User 2 contained data such as a price point value of 3, an Italian genre, casual dress attire requirements and location neighborhood 02196 data. Further, the recommendation data stores the reviewers that reviewed the recommended venue (Restaurant 2) and user attribute information such as the age at which the recommendation was made and the number of children the user had at the time the recommendation was made. Therefore, the recommendation data stores values that will change over time such as the number of children and the age of the reviewer and user. Although not illustrated, it is further expected that venue attributes values such as the price point value and neighborhood and reviewer affinity ratings may change over time.

FIG. 19 illustrates an example of aggregate repository recommendation data stored in the data repository 118 according to selected embodiments that is generated based on the data repository of previous recommendations illustrated in FIG. 18. In one embodiment, the system 100 collates the recommendation data for each user to determine statistical values for each item of information stored in the data repository 118 relating to previous recommendations. For example, it can be seen that User 2 has received three recommendations all of which were Italian Venues. Further, the aggregate data indicates that the recommended venues to User 2 were often at the lower price point range as User 2 received two recommendations at a price point of three and one recommendation at a price point value of two. Further, FIG. 18 illustrates that User 2 has always received recommendations for neighborhood 02196. Therefore, as discussed previously and explained further below, a recommendation set for User 2 including venues having high price points and/or venues in a neighborhood outside of 02196 may not resonate with the aggregate data stored in the data repository 118.

The system 100 can determine the aggregate recommendation data based on the previous recommendations stored in the data repository 118 in real time when making a recommendation and performing error correction and data verification. In other selected embodiments, the system 100 can aggregate the previous recommendations at a time when the system 100 is experiencing a lower than normal processing load and store the aggregate data as illustrated in FIG. 19. Accordingly, the system 100 has the option of determining the latest aggregate information by aggregating the data at the time of performing error correction and data verification processing or can lower the processing load required for error correction and data processing by aggregating the stored recommendation data at periodic or predetermined intervals.

Whether the aggregated data is collated simultaneously with the issuance of a recommendation or at a previous time, the stored recommendations can be aggregated in a variety of ways. For example, in one embodiment, the system 100 determines a quantification value for each attribute of the recommendation data which can then be used in the error correction and data verification processing. An illustration of this methodology is shown in FIG. 19 wherein quantification values for the price of the various venues previously recommended to User 2 are stored separately such that a price point of "3" was provided twice by the recommendation engine 112 and a price point of "2" was provided only once by the recommendation engine 112. As the data collected from venues, reviewers and users is likely to change over time, the aggregated data can also be collated based on running averages. FIG. 19 provides an example of this type of collation wherein the ages of the reviewer has changed based on the time at which previous recommendations have been made and therefore an average age value is provided in the aggregate data. The recommendation engine 112 may also limit the error correction and data verification processing to a certain number of recommendations to prevent out-of-date data from affecting resonate recommendation computations. As such, in selected embodiments, the data repository 118 can store a time stamp with each data recommendation entry such that the recommendation engine 112 can implement temporal filter values when performing error correction and data verification.

The system 100 can therefore adapt over time to the changing affinities of users and reviewers alike. For example, recommendations to a long-time system 100 user may have originally all been tailored to venues at a low price point with casual attire whereas the user is now older and mostly frequents venues at a higher price point with formal attire. However, the introduction of children into the user's lifestyle may then shift recommendations back to a lower price point. Reviewer ratings will most likely also change over time and therefore the recommendation engine 112 can reflect only the most recent and accurate ratings when performing error correction and data verification.

The previous recommendation data illustrated in FIG. 18 and FIG. 19 may also be weighted based on affinities explicitly expressed by a user such that the recommendation engine 112 provides more emphasis on specific attributes of data when performing error correction and data verification. For example, User 4 may indicate via the user interface that he prefers Japanese and Italian venues and venues in the neighborhood 02163. Therefore, when the recommendation engine 112 performs error correction and data verification it will determine whether the current recommendation resonates with the various aggregated datum of previous recommendation data but will also place particular emphasis on verifying that the current recommendation resonates with User 4's affinity for Japanese and Italian venues as well as venues in the neighborhood 02163. It is likely that the recommendations will already be tailored somewhat towards these feature sets based on the nodal links formed by the matrix builder 126 based on user-expressed affinity but the error correction and data verification processing provides an extra filter of protection to ensure a more accurate recommendation to the user.

Weights may also be provided to the aggregate data of previous recommendations based on the "primary" nodal link strengths of the neural network used by the recommendation engine 112 to generate the previous recommendations. For example, based on content-based interrelationships, collaborative-based interrelationships, content-collaborative interrelationships, and higher-order interrelationships, the recommendation engine 112 may generate a recommendation primarily based on genre data and neighborhood data. FIG. 18 provides an illustrative example wherein all of the previous recommendations to the User 2 have been for an Italian venue within the neighborhood 02196. Therefore, the recommendation engine 112 may attach weights to these values such that they provide more influence on resonation calculations via the error correction and data verification processing as described above.

Figure 20:
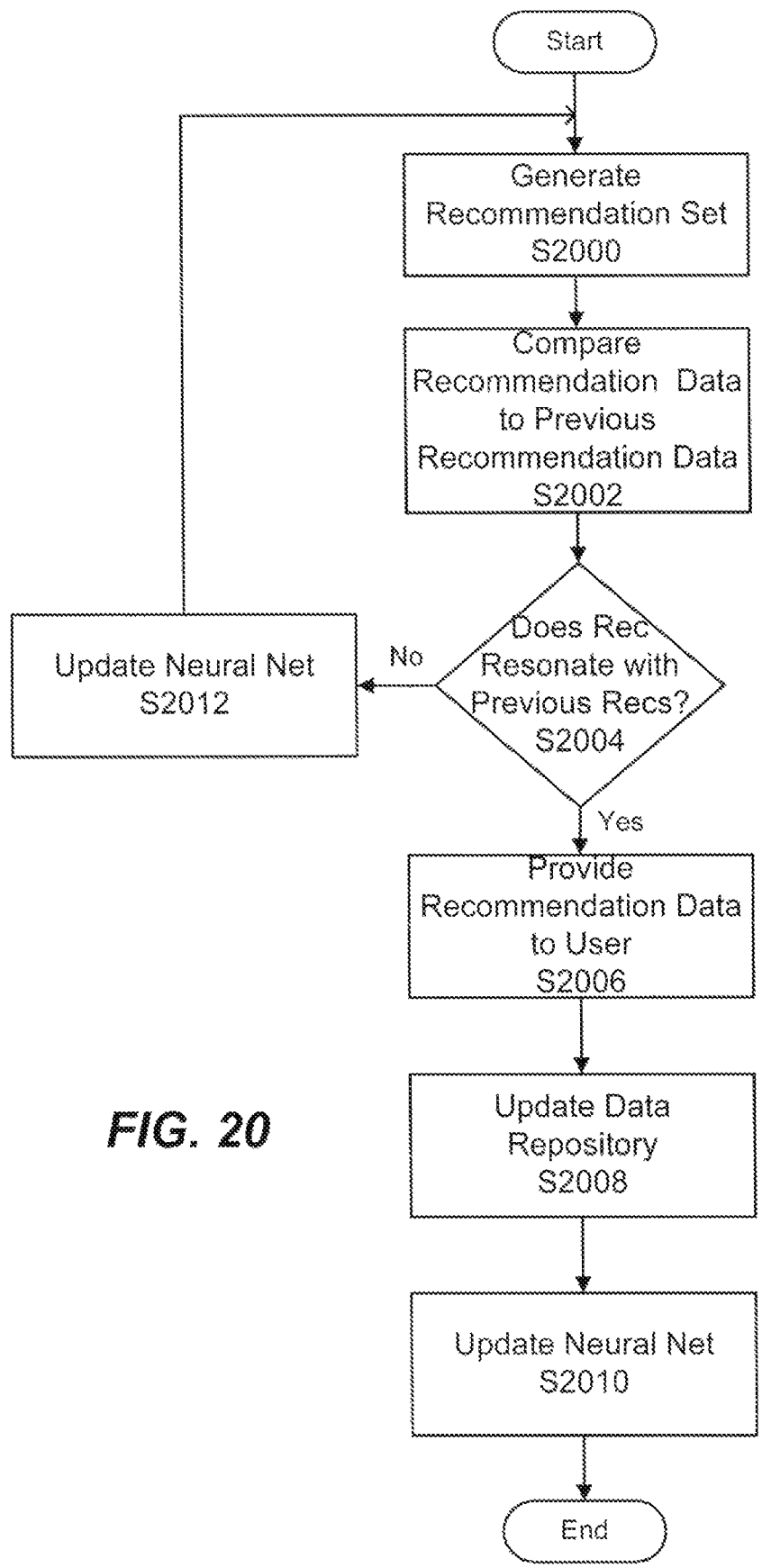
FIG. 20 is a flow chart illustrating error correction and data verification processing according to one example.

FIG. 20 is a flow chart illustrating error correction and data verification processing according to one embodiment. The process is initiated at S2000 with the recommendation engine 112 determining a recommendation set based on the neural network methodology described above. Processing then proceeds to S2002 to perform a comparison of the current recommendation data generated by the recommendation engine 112 with the aggregate recommendation data stored in the data repository 118. Although not illustrated in FIG. 20 but as previously discussed, the recommendation engine 112 can determine whether to initiate error correction and data verification based on the number of recommendations for a particular querying user that are stored in the data repository 118.

Assuming the recommendation engine 112 has access to the requisite amount of aggregate recommendation data, the recommendation engine 112 compares the current recommendation to the aggregate recommendation data stored in the data repository 118. In one embodiment, the recommendation engine 112 systematically compares each attribute included in the current recommendation data to each corresponding aggregated quantification value of each attribute to determine a resonate value for that attribute. Once each resonance value is determined for each of the attributes corresponding to those contained in the current recommendation, a resonance quantifier is determined based on the plurality of resonance values. If the resonance quantifier is less than a predetermined threshold, then the recommendation engine 112 determines that the current recommendation does not "resonate" with previous recommendations at S2004. Accordingly, at S2004, if the resonant quantifier is greater than a predetermined threshold, the recommendation engine 112 confirms that the current recommendation "resonates" with previous recommendations.

If the recommendation engine 112 determines at S2004 that the resonance quantifier does not exceed the predetermined threshold and therefore that the current recommendation does not resonate with previous recommendations to the user, the recommendation engine 112 identifies the deficiencies in the current recommendation such that the matrix builder 126 can back propagate these deficiencies into the neural network to establish increased accuracy within the nodal links. For example, with reference to FIG. 18 and FIG. 19, if the recommendation engine generated a recommendation for a venue in a neighborhood outside 02196, the error correction and data verification processing may indicate this recommendation as an outlier based on previous recommendations for User 2 that were all within the neighborhood 02196. Accordingly, at S2012, the neural network is updated such that a negative link value is ascribed to the neighborhood identified in the recommendation with respect to the nodal links established for User 2. Alternatively, or in addition, the matrix builder 126 may ascribe an additional positive link value to the neighborhood 02196 to further ensure that neighborhood 02196 is given increased link strength thereby ensuring increased consideration in any future recommendations provided by the recommendation engine 112. Accordingly, the error correction and data verification processing not only provides an additional filter for accurate recommendations but also acts as a vehicle for driving increased accuracy within the nodal links of the neural network itself. After updating the neural network at S2012, the processing proceeds back to S2000 for the recommendation engine 112 to generate a new recommendation for the user based up the updated neural network.

Referring back to FIG. 20, once it is determined that the current recommendation resonates with previous recommendations at S2004, the current recommendation is provided to the user at S2006 and the data repository 118 is updated to include an entry for the current recommendation. As noted above, this entry may include a time stamp indicating the time and date at which the recommendation data was entered into the data repository 118.

After updating the data repository 118 with the current recommendation, processing proceeds to updating the neural net nodal links at S2010. As the system 100 has determined that the recommendation data generated by the recommendation engine 112 resonates with previous recommendations, the matrix builder 126 may update the nodal link strengths of the neural network based on data included in the recommendation data. For example, if the recommendation data for User 2 includes casual attire for the recommended venue, the matrix builder 126 may even out the nodal link strengths with respect to this attribute as User 2 has now been recommended the same amount of venues for both casual and formal attire. Further, this recommendation data "approved" by the error correction and data verification processing may be applied more weight when updating the neural network than recommendation data that was created before error correction and data verification processing was initiated by the recommendation engine 112 as it has confirmed resonance with previous recommendations and is therefore more likely to be accurate.

Further, in addition to the methods of refining the neural network based on the effectiveness of recommendations as determined by the system 100, a recommendation that is approved by the error correction and data verification processing may also be identified as a recommendation that has been determined to be effective based on the resiliency of the aggregate previous recommendation data. Further, in selected embodiments, when the system 100 determines the effectiveness of the recommendation data as describe herein based on financial data, feedback data, web browsing data, geographic data or the like, the system 100 may store this recommendation data in the data repository 118 with a special label such that the recommendation engine 112 applies more weight to this information when performing error correction and data verification processing. For example, in referring to FIG. 18, if the system 100 determines the effectiveness of recommendation #2 by receiving financial information that User 2 visited the venue, by receiving user feedback from User 2 that he liked the venue, by determining that User 2 spends a lot of time on the venue website, or by determining that User 2 spends a lot of time in a geographic location proximate to the recommended venue, the system 100 may apply a "validation" label to this recommendation data in the data repository 118. In doing so, if the recommendation engine 112 is using only a predetermined number of previous recommendations, the recommendation engine 112 can improve error correction and data verification accuracy by using only "validated" previous recommendations. In other embodiments and if the recommendation engine 112 is using more previous recommendations than currently available validated previous recommendations, the recommendation engine 112 may apply special weight to the validated previous recommendations such that the error correction and data verification processing generates a resonance quantifier that is more strongly influenced by previously validated recommendations.

While error correction and data verification provides enhanced accuracy with respect to recommendations to the user, the system 100 must be constantly vigilant with respect to the changing attributes within the recommendation data, particularly the user attribute data. For example, if the user moves to a different part of the country then the matrix builder 126 will update the neural network accordingly thereby lowering the strength of links identifying venues in neighborhoods that are no longer in proximity to the user. Therefore, the nodal link strengths will be reflected in a new recommendation such that any recommendation by the recommendation engine 112 will be in neighborhoods in close proximity to the user's new location. However, when comparing a new recommendation to this user, the recommendation engine 112 may identify this recommendation as an outlier as all previous recommendations were in neighborhoods geographically distant from the user's new location. Accordingly, the recommendation engine 112 may assign a label on the neighborhood attribute data within the data repository 118 of previous recommendations thereby identifying certain values of this attribute as data which should not be used when performing error correction and data verification. Therefore, the system 100 provides adaptive functionality to limit error correction and data verification processing to attributes that will not induce the recommendation engine 112 to provide erroneous results.

Another method for providing enhanced recommendations via error correction and data verification is to dynamically ensure resonance between information, such as review data, from various source sites that are used during harvesting operations. For example, the harvesting of data to create the neural network as previously described herein obtains information from a variety of sources such as web sites. However, as web sites are constantly changing, as well as user review data and venue data contained therein, the system 100 may not always have an up-to-date capture of information. As described previously, the system 100 periodically updates the neural network based on information gathered from source sites. However, the user may perform a search query at a time before an update but after information from the source sites has changed. Accordingly, nodal link strengths of the neural network topology, while providing a strong representation of links between different venues, may not be optimized as they were determined based on information that was "out of date". Therefore, error correction and data verification further provides the ability to dynamically determine resonance between information contained within the data repository 118 and information obtained from source sites as well as between information from different source sites.

Specifically, in selected embodiments, the recommendation engine 112 will, just prior to generating a recommendation set, dynamically harvest data items from multiple source sites, such as web sites across the Internet, and resolve any differences between these data items. For example, venue data items from a majority of web sites relating to Restaurant 1 of FIG. 4 may include information identifying Restaurant 1 as low cost and casual. However, it is possible that other websites may mistakenly indicate Restaurant 1 as expensive and requiring formal attire. Therefore, the recommendation engine 112 can resolve these differences by indicating certain web sites as containing inaccurate information with respect to a venue. Once the outlying information is obtained, the neural network is dynamically updated as previously described herein while excluding the outlying information thereby allowing the recommendation engine 112 to provide a more accurate recommendation set based on new overall link strengths of the updated network topology.

In selected embodiments, a sliding scale resonance threshold may be applied to determine at what point information can be deemed accurate as opposed to outlying with respect to other harvested information. For example, the scale may be set by the system 100 or a user such that 75% of the information harvested must conform in order to determine that information not conforming with information in the 75$^{th}$ percentile is outlying information. The system 100 may further adjust the threshold based on the amount of web sites containing information about a certain venue. For example, the more information with respect to the same data items that the system 100 can obtain during harvesting operations, the higher the threshold may be set as there is a large data set form which to draw accurate information. Accordingly, if the system 100 harvests information from 100 sites of which 65 indicate Restaurant 1 as low cost and casual and 45 indicate that Restaurant 1 is expensive and formal, the system 100 may determine that the 45 web sites indicating Restaurant 1 as expensive and formal are outliers and will not take their information into account when updating the neural network. However, if the system 100 harvests information from 1000 sites of which 650 indicate Restaurant 1 as low cost and casual and 450 indicate Restaurant 1 as expensive and formal, the system 100 may not identify the 450 items of Restaurant 1 venue information as outlying information as there is a larger data set of which 65% is not a high enough resonance threshold. In this instance, the system 100 may opt to use the information contained within the 650 web sites but provide a negative weighting to this information so that it does not have too much of an effect upon an update of the neural network topology. Alternatively, the system 100 may ignore all of the information and determine that it cannot be resolved and therefore that none of it should be used to update the neural network topology.

Once error correction and data verification has been dynamically performed at the time of a user query, the neural network topology is updated and the recommendation engine 112 provides a recommendation set based on a current real-time snapshot of information contained within the Internet. Accordingly, information provided to the users is as accurate as possible with respect to information harvested from the Internet. Further, this allows the system 100 to determine "trendiness" data among web sites such as certain attribute data which is likely to change rapidly. This provides the system 100 with the ability to identify various types of fickle data and provide appropriate weights when calculating nodal links strengths within the neural network so that the user receives recommendation sets based on the most stable and accurate information harvested by the system 100.

Geometric Contextualization

As discussed above, error correction and data verification provides the system 100 with a way to avoid outlying recommendations as well as a way to monitor venue, reviewer and user attributes that change over time. However, in addition to these gradual characteristic changes over time, users are often inclined to change their interests spontaneously to try something new or simply to see what options the system 100 may produce in response to queries containing a variety of user filters. For example, the user may express an affinity for a particular venue but may want to further limit the search to venues that have particular hours, attire and neighborhood requirements. Accordingly, in selected embodiments, the recommendation engine 112 must generate a plurality of recommendation data having venues with the strongest link strength to the venue provided by the user but which are also limited to the hour, attire and neighborhood requirements. Of course, the more filters the user provides with a search query, the harder it is for the recommendation engine 112 to generate a good recommendation that meets all of the requirements of a user. For example, if a user queries the system 100 for recommendations within the state of Massachusetts, the recommendation engine 112 may not recommend certain venues from Salisbury, MA based on weak nodal link strengths even though they are located in the state of Massachusetts. As such, in selected embodiments, the recommendation engine 112 determines a plurality of venue recommendations based on nodal link strengths and then compares the nodal link strength of each recommendation to a recommendation threshold to determine whether or not the venue should be recommended to the user. The recommendation threshold indicates a watershed overall link strength value or in other selected embodiments a percentage identifying the number of recommendations that will be recommended by the recommendation engine 112 to the user out of the recommendation set. Accordingly, for example, if in response to a particular user query the recommendation engine 112 generates ten venues based on the above-described data interrelationships, the recommendation engine 112 may only serve recommended venues having nodal link strengths exceeding the recommendation threshold such that only 3 out of the 10 recommended venues are served to the user.

However, if the user then performs the same query but limits the geographic limitations of the search to Salisbury, Mass., or a neighborhood of Salisbury, Mass., and the recommendation engine 112 only determines a few recommended venues based on the nodal link strengths, the recommendation engine 112 may not recommend any venues if none of the nodal link strengths are greater than the recommendation threshold. In this instance, the user would be served with a useless empty recommendation set thereby lowering user confidence in the system and increasing the likelihood the user will turn to other systems for information.

FIG. 21A illustrates an exemplary search according to the above-noted principles by describing the outputs of the recommendation engine 112 based on a query for a recommendation for an American restaurant with casual attire and a user affinity for Restaurant 5. Based on this query, the recommendation engine 112 determines the venues having the strongest nodal link strength to Restaurant 5 while also limiting the recommendation set having these strong nodal link strengths solely to American restaurants with casual attire. This example is limited to two restaurants based on the data set illustrated in FIG. 4, but it is assumed that other restaurants may exist which are listed as Restaurants X. For the foregoing examples, the value X may represent a small number of restaurants or a large number of restaurants. In this example, as with FIG. 9, the recommendation is a blending of at least the content-based link strength 2100, collaborative link strength 2104 and content-collaborative link strength 2108. Each link strength is assigned a distinct weighting factor 2102, 2106 and 2110. By referring to FIGS.

4, 7, and 8, FIG. 21A provides respective values for content-based link strength 2100, collaborative link strength 2104 and content-collaborative link strength 2208. As Restaurant 3 has no content-based interrelationships or collaborative interrelationships with Restaurant 5, the content-based link strength 2100 and collaborative link strength 2104 is zero. The content-collaborative link strength 2208 is exemplary as are the weighting factors 2102, 2106 and 2110. Based on a first order sum of products, the overall link strength for Restaurant 3 is 0.075. Restaurant 6 has the same attire as Restaurant 5 and therefore has a content-based link strength 2100 value of 0.25 but has a negative collaborative link strength 2104 value of −1.0 based on a strongly opposite affinity expressed by Reviewer 3. As with Restaurant 3, the content-collaborative link strength 2208 of Restaurant 6 is exemplary as are the weighting factors 2102, 2106 and 2110. Accordingly, in this example, a first order sum of products produces and overall link strength 2112 value of −0.1875. For the other Restaurant(s) X, values of A-F are assigned, respectively, for content-based link strength, collaborative link strength, content-collaborative link strength and their corresponding weighting factors. Further, Restaurant(s) X have an overall link strength of G.

As illustrated in FIG. 21A and described above, the result of the above-noted query is Restaurant 3, Restaurant 6 and Restaurant(s) X. Therefore, assuming X represents a small number of restaurants having an overall link strength less than Restaurant 3 and Restaurant 6, and based on the filter state implemented by the user via the user interface at the time of the query for recommended venues, the recommendation data set for this filter state is very small. Further, the overall link strengths of Restaurant 3 and Restaurant 6 are low enough that the recommendation engine 112 may not recommend them to the user if they do not pass the recommendation threshold. For example, if the recommendation threshold is set at a value of 0.25, neither Restaurant 3 or Restaurant 6 would be recommended by the recommendation engine 112 and an empty recommendation set would be provided to the user. Accordingly, as noted above, while the recommendation threshold is effective for reducing a large recommendation data set, it can also act as a barrier for passage of all recommendations when the recommendation set is extremely small and/or has small overall link strength values therein. Therefore, the system 100 must provide a way to avoid serving empty recommendation sets to users when the search returns a limited recommendation set having low overall link strength values. In other words, the system 100 must balance the need to provide information to the user while also considering the value or relevance of the information being presented to the user such that user does not lose interest or confidence in the system 100.

Geometric contextualization is a mechanism for overcoming the problem of limited recommendation sets by ensuring that at least one recommendation is always provided to the user via the recommendation engine 112. One method of performing geometric contextualization is to adjust the overall link strength values of the recommendation set generated by the recommendation engine 112 until at least one of the recommended venues exceeds the recommendation threshold. The recommended venues exceeding the recommendation threshold can then be served to the user or a predefined percentage of recommendations out of the recommendation set that have had their overall link strengths adjusted are served to the user. In this embodiment, the overall link strength values of each recommendation are normalized using a normalization factor that is based on various factors until the overall link strength value of at least one recommended venue exceeds the recommendation threshold. Accordingly, in selected embodiments, geometric contextualization is performed every time a recommendation set is generated by the recommendation engine 112 to further redefine recommendation rankings based on a variety of factors to enhance the accuracy of the percentage of recommendations served to the user.

One factor that can be used to generate the normalization factor for normalizing the recommendation set is the number of potential recommendations available based on the filter state set by the user at the time of performing the query. For example, if there is a large number of recommendations available based on the filter set and the only issue is that none of the recommendations of the set exceed the recommendation threshold, a minimal normalization factor may be utilized to normalize the recommendation set such that a limited amount of recommendations exceed the recommendation threshold. Therefore, the recommendation engine 112 may generate a normalization factor to ensure that a predetermined number of recommended venues exceed the recommendation threshold. This ensures that the recommendation engine 112 can serve the user with at least one recommendation but increases the chance that the recommendations provided are the "best" recommendations out of the group based on the overall link strength values. In other words, by having the recommendation engine 112 perform geometric contextualization with a low normalization factor for a large recommendation set, only the recommendation values with the largest overall link strength will be provided to the user. If the recommendation set is smaller in size, the recommendation engine 112 may need to generate a drastically different normalization factor to ensure that at least one recommended venue will be normalized to a value exceeding the recommendation threshold based on the nodal link strengths of the smaller set of recommended venues.

In selected embodiments for performing geometric contextualization based on the number of recommendations available in the filter state, the normalization factor value itself can be set by the recommendation engine 112 based on specific calculations with respect to the recommendation set. For example, the recommendation engine 112 can analyze the recommendation data set and determine a normalization factor that will ensure that the overall link strength of at least one recommended venue exceeds the recommendation threshold. Further, the system 100 or the user via the user interface may set a specified number of recommendations to receive for each query. Therefore, the recommendation engine 112 may calculate a normalization factor that will ensure the overall link strengths of the specified number of recommended venues exceeds the recommendation threshold to ensure the user receives the requisite number of recommendations.

In addition or alternatively, the recommendation engine 112 may set the normalization factor based on user statistics known to the system 100 relating to venue attributes, user attributes, reviewer attributes, ordered relationships, content-based interrelationships, collaborative based interrelationships and/or content-collaborative interrelationships. These statistics are determined as described above with respect to determining the effectiveness of recommendations. For example, if past recommendations of the user indicate that recommendations based on content-based link strength are more effective than recommendations based on collaborative links strength, the recommendation engine 112 may calculate a normalization factor that ensures at least one recommendation having strong content-based link strength is elevated past the recommendation threshold even if other recommendations having higher overall link strengths exist in the recommendation set. In this instance, the recommendation engine 112 may apply the normalization factor only to those venues in the recommendation set that have a requisite level of content-based link strength. Of course, this method may be applied based on collaborative link strength, content-collaborative link strength and/or higher order interrelationships. This provides the system 100 with the ability to elevate those recommendations that have a lower overall link strength but that may prove more effective for the user based on previous user statistics. This enhances the users overall experience with the system 100 and provides enhanced data for merchant vendors.

An example of geometric contextualization using a normalization factor based on the number of potential recommendations is illustrated in FIG. 21B with reference to FIG. 21A. In this example, it is assumed that the recommendation engine 112 has generated Restaurants 3, 6 and Restaurant X1 in response to the user query identified for FIG. 21A. In this example, assuming a recommendation threshold of 0.25 and an overall link strength value G that is less than 0.25 for Restaurant X1, none of the overall link strengths 2112 exceed the recommendation threshold. Accordingly, the system 100 determines that the recommendation engine 112 needs to perform geometric contextualization on the recommendation data. When performing geometric contextualization, the recommendation engine 112 determines that there is a small number of recommendations (3) available and therefore an adequate normalization factor must be calculated to ensure that at least one of the recommended venues exceeds the recommendation threshold once the process of geometric contextualization is finished. Accordingly, assuming a user specified or system 100 specified recommendation limit of two, the recommendation engine 112 must calculate a normalization factor such that two of the overall link strengths are elevated above the 0.25 recommendation threshold. Accordingly, a normalization factor of +0.175 is added to the overall link strength 2112 value of each venue in the recommendation set. FIG. 21B illustrates the effects of geometric contextualization on the recommendation data illustrated in FIG. 21A as discussed. In FIG. 21B, due to the effects of normalization, both Restaurant 3 and a Restaurant X1 out of the set of recommended venues have the requisite overall link strength of at least 0.25 to ensure they are higher than the recommendation threshold and can therefore be served to the user via the user interface.

However, in other selected embodiments and as previously discussed, if the system 100 determines statistically that content-based interrelationships have often proven to be the most successful factor in determining the effectiveness of the recommendation, the recommendation engine 112 may generate a normalization factor specific to venues having the highest content-based link strength thereby providing extra emphasis to the overall link strength of Restaurant 6 with respect to the predetermined threshold. Standard normalization factors may then be applied to the remaining venues in the recommendation set. Therefore, if a strong enough normalization factor is applied specifically to Restaurant 6, Restaurant 6 may exceed the recommendation threshold upon completion of geometric contextualization. However, as Restaurant 6 has such a low overall link strength with respect to Restaurant 3 and Restaurant X1, the recommendation engine 112 may determine a normalization factor such that Restaurant 6 still does not exceed the recommendation threshold despite the previous user statistics with respect to the content-based interrelationships. Therefore, the recommendation engine can perform geometric contextualization to avoid empty recommendation sets while taking into account previous user statistics and balancing them against overall link strengths determined from the nodal links of the neural network.

Further, if, for example, the system 100 contains data strongly correlating a low venue price point to the effectiveness of the recommendation, the recommendation engine 112 may only perform geometric contextualization on recommendations having lower price points thereby elevating recommendations strongly relating to user-specific characteristics. Therefore, although not shown in FIG. 21B, the recommendation engine 112 may only perform geometric contextualization on Restaurant 6 as it has a low price point with respect to Restaurant 3. Accordingly, in this example, even with a negative overall link strength, Restaurant 6 may be elevated above the recommendation threshold such that the user receives a recommendation tailored to his characteristics.

The recommendation engine 112 may also perform geometric contextualization based on the aggregate or individual quality of the recommendation data identified in the recommendation set. The quality of the recommendations in the recommendation set can also be determined based on the overall link strength between the recommended venues and venues identified by the user in a search query. Further, in selected embodiments, the quality of the recommendation data is determined by identifying the effectiveness of the recommendation based on previous recommendation stored in the data repository 118. As described above, certain prior recommendations may have a validation label if the recommendations have been determined effective based on user reviews, user financial data, user geographic data or other information as previously described herein. Further, the quality of the recommendation data can be determined based on the recommendation effectiveness data previously described herein with respect to identifying user financial transactions at the recommended venue, habitual user proximity to the venue and so forth. Accordingly, assuming the recommendation engine 112 generates a recommendation set having data for five recommendations that are all below the recommendation threshold, the recommendation engine 112 can search each recommendation data item to determine which recommended venues are most closely related to the recommendation data that has previously been determined to be effective or have the strongest overall link strength to venues identified in the search query. Based on this determination, the recommendation engine can then perform geometric contextualization by determining a normalization factor that will elevate the requisite amount of recommendations from the "effective subset" above the recommendation threshold.

An example of geometric contextualization using a normalization factor based on the aggregate or individual quality of the recommendations in the recommendation set is illustrated in FIG. 21C with reference to FIG. 21A. In this example, as with the previous example, it is assumed that the recommendation engine has generated Restaurants 3, 6, and Restaurant X1 in response to the user query identified for FIG. 21A. In this example, assuming a recommendation threshold of 0.25 and an overall link strength value G that is less than 0.25 for Restaurant X1, none of the overall link strengths 2112 exceed the recommendation threshold. Accordingly, the system 100 determines that the recommendation engine 112 needs to perform geometric contextualization on the recommendation data. When performing geometric contextualization, the recommendation engine 112 determines that Restaurant 3 and Restaurant 6 are of higher quality based on the effectiveness of previous recommendations made by the recommendation engine 112 that are stored in the data repository 118 with a validation label. For example, the recommendation engine 112 can determine from data stored in the data repository 118 that User 2 has visited Restaurant 8 numerous times based on financial transactions from Restaurant 8 and further based on geographic habituations with respect to User 2 proximity to the neighborhood 02196. Accordingly, the recommendation engine 112 determines a quality factor for Restaurant 6 based on similarities between Restaurant 6 and Restaurant 8 such as having an identical pricepoint as Restaurant 8. Further, the recommendation engine 112 may determine the effectiveness of Restaurant 2 based on a multitude of positive review data from User 2 and further determine that User 2 often eats at venues having casual attire and lives in neighborhood 02199 such that a quality factor for Restaurant 3 is calculated based on these considerations. Further, for the purposes of this example, it is assumed that the recommendation engine 112 does not calculate Restaurant X1 as a high quality recommendation as the recommendation engine 112 can not determine many similarities to other venues based on effectiveness data in the data repository 118. Therefore, although Restaurant 6 has a low overall link strength 2114, the recommendation engine determines that a normalization factor should be generated based on Restaurant 6 and Restaurant 3 in order to elevate the overall link strength of these restaurants past the recommendation threshold.

In the example illustrated in FIG. 21C, the recommendation engine 112 determines a quality factor of 0.65 for Restaurant 3 as it has multiple similarities to previously determined effective recommendations. Further, the recommendation engine 112 determines a quality factor of 0.55 for Restaurant 6 as it has fewer similarities to previously determined effective recommendations stored in the data repository 118. For Restaurant X1, the recommendation engine 112 determined a quality factor of 0.15. At this point, assuming a user specified or system 100 specified recommendation limit of two, the recommendation engine 112 must calculate a normalization factor based on the quality factors such that two of the overall link strengths are elevated above the 0.25 recommendation threshold. Accordingly, exemplary values of overall link strengths are illustrated in FIG. 21C based on normalization based on the quality factors such that Restaurant 3 and Restaurant 6 are both above the recommendation threshold. Therefore, even with a low overall link strength, Restaurant 6 is still recommended in this example as two recommendations were required to be provided to User 2 and Restaurant X1 had an extremely low quality factor.

The recommendation engine 112 may also perform geometric contextualization based on the diversity of the recommendations in the recommendation set. For example, assuming the recommendation engine 112 generates six recommendations, only three of these recommendations may be related whereas the other three may be diverse from each other and the three related recommendations. For example, three of the recommendations may relate to restaurants all have the same genre and neighborhood whereas the other three recommendations have different genres and neighborhoods. The recommendation engine 112 may further compare price points and venue attire to determine similarities between the recommended venues. Accordingly, content-based links, collaborative links and content-collaborative links between the recommended venues are determined by the recommendation engine 112 to determine overall link scores therebetween thereby identifying which recommended venues are most closely related and which recommended venues are diverse from each other. The recommendation engine 112 may then determine a normalization factor to elevate recommendations that are similar to each other above the recommendation threshold as it is likely that multiple similar recommendations are closer to the affinity of the user as opposed to a variety of potential outlying recommendations have little to no relationship therebetween.

An example of geometric contextualization using a normalization factor based on the diversity of the recommendations in the recommendation set is illustrated in FIG. 21D with reference to FIG. 21A. In this example, as with the previous examples, it is assumed that the recommendation engine has generated Restaurants 3, 6, and Restaurant X1 in response to the user query identified for FIG. 21A. In this example, assuming a recommendation threshold of 0.25 and an overall link strength value G that is less than 0.25 for Restaurant X1, none of the overall link strengths 2112 exceed the recommendation threshold. Accordingly, the system 100 determines that the recommendation engine 112 needs to perform geometric contextualization on the recommendation data. When performing geometric contextualization, the recommendation engine 112 determines that Restaurant 6 and Restaurant X1 are closely related based on content-based links, collaborative links and content-collaborative links and that Restaurant 3 is quite diverse from both Restaurant 6 and Restaurant X1. For example, the recommendation engine 112 can determine from data stored in the data repository 118 that Restaurant 6 and Restaurant X1 have similar price points, similar neighborhoods, similar review data and similar hours of operation. Accordingly, the recommendation engine 112 determines a diversity factor for Restaurant 6 based on similarities between Restaurant 6 and Restaurant 3 and Restaurant X1. Further, the recommendation engine 112 repeats this diversity determination for both Restaurants 3 and X1 to determine their diversity factor with respect to the other restaurants in the recommendation set illustrated in FIG. 21D. Based on these determinations, exemplary values of diversity factors are identified in FIG. 21D with respect to each recommended venue. According to this example, recommended venues having a lower diversity factor are venues that have more similarity to other venues win the recommendation set whereas recommended venues having higher diversity factors are venues that are not that related to other venues in the recommendation set. For example, Restaurant 6 has the lowest diversity amongst the recommended venues and therefore has a diversity factor of 0.25 whereas Restaurant 3 is the least related amongst the venues and has a diversity factor of 0.75. Accordingly, exemplary values of overall link strengths are illustrated in FIG. 21D based on a normalization factor generated based on the diversity factors such that Restaurant 6 and Restaurant X1 are both above the recommendation threshold.

Geometric contextualization can also be performed with respect to a distance function defined by the user and/or the system 100 and stored as part of the user attribute data illustrated in FIG. 6. For example, each user may predefine his own individual distance function identifying geographic preferences with respect to any recommendations made on his behalf. The system 100 may also further redefine this distance function based on the local geography and cultural geography of a given location. For example, the user may live in a city and not have a car such that the system 100 defines the local public transportation boundaries as a distance function for recommendations such that any recommendation served to the user should be within those boundaries. The user may also identify the city limits as their geographic distance function. Further, the system 100 can analyze information from different cities to identify which cities are, for example, walking cities and which cities allow for broader transportation options. As such, for walking cities, the system 100 will define a smaller geographic distance function where as for driving cities, such as Los Angeles, the system 100 will define a larger geographic distance function. Accordingly, in selected embodiments, a radial distance function is defined for the user such that the recommendation engine 112 generates recommendations within the boundaries defined by the user and the system 100 even if these recommendations do not have as high of an overall link strength as other recommended venues in neighborhoods outside the users radial distance parameters. Further, for example, if the recommendation engine 112 generated 50 recommendations but only 20 of those were within the distance function defined with respect to that user, the recommendation engine 112 may focus only on the 20 geographically appropriate recommendations and then serve a recommendation set based on those that have overall link strengths above the recommendation threshold. In other selected embodiments, the system 100 may in this instance serve a percentage of those recommendations have the highest overall link strengths that are within the number of recommendations in the radial distance of the user.

The system 100 may also provide recommendations based upon a combination of the above-noted geometric contextualization methods. For example, the system 100 may perform geometric contextualization based on the number of potential recommendations, the individual quality of the recommendations, the diversity of the recommendations, the distance function and serve the user with recommendations based on the results of all three geometric contextualization processes. The recommendation engine 112 may determine a subset of recommendations within the generated recommendation set that are determined to be higher quality, determine an adequate normalization factor based on the number of recommendations in the subset and then perform geometric contextualization based on the normalization factor to generate the requisite amount of recommendations that are above the recommendation threshold. Further, the recommendation engine 112 may determine a subset of recommendations by determining which recommendations comply with the distance function identified by the user and/or system 100, determine a ranking of these recommendations in terms of quality with respect to overall link strength and effectiveness data and provide a heavy weighting factor to this ranking based on quality factors, determine which of these recommendations have the lowest diversity factor and slightly adjust the ranking to ascend recommendations having lower diversity factors and lower recommendations having high diversity factors, and then identify the number of potential recommendations to identify a percentage of recommendations that should be served to the user based on overall link strengths. In selected embodiments, the recommendation engine 112 can identify overlapping recommendations based on the various methods and serve these recommendations to the user. The recommendation engine 112 may also weigh the various methods of geometric contextualization based on their perceived effectiveness based on the recommendation data set and provide recommendations to the user based on overlap and weighting effects of the different processes.

Further, in selected embodiments, the normalization factor generated by the recommendation engine 112 may be calculated based on a combination of data relating to the number of potential recommendations available in the filter state, the aggregate or individual quality of those recommendations, and the diversity of those recommendations. Accordingly, the recommendation engine 112 can calculate a normalization factor by using calculated data values based on these factors as inputs. The normalization factor is then applied as described above to elevate the requisite amount of recommendations above the recommendation threshold.

As discussed previously herein, in other selected embodiments or in combination with the above described geometric contextualization methods, the system 100 may require that a certain percentage of recommendations out of the recommendation set be served to the user for each user query. This percentage can change based on factors such as the number of recommendations generated or the number of recommendations generated that have overall link strengths above the predetermined threshold. Accordingly, upon determining a set of recommendations based on overall link strength as previously described herein, the recommendation engine 112 may perform geometric contextualization to redefine a ranking of the recommendations based on at least the number of the recommendations, the quality of the recommendations, the diversity of the recommendations, and the distance function in order to provide an enhanced set of recommendations to the user. Upon ranking the recommendations in the recommendation set based on geometric contextualization, the most highly ranked recommendations are selected in descending order until the percentage of required recommendations is met. This set of recommendations is then served by the recommendation engine 112 to the user via the user interface.

In selected embodiments, and to lower processing requirements on the system, geometric contextualization can be performed only when a predetermined number of recommendations generated by the recommendation engine 112 based on overall link strength do not have overall link strengths above the recommendation threshold. Geometric contextualization then elevates the required amount of recommendations above the recommendation threshold such that the required amount of recommendations can be provided to the user via the user interface. However, in other selected embodiments, the system 100 may perform geometric contextualization for every search query performed by the user such that recommendations generated by the recommendation engine 112 and provided to the user based on overall link strength are further enhanced and reordered based on at least the number of potential recommendations, the quality of the recommendations, the diversity of the recommendations and the distance function of the particular user or users.

Regardless of how geometric contextualization is performed, the system 100 can serve the recommendation data or datum to the user via the user interface with the caveat that the system had to perform some additional processing based on the filter state to obtain the specified number of recommendations. Therefore, the user can be warned that although they have been provided the requisite number of recommendations that these recommendations did not perfectly match the filter state and should therefore be strongly considered. The system 100 could also provide the user with information based on the type of geometric contextualization performed with respect to the filter state. For example, if geometric contextualization is performed based on the number of potential recommendations and known user characteristics, the user may be informed that a certain venue was selected outside the filter state based on previous user characteristic venue price points. Alternatively, the system 100 could provide the user with a combination of recommendations based on this geometric contextualization method such that the system 100 informs the user that one recommendation is based on elevated overall link strength and the other recommendation is based on previously known user characteristics.

Figure 22:
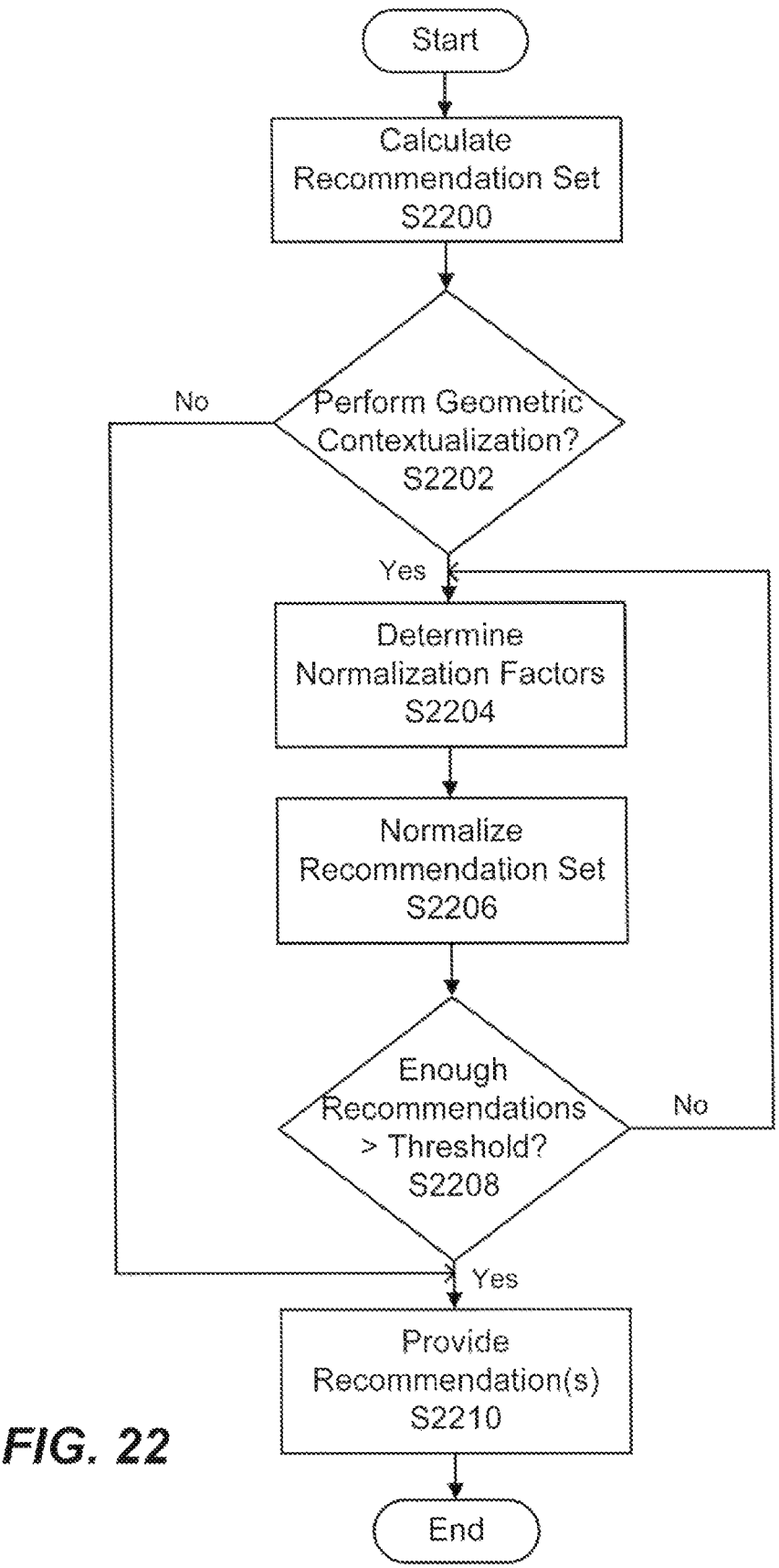
FIG. 22 is a flow chart illustrating geometric contextualization processing according to one example.

A description of the geometric contextualization according to selected embodiments is illustrated in FIG. 22. First, the recommendation engine 112 calculates the recommendation set at S2200 based on the filter state provided by the user at the time of the query. Accordingly, the recommendation engine 112 may determine a large set of recommendations based on overall link strength with respect to an affinity of a venue provided by the user but the number of recommendations in this recommendation set will be lowered based upon the user filter state. Therefore, the recommendation engine 112 must determine at S2202 whether geometric contextualization is required based upon the recommendation set. If there is a large number of recommendations in the recommendation set that exceed the recommendation threshold, the recommendation engine 112 may determine that geometric contextualization is not required thereby lowering the processing load on the system and providing quicker results to the user. At this point, the recommendation engine 112 proceeds to S2210 to provide the one or more recommendations to the user. However, if there a requisite amount of recommendations that exceed the predetermined threshold has not been generated, the recommendation engine 112 determines at S2202 that geometric contextualization is required. Further, the system may find a number of recommendations that exceed the recommendation threshold but if this number is lower than a user or system 100 specified number of recommendations required to be presented to the user, the recommendation engine 112 will proceed with geometric contextualization to obtain the requisite amount of recommendations. Further, in other selected embodiments, the recommendation engine 112 may always perform geometric contextualization on the recommendation set to further redefine a ranking of recommendations in the recommendation set based on the above-noted input factors such as quantity of recommendations, quality of recommendations, diversity of recommendations and user distance factors.

Upon determining that geometric contextualization is required, the recommendation engine 112 determines the normalization factor based on the information contained in the recommendation set itself as previously described. Therefore, the recommendation engine 112 determines which method or combination of methods for generating a normalization factor will be the most effective and proceeds to generate the normalization factor based on these methods at S2204. The recommendation engine 112 then normalizes the overall link strength values identified from the search results to obtain at least one recommendation with an overall link strength value above the recommendation threshold.

Once the recommendations have been normalized, the recommendation engine 112 analyzes at S2208 the normalized recommendation values to ensure that the recommendation set now contains enough recommendations values that exceed the recommendation threshold. If the number of recommendation values exceeding the recommendation threshold is still below the number of recommendations required by the user or system 100 for search results, the recommendation engine 112 repeats steps S2204 to S2208 to determine another appropriate normalization factor and re-normalize the recommendation set. This process is repeated until the requisite number of recommendation values exceeding the recommendation threshold is obtained. Once the recommendation engine 112 determines at S2208 that there is an adequate number of recommendations greater than the recommendation threshold, the recommendation engine 112 serves the one or more recommendations to the user via the user interface at S2210. The user can then perform additional searches and/or set a further filter state to further refine the search for additional recommendations.

As calculating what recommendations the recommendation engine 112 will generate for each possible filter state provided by a user ahead of time is extremely difficult and time consuming, the system 100 in selected embodiments performs the geometric contextualization in "real-time" to provide enhanced recommendation accuracy at the time of a search. Accordingly, via geometric contextualization processing, the system 100 can ensure that the recommendation engine 112 will always provide at least one recommendation to the user regardless of the filter state. This bolsters user confidence in the system and decreases the likelihood that users migrate to other systems.

Further, once geometric contextualization has been performed and the recommendation engine 112 has determined a recommendation set having an adequate number of recommendations, the system 100 may then perform error correction and data verification to further ensure and/or strengthen the accuracy of the recommended venues which may in turn be used to identify reviewers who have submitted review data with respect to the recommended venues and venues in other locations requested by the user.

Interconnectivity Augmentation

As previously described, the system 100 can present a user with recommendations based on user input and neural connections created between a variety of nodes via content-based relationships, collaborative relationships and content-collaborative relationships. Therefore, a user in Boston can get recommendations for other venues in Boston based on overall link strengths and post-recommendation processing performed by the recommendation engine 112. However, an issue arises when a user in one geographical area wants to get recommendations for venues in a geographically distant or diverse geographic location in which the system 100 does not contain much information about user interests. For example, a user in Boston may have an upcoming trip to New York and may query the system 100 for recommendations on places to eat in New York. This request may be difficult if there is an information deficit within the system 100 such that it contains large amounts of information as to which venues the user likes in Boston but not much, if any, information on the likes or dislikes of a user with respect to New York. In other words, neural network connections between the extensive neural network topology of the user in Boston and the limited neural network topology of the user in New York are not well defined. Therefore, the system 100 must use information known about the user in Boston to extrapolate information the recommendation engine 112 can use to generate a set of recommended venues in New York.

In one embodiment, the system 100 can use information relating to the geometric locale of the user performing the search by taking advantage of a predetermined amount of interconnectivity of venues in the neural network developed at that geometric locale. For example, FIGS. 7 and 8 represent neural network interconnectivity based on connections formed via content-based and collaborative interrelationships defined based on user data, review data and venue data as previously described. This information is based on Restaurants 1-12 that are located in Boston, Mass. Therefore, the system 100 already has at its disposal a variety of interconnectivity information with respect to the user and venues in the state of Massachusetts. The recommendation engine 112 can then, at the time of generating a recommendation, use review data relating to the local venues as well as the venues in New York to determine connections to venues in New York that are most closely related to venues in Boston.

First, the recommendation engine 112 receives which locale the user would like to obtain recommendations for and polls reviewer information to identify reviewers who have reviewed venues in the locale the user is searching for and the locale the user is located in when performing the search. This reviewer information is obtained from a variety of sources as described above with respect to web crawling and the identification of venue reviews. Once the recommendation engine 112 has determined the plurality of reviewers having provided reviews for both locales, the recommendation engine 112 processes the geometrically interconnected review data to form collaborative interrelationships values such that the system 100 can augment the neural network based on the collaborative nodal link values between the two locales. Accordingly, the recommendation engine 112 determines positive or negative affinity connections between a variety of venues within multiple locales based on the review data linking the locales via collaboratively formed interrelationships. At this point, the data repository 118 contains amplified inter-connections between venues in both locales from which the recommendation engine 112 can draw upon to make recommendations for the user.

To determine which venues from the geographically distance locale to recommend to the user, the recommendation engine 112 looks for strong overall link strengths between venues in the geographically distance locale and the venue(s) the user expressed an affinity for as part of his search query or venues the user is known to like. The venues in the geographically distant local having the strongest overall link strengths to these venues are then generated by the recommendation engine 112 and served to the user via the user interface. Therefore, the system 100 can provide a user with the ability to identify venues of interest in foreign locales by using review data between locales in which the system 100 contains a highly developed neural network topology with respect to user interests and a foreign domain in which the system 100 does not have much information about user interests by augmenting the neural network interconnectivity therebetween via correlative review data.

FIGS. 23 and 24 provide an illustrative example of the initial processing of interconnectivity augmentation of determining interconnection data between two geographically diverse locals in response for a user query for a venue in New York based on an affinity for a venue in Boston. For the purposes of this example, it is assumed that the user lives in Boston and would like to determine a venue of interest for his upcoming trip to New York. Assuming the system 100 contains a well-developed neural network topology for users interests in Boston but contains little information on users interests in New York, the system 100 must augment the existing neural network established based on interrelationships developed in Boston to include additional links to venues located in New York. Accordingly, in selected embodiments, all of the review data in which reviewers have provided reviews for both Boston and New York venues is identified and is used to determine collaborative relationships values between the venues in both cities. This information can then be used to update interconnectivity between the neural network topology in both Boston and New York thereby allowing the system to follow links from Boston to New York to recommend venues to the user.

To increase efficiency and decrease processing demands, in selected embodiments the system 100 may only perform interconnectivity augmentation with respect to venues that are closely related to the venue in which the user has expressed an affinity for in his search as determined based on at least the overall link strength or other methods described above. For example, in this embodiment if the user expresses an affinity for an American restaurant having casual attire and a low price point, the recommendation engine 112 will determine a set of venues having a strong overall link strength with respect to this restaurant within Boston and then perform interconnectivity augmentation to determine which of these venues have review data in which the reviewer also provided data for venues in New York. If there is not enough review data to determine ample interconnectivity information between the generated venues in both locales, the recommendation engine 112 will identify a plurality of other venues having a strong overall link strength with the previous set of generated venues and the system 100 will again determine if there is enough review data between both locales such that nodal links between both Boston and New York can be updated in a way that allows the recommendation engine 112 to recommend venues in New York with a high level of confidence. This process is repeated until the system 100 determines that a predetermined number of venues in which review data is available for both locales has been reached.

FIG. 23 provides an illustrative example of a plurality of venues identified by the system 100 in which Reviewers 1-5 have provided review data for both Boston and New York. For illustrative purposes and the ease of explanation, FIG. 23 provides three venues in both New York and Boston but it is noted that this is only a non-limiting example as additional restaurants would likely be included when performing interconnectivity augmentation. As seen in FIG. 23, Reviewer 1 is an avid reviewer and has provided a plurality of reviews in both Boston and New York and Reviewer 3 is less active and has only provided review data for one restaurant in New York and Boston. For the purposes of this example, it is assumed that Restaurant D is the actual venue the user expressed an affinity for when performing a search for restaurants in New York, Restaurant E is a restaurant having a strong overall link strength to Restaurant D, and Restaurant F is a restaurant having a low overall link strength to Restaurant D. Assuming that an adequate number of venues having reviews in both Boston and New York have been identified by the system 100, collaborative based link strengths are determined based on the review data.

FIG. 24 illustrates the collaborative based links strengths between Restaurants A-F based on the reviewer ratings illustrated in FIG. 23. Accordingly, Restaurant A and Restaurant F have a strong collaborative interrelationship nodal link value of +1.5 based on strong reviews by Reviewer 1 whereas Restaurant D and Restaurant F have a very low collaborative nodal link value of −1.5 based on opposite affinities expressed by both Reviewer 1 and Reviewer 2. These collaborative venue link values represent interconnections between Restaurants A-C of New York and Restaurants D-F of Boston. Therefore, as previously discussed, through the process of interconnectivity augmentation, the system 100 traces sparse cross connections between venues of different locals (Boston and New York) to create "spider webs" of information therebetween. The recommendation engine 112 can then navigate links of these spider web based on overall link strengths to determine recommended venues in New York based on the neural network topology interconnections between Boston and New York.

FIG. 25 presents a connectivity diagram illustrating the spider web generated by the system 100 based upon a user query for a restaurant in New York and the review data obtained for venues in both New York and Boston. Solid connections between the venues represents a positive collaborative link between the venues whereas dotted connection represent a negative collaborative anti-link between the venues. Further, the thicker the line illustrated in FIG. 24, the stronger the value (either negative or positive) for that particular nodal link. For example, the nodal link 2500 between A and F is a solid line with relative thickness based on the overall collaborative link strength value of +0.75. Further, the nodal anti-link 2502 between D and F is has a relative thickness and is dashed to represent a negative overall collaborative link strength of −1.5. Based upon these links created by the system 100, the recommendation engine 112 can determine a variety of recommendations for the user for New York based on the overall collaborative interconnectivity link strengths between the restaurants in Boston and New York.

For example, as it is assumed that Restaurant E is the actual restaurant in Boston the user expressed an affinity for in his search query, the recommendation engine 112 may generate a recommendation containing Restaurant A in New York as Restaurant A is directly linked to Restaurant E via nodal link 2500 and has a positive collaborative nodal link value. The recommendation engine 112 may also recommend Restaurant B as it is linked to Restaurant E via Restaurant A (nodal link 2504) and has a strong nodal link strength with Restaurant A. As Restaurant C does not have any collaborative connections to Restaurant E or Restaurant A, the recommendation engine 112 would likely ignore this node when presenting New York venue recommendations to the user.

Assuming the user expressed an affinity for Restaurant F in his search query for recommended venues in New York and the network topology was defined by the system 100 based on reviewer data as illustrated in FIG. 23, the recommendation engine 112 may still recommend Restaurant A over Restaurant B even though both Restaurant A and Restaurant B are linked to Restaurant F as Restaurant A has a stronger collaborative nodal link strength with Restaurant F via link 2500. However, Restaurant B could also be served to the user as an alternative choice. However, if the restaurant for which the user has expressed an affinity for in the search query is not included in the network topology data because there was not enough reviewer information relating to that restaurant, the system 100 will determine the venue having the strongest overall link to the restaurant provided in the search query but which also has ample review data with respect to venues in the foreign local in which the user is seeking recommendations. The recommendation engine 112 can the navigate the neural network amplified via interconnectivity augmentation to find a recommendation in New York based on the venue in Boston having the strongest overall link strength value to the venue the user expressed an affinity for in his search query.

Accordingly, the interconnectivity augmentation process determines venues having strong overall link strengths with venues the user expresses an affinity for when performing a search query and then determines a plurality of reviewer data with respect to these venues and the location in which the user is requesting recommended venues. A network topology based upon the collaborative values between venues with respect to the review data is generated and it is determined whether there is enough information from which the system 100 can make a recommendation to the user. If there is not enough information, the system 100 generates additional local venues with links to the restaurant provided in the search query and the network topology is updated based on review data with respect to the venues and the venues in the foreign local. Once there is a predetermined amount of collaborative link strength data between the plurality of venues both within the locale of the user and the foreign local, the recommendation engine 112 determines recommended venues in the foreign local by following the strongest overall nodal links in the network topology while starting at the local node expressed in the search query or the local node having the strongest overall link to the venue identified in the user search query. The recommended venues are then served to the user via the user interface.

If the user provides additional filters with the search query in addition to the affinity for a particular venue, the system 100 will take this into account when creating the network topology by harvesting data on the local and foreign venues and identifying which data corresponds to the data within the filter. For example, if the Boston user is a New England Patriots fan and is looking to watch the Monday night game in New York while avoiding heckling from New York Giants fans who mistakenly believe Eli Manning is better than Tom Brady, the user may indicate that he would like a restaurant identified as Patriots friendly. Accordingly, based on the example illustrated in FIG. 25 in which the user expressed an affinity for Restaurant E in Boston as part of his search query, if Restaurant A is a Giants friendly venue and Restaurant B is a Patriots friendly venue, the recommendation engine 112 will recommend Restaurant B over Restaurant A even though Restaurant A has a stronger overall collaborative link value to Restaurant E based on the reviewer data therebetween. Further, the user may have kids and will therefore want a venue that is friendly to children. Therefore, venue attributes and user characteristic attributes can also be taking into account by the system 100 when performing interconnectivity augmentation to determine recommendations in locations where the system 100 does not have a lot of information about what the user likes in that particular location.

In other selected embodiments, the system 100 may perform interconnectivity augmentation to recommend venues in a foreign local in which the system 100 has very little information about user interests by taking into account user specific information known to the system 100 in other locals As with the examples discussed above, the system 100 may not have much information about what the user likes in New York but may have ample information about what user likes in Boston. Accordingly, user attributes, review data from the user, previous recommendations known to have been effective and the interrelationships formed based on content and reviewer data from the user local can all be used to extrapolate venue "clones" in a foreign local that are similar to or identical to venues known by the system 100 to be well received by the user. These nodal doppelgangers can then be incorporated into the neural network topology previously defined as discussed above based on content and collaborative interrelationships within the local area of the user such that the system 100 can follow the nodal links to determine venue clones in a foreign locale that may be of interest to the user. Further, the list of nodal doppelgangers will inherently be cross-connected with a plurality of other venues within the foreign locale such that additional recommendations can be made to the user. Accordingly, alternatively or in addition to review data between two locales, interconnectivity augmentation can also be performed based solely on user interest information from other locales.

FIG. 26A is a chart illustrating an exemplary sample set of venues within New York, New York that are stored within the data repository 118. As with FIG. 4, each Restaurant A-E has its own price, genre, hours of operation, attire and neighborhood. Accordingly, as described previously with respect to FIG. 4-12 and FIG. 23, the system 100 contains information, determined via web crawling and web harvesting, about venues in Boston and nodal interrelationships therebetween and knows information about venues in New York but does not have information on nodal links between the venues in Boston and the venues in New York. Therefore, interconnectivity augmentation can be performed utilizing nodal cloning in order to determine intercity nodal relationships between Boston and New York.

Assuming the user is located in Boston and has performed a search query for venues in New York, the system 100 must determine which venues the user is typically interested in Boston. The system 100 can receive as part of the search query for venues in New York, restaurants in Boston that the user likes in which he wishes to find similar restaurants in New York. The system 100 can also determine which venues the user likes based on previous recommendation data that has been determined to be effective via financial transactions of the user, positive review data, GPS data or other data as described previously herein. The system 100 then compiles this list of interests of the user within Boston and compares each venue or piece of interest to known venues in New York to determine nodal doppelgangers within New York that have many of the same features of the venues identified within Boston.

FIG. 26B is a chart illustrating the results of processing to determine a congruency factor representing a similarity level between the venues of interest from Boston and venues in New York. In FIG. 26B, it is assumed for the purposes of this example that both Restaurant 6 and Restaurant 10 were included as part of the search query by the user for restaurants in New York and/or were determined to be venues that were previously recommended and were effective with respect to the user. Accordingly, the system 100 compares each attribute of Restaurant 6 and Restaurant 10 to each attribute of a plurality of identified venues within New York in an attempt to determine one or more venue clones having a high congruence factor with Restaurant 6 and Restaurant 10 of Boston.

Based on these comparisons, Restaurant C of New York has the highest congruency factor with respect to Restaurant 6 as the price is the same as Restaurant 6, the genre is the same as Restaurant 6 and the attire is the same as Restaurant 6. Conversely, Restaurant D has the lowest congruency factor with respect to Restaurant 6 as the price point is extremely high, the genre is different and the attire is different. With respect to Restaurant 10 of Boston, Restaurant D has the highest congruency factor as the price point is similar, the genre is the same and the attire requirements are the same. Accordingly, by determining the congruency factors, the system 100 can identify venues in a foreign local that have the features similar to user-provided venue filters and/or venues which have been determined to be effective for the user in the past.

The congruency factor scores are exemplary and will change based on various venue attributes as well as different weights assigned to various venue attributes. For example, genre may be weighted the highest as a user searching for restaurants in New York who provides Restaurant 6 of Boston as part of the search query will likely identify with New York restaurants that have the same type of food. Further, price may be weighted less than genre but more than attire. These weights can be set automatically by the system 100 or manually by the user performing the search. The congruency score for Restaurant 6 of Boston in comparison to Restaurant C of New York is not 1.0 because it is assumed that there may be other factors taken into consideration in determining how similar Restaurant C is to being a clone of Restaurant 6. These factors include, but are not limited to, hours of operation, review data, user characteristic data and previously defined nodal link interrelationship information between Restaurant 6 and other restaurants in Boston or New York. The user may also indicate likes and dislikes which will affect the weighting of the various venue attributes. For example, if the user detests dressing up when going out to dinner, the system 100 may apply an extremely high weighting factor to the attire attribute thereby causing restaurants requiring formal attire to have extremely low congruency factors even though they are similar to the identified local restaurant in many other respects.

Once the system has determined the plurality of congruency scores with respect to the restaurants of interest identified based on the venues provided in the search query or those known by the system 100 to be effective, the system 100 updates the neural network topology to form nodal links between the identified venues of interest and the venues identified in the foreign local. In selected embodiments, the system 100 may link all nodes between the locales regardless of the congruency factor or may link only those nodes having a strong congruency factor therebetween. Accordingly, the system 100 or user may assign a predetermined threshold congruency factor for magnifying nodal interconnectivity between various locales.

Figure 27:
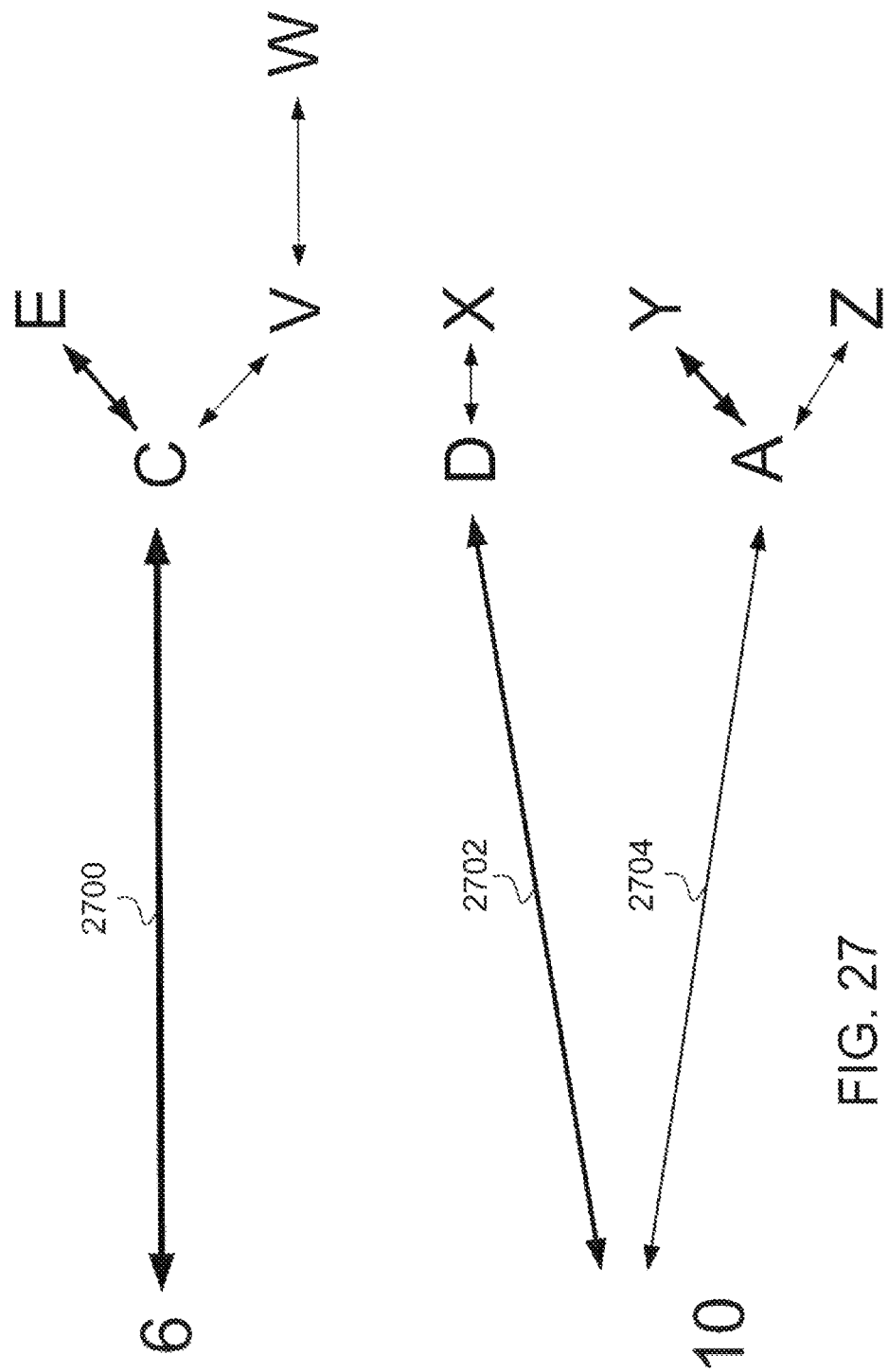
FIG. 27 illustrates inter nodal connections after interconnectivity augmentation processing according to one example.

FIG. 27 represents nodal interconnection magnification between Boston and New York based on the plurality of congruency factors determined with respect to Restaurant 6 and Restaurant 10 of Boston, and Restaurants A-E of New York. For the purposes of this example, FIG. 27 only illustrates nodal inter-locale augmentation for nodes having a congruency score of at least 0.60 or better. As illustrated in FIG. 27, a nodal link 2700 is formed between Restaurant 6 of Boston and Restaurant C of New York as the congruency factor therebetween as determined by interconnectivity augmentation processing is 0.85. Further, nodal links 2702 and 2704 are formed between Restaurant 10 of Boston and Restaurants A and D of New York as Restaurant 10 and Restaurant A have a congruency factor of 0.65 and Restaurant 10 and Restaurant D have a congruency factor of 0.75. The difference in thickness of the nodal link represents the strength of the congruency factor such that the thicker the nodal link the more similar the venues are to each other. Accordingly, nodal link 2504 based on a congruency factor of 0.75 is thicker than nodal link 2502 having a congruency factor of 0.65. Further, nodal link 2500 based on a congruency factor of 0.85 is thicker than both nodal link 2502 and nodal link 2504. Restaurants E, V, W, X, Y and Z are Restaurants in New York that have strong overall link strengths to Restaurants C, D and A as illustrated based on content-based interrelationships, collaborative interrelationships, content-collaborative interrelationships and tiered relationships as described previously herein.

Based on the amplified neural network formed between Boston and New York formed as a result of the interconnectivity augmentation performed in response to a search query for a venue in New York based on an affinity for Restaurant 6 and/or Restaurant 10 of Boston, the recommendation engine 112 can traverse the links in the updated neural network topology to provide recommendations to the user for venues in New York. For example, as illustrated in FIG. 27, for a user expressing an affinity for Restaurant 6, the user will be served with a recommendation for Restaurant C in New York. Similarly, for a user expressing an affinity for Restaurant 10, the user will be served with Restaurant D and Restaurant A with an indication the Restaurant D was the closest venue based on the user's search query. Further, interconnections within the neural network of New York can further be used to provide larger recommendation sets. For example, for a user expressing an affinity for Restaurant 6 in a search query, Restaurant E may be recommended next as having a strong overall link strength to Restaurant C with Restaurant V and W being recommended next as alternative venues based on their overall link strength with respect to Restaurant C.

As described previously, if the user provides additional filters with the search query in addition to the affinity for a particular venue, the system 100 will take this into account when creating the network topology by harvesting data on the local and foreign venues and identifying which data corresponds to the data within the filter. For example, if the user performs a search query by expressing an affinity for Restaurant 6 but also provides a filter that requires a medium price point for recommended venues, the recommendation engine 112 may recommend Restaurant E over Restaurant C as the recommendation engine 112 is able to traverse the nodal link 2700 to determine the Restaurant C is a good match but further determines based on venues having strong overall link strengths with respect to Restaurant C that Restaurant E is a better choice because it has a medium price point as compared to Restaurant C's low price point. Therefore, venue attributes and user characteristic attributes can also be taking into account by the system 100 when performing interconnectivity augmentation to determine recommendations in locations where the system 100 does not have a lot of information about what the user likes in that particular location.

It should be noted that the system 100 may also contain large amounts of information with respect to user interests in locales other than the one in which the user is located that can also be used to perform interconnectivity augmentation based on congruency factors via a determination of nodal doppelgangers. In other words, when a user from Boston is looking for venues of interest in New York, the system 100 may also perform interconnectivity augmentation in the above-noted manner by using recommendations known to be effective in other areas with respect to the user, such as Washington D.C., to further enhance the variety of recommendations provided to the user. Further, congruency factors determined between different locales can be weighted differently based on user time spent in the locales, the number of effective recommendations or the like and then compared to determine a more accurate recommendation set for the user. Additionally, the system 100 may encounter difficulties performing interconnectivity augmentation between Boston and New York if venue information from New York is not readily available. In such a situation, if the system 100 already contains strong links to another city, such as strong links between Boston and Washington, D.C., and strong links from Washington D.C. to New York, the system 100 may determine recommendations by navigating the nodal network topology from Boston to New York via nodal links provided in Washington D.C.

Although the links may be uni-directional or bi-directional as previously described herein, the nodal links determined via interconnectivity augmentation as illustrated in FIGS. 25 and 27 are bi-directional to further enhance information available to the system 100 in the event that similar future searches are performed by the same user or other users with similar interests either in Boston or New York.

As noted above, the system may perform interconnectivity augmentation based on both review data between different locations and via a determination of nodal doppelgangers in different locales. Accordingly, the system 100 may update the neural network topology of nodes between different locales based on review data and then may further update this network topology based on nodal link determinations identified via congruency factors. As such, interconnectivity augmentation therefore provides the system 100 with the ability to extrapolate information about foreign systems to generate an updated neural network topology having connections between a locale in which the system has ample information about what the user likes and a local in which the system 100 has very little information about what the user likes. This provides enhanced functionality to the user in that the system 100 acts as a travel companion to provide venues of interest to a user when a user is traveling to various locations. This increases the likelihood that the user will enjoy his experience when traveling and will further enhance the network topology thereby increasing the accuracy of future recommendations to the user.

Further, error correction and data verification can be performed to ensure and/or strengthen the accuracy of the recommended venues which may in turn be used to identify reviewers who have submitted review data with respect to the recommended venues and venues in other locations requested by the user.

Merchant Interface

The venues are operated by merchants, or third party vendors, which may comprise merchants such as restaurant owners, airlines, or hotel operators. The system 100 may be configured to provide merchants a visualization of users' behavior. For instance, merchants may be provided access to ant trail data patterns, including in real time. Merchants can "interact" with these patterns and request the system 100 to inject disruptive content such as promotional offers related to a user's present location and expressed preferences.

Merchants may also be provided anonymized profiles of the likes and dislikes of their customers (i.e. users who patronize their establishment). This can include reviews provided by reviewers and users who provide feedback (who also constitute reviewers).

Additionally, it is anticipated that merchants will likely wish to provide personalization services to their customers to ensure customer retention while increasing revenue. For example, merchants selling products either online or in the brick-and-mortar world may want to identify recommendations for their customers based on at least previous purchases by the customer, customer attribute data, review data, data about the product itself and the accompanying neural network topology generated based such information. However, it is unlikely that merchants will have this functionality to provide users, much less the ability to provide these types of services on the scale and accuracy of the system 100. Accordingly, the system 100 provides an application programming interface (API) operated by the server 102 for allowing merchants to supply data to the system 100 which can be used by the recommendation engine 112 to determine recommendation or similarity data. The system 100 then sends this data back to the merchant.

Figure 28:
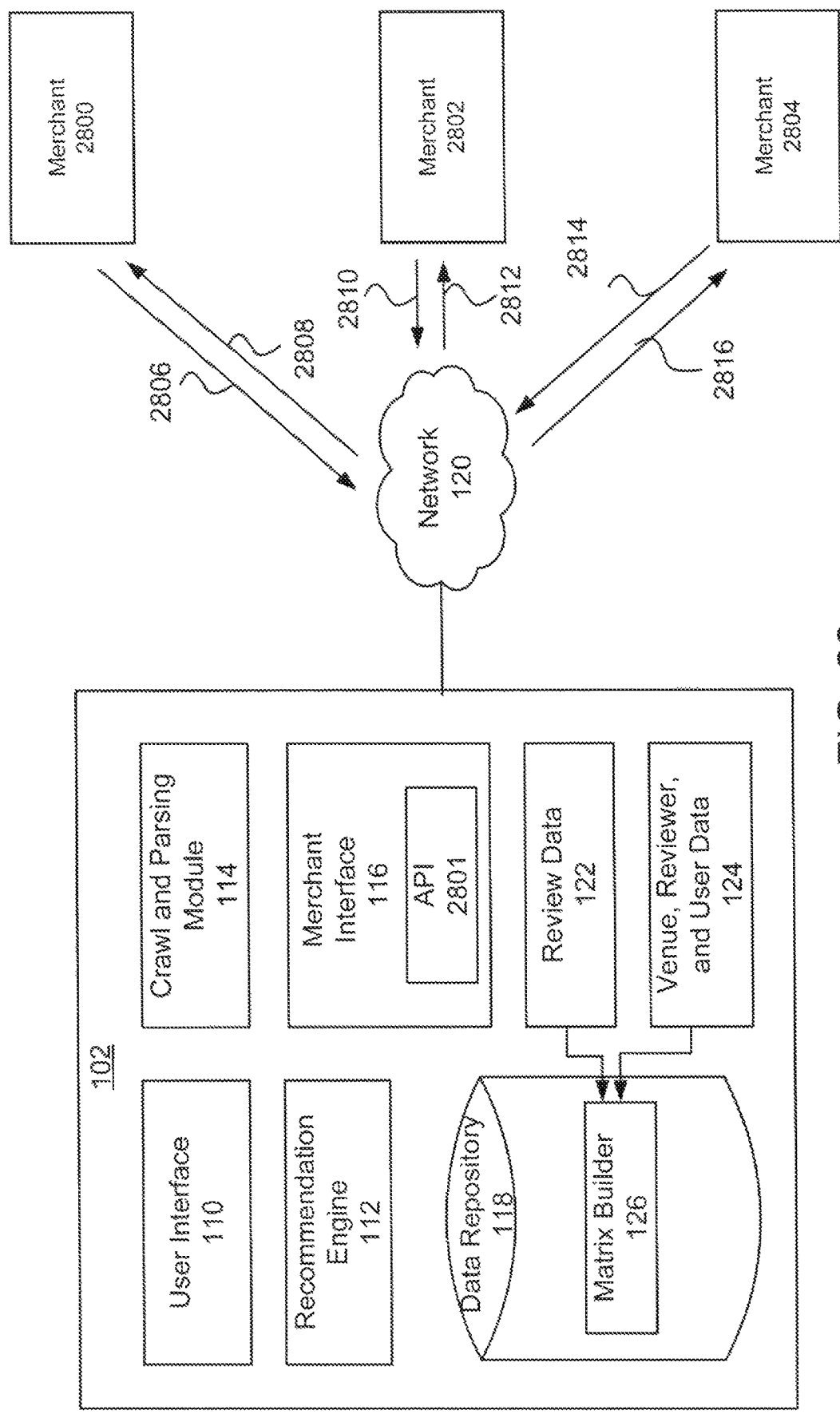
FIG. 28 illustrates an exemplary interaction via the system API between the server and a plurality of merchants.

FIG. 28 illustrates an exemplary interaction between the system 100 and a plurality of merchants/third party vendors 2800, 2802 and 2804 via an API 2801. FIG. 28 includes the server-based recommendation generation system 100 hosted on the server 102 as illustrated in FIG. 1 and therefore like designations are repeated. Further, the merchant interface 116 is illustrated as including the above-noted API 2801. As illustrated in FIG. 28, the server 102 is connected to a plurality of merchants 2800, 2802 and 2804 via the network 120. Each merchant can provide the server 102 with a plurality of requests which are received by the API 2801 via the network 120. The requests can include information such as identification information of the merchant, the type of request, the type of information included in the request, the data which the system 100 will process, a request for a quote for processing the request, and temporal information with respect to the request itself. In response to receiving requests from the merchants, the recommendation engine 112 processes the requests and generates results which are output to the merchants via the API 2801 and network 120.

In selected embodiments, the API 2801 includes a set of programming instructions and standards for accessing the system 100 such that merchants can appropriately format their requests in a manner understood by the system 100 and so the API 2801 can provide responses to the merchants in a manner manageable by their systems. In other words, the API 2801 provides programming such that the server 102 and remote applications operated by the merchants 2800, 2802 and 2804 can communicate with each other through a series of calls. For example, web services having a collection of technological standards and protocols, such as extensible markup language (XML) may be provided thereby allowing various parties from different systems to communicate. The API 2801 may be included as part of a software development kit (SDK) along with programming tools thereby providing the merchants 2800, 2802 and 2804 with instructions on how to best interact with the system 100. Additional technological standards, protocols and programming languages may be included such as simple object access protocol (SOAP) for encoding XML messages so that they can be understood by operating systems over any type of network protocol, and universal description, discovery and integration (UDDI) for allowing the merchants 2800, 2802 and 2804 to list themselves. Mashups may also be implemented within the system 100 thereby providing functionality from the API 2801 of the system 100 in conjunction with other web applications.

For the ease of explanation, FIG. 28 illustrates three merchants 2800, 2802 and 2804 providing different requests to the server 102 but one of ordinary skill in the art would clearly recognize that more than three merchants can connect to the server 102. In FIG. 28, it is assumed that the merchant 2800 has identified a cluster of items of which a customer of the merchant 2800 has expressed a preference as determined by purchase data, shopping habits, and other methods as would be understood by one of ordinary skill in the art. For the purposes of this example, it is assumed that the customer of the merchant 2800 has purchased three bottles of wine (or has three bottles of wine in their shopping cart) and is looking for one more bottle of wine. The merchant 2800 may want to provide the customer with a recommendation of additional wines for purchase and therefore interacts with the server 102 via the request 2806 and API 2801. The request 2806 defined by the API 2801 infrastructure includes a request for the recommendation engine 112 to determine one or more recommended items that the user may like based on the cluster of items included in the request 2806. The request 2806 may include identification information of the merchant 2800, information specifying the type of request such as a request for recommendation data, a categorical description of the data, and the data of which the system 100 will determine recommendations. For example, the request 2806 may include the name and address (virtual and real-world) of merchant 2800, a request for recommendations based on the data set provided by the merchant 2800, information specifying that the data set relates to beverages or more specifically alcoholic beverages such as wines, and the list of wines for which the merchant 2800 would like the system 100 to process. This request 2806 may be served to the system 100 at the time of a purchase by the customer or at a later time when the merchant 2800 is attempting to determine advertisement information based on previous customer activity.

Once the request 2806 is received by the API 2801 via the merchant interface 116 and network 120, the system 100 determines the type of request and the type of information included in the request. For example, the system 100 parses the system call from the merchant 2800 to determine that the recommendation engine 112 must generate recommendations as described above based on the list of wines provided in the request 2806. If the type or genre of information is not included in the request, the system 100 may generate an error message to the merchant 2800 or may attempt to determine the type of information. For example, the recommendation engine 112 may attempt to determine whether the items within the request 2806 relate to cars, food, video games, or as in this instance, wine based on keywords identified in the request 2806 itself.

Once the recommendation engine 112 has determined the type of request and what type of information is included in the request, the recommendation engine 112 identifies whether the data repository 128 includes the appropriate neural network topology generated by the matrix builder 126 in which to process the request 2806. Specifically, in selected embodiments the system 100 may generate network topologies in all types of fields and for all types of products in addition to the venues discussed above. Therefore, the data repository 118 may already contain a neural network topology for the cluster of items relating to wine contained in the request 2806. In other embodiments, the system 100 may dynamically generate a new network topology or update a previously existing network topology as previously described herein (via harvesting, creating nodal links, error correction and data verification, interconnectivity augmentation, etc) based on the type of items identified in the request 2806.

Once the system 100 has determined that a suitable neural network topology exists for which to process the request 2806, the recommendation engine 112 generates a recommendation set for the merchant 2800 of items that users may like based on the cluster of items provided in the request 2806. Specifically, the recommendation engine 112 generates recommendations based on the methodologies described previously herein such as identifying overall link strength rankings, performing error correction and data verification with respect to source sites, performing geometric contextualization with respect to the generated recommendation set and performing resonance checking of each recommendation in the recommendation set. Once the final recommendation set is generated by the recommendation engine 112, the server 102 provides the recommendation set including a plurality of recommended wines to the merchant 2800 in a response 2808 via the merchant interface 116, API 2801 and network 120.

FIG. 28 illustrates another example of a request 2810 from merchant 2802 including at least the merchant 2802 identification information, a request that the system 100 provide information as to what items may be similar to the items provided in the request 2810, an identification of the items as beverages and the list of one or more wines. For example, assuming that the data items included in the request 2810 again include three bottles of wine, the merchant 2802 requests information as to what other drinks may be similar to the bottles of wine such as other wines, champagne or liquor, that the user may like based on a similarity to the wine bottles included in the request 2810. In this instance, the recommendation engine 112 identifies the type or genre of information included in the request 2810 and determines whether the appropriate neural network topology exists for similar items. Specifically, the recommendation engine 112 determines a plurality of items that may be similar to the items included in the request 2810 and determines whether an adequate neural network exists for each item.

The system 100 may determine similarity to an item in a variety of ways. For example, in selected embodiments, the system 100 determines that bottles of wine fall into a drink category and therefore that only drinks should be contemplated by the system 100 when attempting to determine similarities. This can be accomplished by performing keyword searches with respect to the items included in the requests and/or by referring to a previously defined database updated based on user and vendor requests. Next, additional subcategories are determined until the system 100 identifies a plurality of categories deemed to be most similar to the items included in the request. For example, the system 100 may further identify the wine is a type of alcohol and therefore the system 100 should only search for other alcohols such as beers and liquors. Accordingly, the system 100 can generate a similarity score of various beverages based on nodal link strengths between beverages having similar attributes within the neural network. In other selected embodiments, the merchant 2802 may also provide in the request 2810 similar categories to search based on the items provided by the merchant 2802.

Once a list of items deemed to be similar to those listed in the request 2810 has been determined, the recommendation engine 112 generates a recommendation set as previously described herein and provides the recommendation set to the merchant 2802 in a response 2812. Specifically, overall link strengths are calculated by the recommendation engine 112 via collaborative-interrelationships data based on reviewer data between wines identified in the request 2810 and items deemed to be similar (such as liquors and beers), content-based interrelationships based on similar attribute data with respect to users who both drink the wines identified in the request 2810 and liquors and beers and wine attribute data such as the type of wine, the alcohol content, the location in which the wine is created, and content-collaborative interrelationships. Further, interconnectivity augmentation may be performed to bolster the neural network connectivity as well as geometric contextualization and error correction and data verification to enhance recommendation accuracy.

As described previously above, the requests coming from the merchants may also include filters with respect to the items included in the requests. For example, Merchant 2800 may request that the system 100 only return recommendations for wines that were made in or before a certain year. Merchant 2802 may request that recommendations for similar items be restricted to different types of beer rather than also including liquor as a subset. Accordingly, the recommendation engine 112 is able to provide merchants not only with recommendations for the same item or similar items included in requests but is also able to fine tune recommendations specifically tailored towards merchant requirements. Further, requests may include user attribute information from the merchant thereby providing the system 100 with additional information from which to generate a recommendation.

The API 2801 further provides the functionality for merchants to communicate a complete index of their items as well as user information with respect to the items to the system 100 with a request that the system 100 create a neural network topology specifically tailored to the communicated index of items. Accordingly, the request can also include item attribute data and item review data. The neural network topology generated by the system 100 can then be used by the recommendation engine 112 to provide enhanced recommendations that are finely tuned to the enriched data provided by the merchant. This neural network topology can be generated solely based on the merchant index of items or an existing system 100 neural network topology can be updated based on the information contained in the merchant index. Therefore, such a request may contain identification of the merchant, the type of data, the complete index of the merchant's products and a request that the system 100 build personalization maps such as a neural network topology based on the data provided by the merchant. The request may also include user attribute information with respect to these products. For example, request 2814 from merchant 2804 is a request providing the name and address of merchant 2804, an identification of the data as relating to wine, all of the wines sold or made by the merchant 2804 as well as user information with respect to each bottle relating to purchases statistics, likes or dislikes and other affinity data, and a request that the system 100 generate a neural network topology based on this information.

Once the request is received by the merchant interface 116 via the API 1801, the matrix builder 126 generates a neural network having internodal connections between all of the wines identified from the merchant-provided index and the user data provided in the request 2814. The system 100 may further augment the neural network using other information harvested by the system 100 as described previously herein. Accordingly, the request 2810 may also include information identifying whether or not the merchant 2810 wants the system 100 to use information additional to the information provided in the request 2810.

Once the neural network is generated by the system 100, the merchant 2804 can then submit further requests to the server 102 via the network 120 and merchant interface 116 as previously described herein in order to obtain recommendations or similar items generated by the recommendation engine 112. Further, the merchant 2804 may further request that the server 102 communicate the neural network topology information to the merchant 2804 in response 2816 so that the merchant can use such information internally.

Based on the information provided in the requests from the merchants, the API 2801 may capture this information such that the system 100 may update the neural network topology for further use with the merchant as well as with other users of the system 100. For example, when merchant 2800 sends the request 2806 including the three bottles of wine, the system 100 may determine that the user picked these three wines and that pairing information can be obtained with respect to the user and the wines themselves. Accordingly, this information can be used by the matrix builder 126 to create or update nodal links with respect to data items of this type. Further, the API 2801 can capture user information in the requests thereby mapping user attribute information with specific pairings of items. The system 100 may also capture via the API 2801 the effectiveness of the recommendations provided to the merchants in the system 100 responses. For example, the system 100 may send system call requests via the API 2801 to merchants requesting that the merchants return user effectiveness data with respect to recommended items such as increased revenue based on certain recommendations and/or whether certain customers of the merchants have purchased items based on the recommendations served by the recommendation engine 112.

Accordingly, via the API 2801 the system 100 is able to provide specific merchants with personalization services thereby helping merchants retain customers and increase revenue. Merchants can request recommendation data from the server 102 as well as specific personalization maps with respect to information provided by the merchants relating to the entire catalog of merchant products. Further, while providing these services to the merchants, the system 100 simultaneously harvests merchant information to increase the accuracy of nodal connections in existing neural network topologies in areas relating to merchant product catalogs. Therefore, the merchants are provided with beneficial personalization services while also further enhancing those services for other users and merchants alike through their interaction with the system 100.

Further Discussion of Collection of Venue and User Data According to Selected Embodiments Venue data is generated based on information determined by the crawl and parsing module 114 as described previously herein. For example, FIG. 29 shows an exemplary corresponding matrix of attributes detected by the crawl and parsing module 114 and stored in the data repository 118 by the matrix builder 126. In this example each restaurant is in Boston, Mass. and the price varies on a ten point scale. Attire is assigned alphabetic codes (e.g., formal, casual, hipster), although numeric codes are used in certain embodiments. Zip codes are used as neighborhood values in this example. Venue attributes also include genres such as Japanese, Italian, American, French, Western, Chinese, pastries, desserts, and the like.

In addition to location information such as city, state country and the like, the venue attribute information can also contain coordinate information with respect to the location of each venue. In selected embodiments, this location data takes the form of latitude and longitude coordinates. This information can be obtained by comparing address information to databases containing corresponding coordinate values and retrieving that information via the crawl and parsing module 114. GPS and other types of location services could also be used to generated the appropriate geographic coordinate data. The coordinates can then be used to key certain venues to certain geographic grid areas as described further below with respect to spatial segmentation.

User data is generated, in part, based on the venue review data determined via the crawl and parsing module 114 as described herein. The crawl and parsing module 114 may have obtained information identifying that the user gave high reviews to certain venues or particular attributes of venues. For example, user affinity data for various restaurants could be obtained based on a user having posted review data or having been geographically present in particular venues for a predetermined amount of time. A user's affinity for particular venue attributes, such as genre, price, attire, hours and neighborhood, may also be determined via the crawl and parsing module 114.

User information is also generated upon creation of an account or in response to another triggering event such as a request for a new recommendation. The system 100 may require a user to input various data including gender, age, marital status, children ages, children gender, third parties with whom the user is socially networked, hobbies, interests, favorite venue information (in one or more venue categories), and preferred or non-preferred reviewing entities (if any).

Accordingly, the user data may be input by each user and/or collected from web data sources in the manner set forth above. The matrix builder 126 then stores the user data in the data repository 118 as illustrated in FIG. 30. FIG. 30 is a chart showing a matrix of user attributes for seven users including personal attributes such as gender, age and the number of children. Personal attributes (not shown) can also include things such as profession, education, marital status, address and the like. User attributes also include favorite venues and in selected embodiments, each user is asked for favorite venues. In other embodiments, a list of preferred venues in various different venue categories is included in the user profile. As illustrated in FIG. 30, the user attributes also include their affinities for certain venue attributes such as price, genre, hours, attire, neighborhood. Other user attributes (not shown) can include affinity levels for speed of service, quality of service, accommodations and the like.

Once all of this information is received by the server 102 via at least the user interface 110 and crawl and parsing module 114, the matrix builder 126 creates user affinity weighting values based on the interrelationships between the user attribute data and venue attribute data. For example, the system 100 calculates a weight value for certain user attributes such as genre, hours, price and attire and neighborhood. As noted previously herein, this information is derived at least from information received from the user or by reviewing information obtained from the crawl and parse module 114 such as prior restaurants visited, review data from the user, or financial spending habits. Therefore, if the system 100 determines that the user has previously visited or indicated American restaurants as favorable, the system 100 may apply a higher weighting value to this attribute. Similarly, the user may have a preference for a particular dress attire when visiting restaurants and therefore this information may be given a higher weight. In selected embodiments, negative weights can be assigned to user attributes deemed by this system 100 to be extremely unfavorable to the user such as a dislike of certain types of food, certain prices and the like. Additionally, general user weighting data can be derived by the system 100 based on the physical and personal attributes of the user such as age, gender, marital status and the number of kids of the user. For example, the system 100 may apply a higher weighting value to venues having a medium to high price range with a formal dress code for a middle aged married man whereas a younger user may receive higher weightings for lower priced restaurants with a more casual dress code.

The weighting values can be any numerical value such as a percentage or value on an overall scale. For example, in selected embodiments, the lowest weighting value is set to a value of zero whereas the highest weighting value is set to a value of one. FIG. 31, with respect to FIG. 30, illustrates a corresponding matrix of weights for various users according to one example. In FIG. 31 and with respect to User 1, the system 100 has calculated a high weighting value of 0.8 for both Japanese and American restaurants as User 1 has either indicated his preference for these restaurants, he has visited these types of restaurants before or perhaps has provided positive reviews about such genres. As User 1 prefers a lower price point, the system 100 assigns a high weight to the lower price points and gradually decreases the weighting value as the price goes up. Further, FIG. 31 illustrates that the system 100 assigns a high weight value to venues open later than 8:00 PM thereby identifying that this time is usually preferable to the user. The system 100 also calculates that a variety of dress codes are acceptable to the user but at varying weight levels thereby indicating that the user prefers a casual dress code but will accept a formal dress code based on other attributes involved. The neighborhood information indicates that User 1 prefers 02163 which is perhaps a location close to work or home whereas User 1 dislikes neighborhood 02196 which is perhaps a neighborhood having high crime or no public transportation options. In selected embodiments, a negative weighting value could be assigned to neighborhood 02196 to represent a more severe level of dislike for this area.

Various weight options are available as illustrated in FIG. 31. For example, the system 100 has determined that User 2 would only like to receive recommendations for Italian restaurants and prefers eating at times between 5:00 and 6:00 PM. While a lower price point of 3 is preferable to User 2, the user will also accept other price points. Accordingly, the attribute weight values indicate the likes and dislikes of a plurality of users. If the system 100 does not have information with respect to certain attributes, the recommendation engine 112 may either ignore recommendations having these attributes or may apply a predetermined "general" weighting value. For example, the recommendation engine 112 may assign a value of 0.0 to signify that the system 100 did not have any data with respect that attribute such that it is likely the user does not have an affinity for that attribute. Also, depending on the data available to the recommendation engine 112, a nominal predetermined weighting value, such as 0.2, may be assigned to indicate that the system 100 may not have enough information but should not fully penalize this attribute with respect to user taste. Further, as various factors are involved in determining the user's affinity level for a particular attribute (i.e. review data, user input data, past history data) there may be different levels of weighting for attributes identified in the same category within FIG. 30. For example, FIG. 30 illustrates that User 1 has a preference for both American and Japanese but FIG. 31 illustrates that the system 100 has determine that User 1 prefers Japanese slightly more than American. This could be because the system 100 has determined via the crawl and parsing module 114 that User 1 has visited Japanese restaurants more frequently than American ones and/or the user lives closer to Japanese restaurants than American restaurants.

Spatial Segmentation

As previously described herein and with the propagation of mobile devices, it is has become increasingly common in industry to provide users with information on the go based on their location. In order to effectively provide these services, systems must have access to a multitude of information, such as venues, coupons and activities within the geographic location of particular users. For instance, if a user has just disembarked from the subway in Cambridge, MA, the system must have access to information within that specific geographic area in order to provide the user with recommendations in that area. Further, the system must efficiently determine, store and process this information in order to provide the best results to users in a timely manner.

Figure 32:
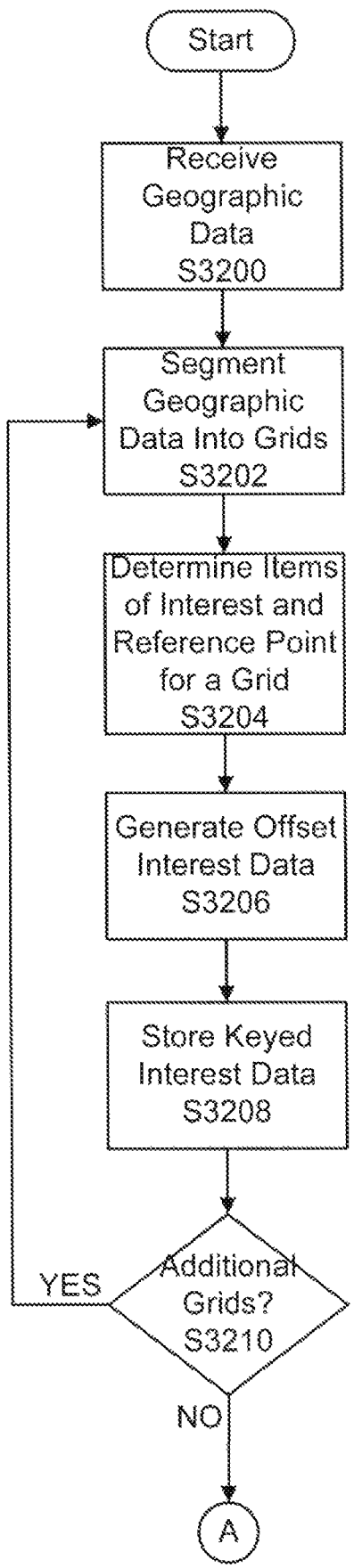
FIG. 32 is a flow chart illustrating geospatial segmentation according to one example.

In order to obtain and store information in different geographic areas, the server 102 performs spatial segmentation on various geographic locations. FIG. 32 is a flow chart illustrating the process of spatial segmentation according to exemplary embodiments. Initially, at Step S3200, the server 102 receives geographic data from predetermined locations all around the world (or in space). This information can be manually input by a user or retrieved via the crawl and parsing module 114 from generally known and available sources. For example, information may be retrieved from an online database containing geographic coordinate data from all over the world. The system 100 then systematically retrieves this data for processing in order to segment the data into various grids.

At Step S3202, the system 100 segments the geographic data into various grids have particular global coordinates. In selected embodiments, the system 100 segments the entirety of the geographic data at one time or systematically divides the geographic data into smaller portions before performing spatial segmentation into specific grids. For example, assuming the system 100 has retrieved geographic data of the entire world, the system 100 may first divide this information into continents, divide the continent information into countries and then divide the country information into states or towns and so forth. The extent of division of the geographic data is based on the degree of granularity at which the system 100 wants to create the grids based on particularities with respect to various locations. For example, the granularity level can be determined based on land area, population density, ethnicity, religion, and other cultural considerations.

Figure 33:
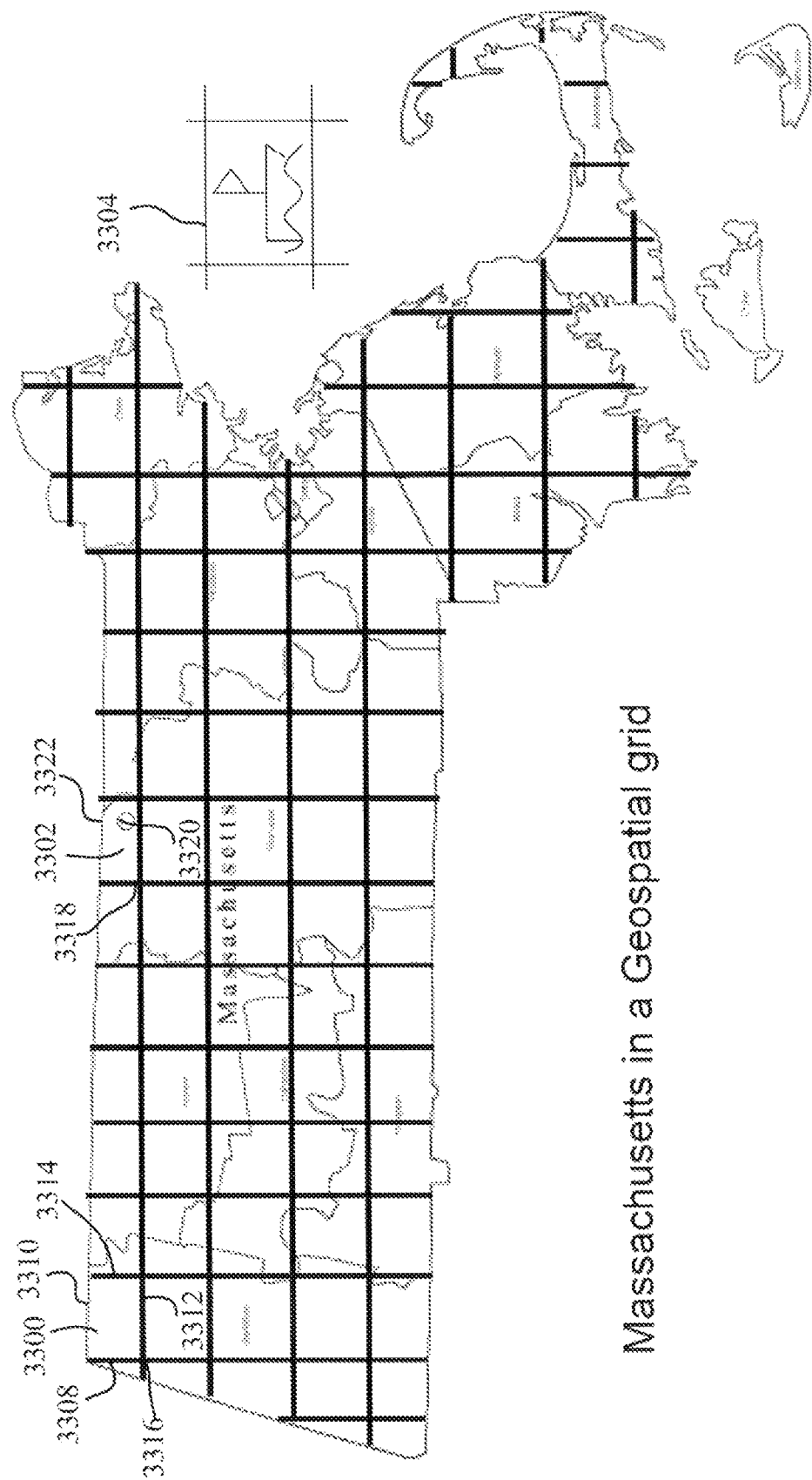
FIG. 33 is a diagram of a geospatially segmented geographic location according to one example.

Regardless of how the geographic data is divided, the system 100 then parcels up the geographic locations into grids having specific longitude and latitude coordinate values. In other words, the totality of a particular defined entity space is divided into discrete segments that are functionally independent based on their coordinate values. FIG. 33 illustrates an example of spatial segmentation into grids for the state of Massachusetts in the United States. In FIG. 33, a plurality of grids, such as grid 3300 and grid 3302 are formed by the server.

In order to form the grids, the system 100 may start at a particular location within the entity space and trace in a particular direction for a predetermined distance. For example, in selected embodiments and as illustrated in FIG. 33, the grids are formed as squares throughout the entity space. Grid 3300 may be formed by starting in the upper left hand corner of the state and determining lines 3308 and 3310 extending from the point at a ninety degree angle for a particular distance. Once these grid boundaries are determined, enclosure lines 3312 and 3314 can then be formed at right angles from lines 3308 and 3310, respectively, for a corresponding distance to form the grid. However, it is understood that the grids are not required to be square shapes and could take any other conventional shape. In other selected embodiments, the system 100 may divide a geographic location by casting parallel latitudinal and longitudinal lines as illustrated in FIG. 33 and determining coordinate data for each grid formed based on such a division. The grids may also be formed throughout particular entity spaces based on a partition amount such as a particular amount of coordinate values (i.e. degree areas) or based on distance measurements such as the amount of cross sectional miles or kilometers.

In selected embodiments, a segmentation size of a degree or less is preset for segmenting the grids. The grids could also be formed and shaped based on various geographic particularities over an entity space such as population density, venue density, uninhabited land space, and transportation and transit demographics. Accordingly, not all grids need be the same size and the system may, alternatively or in addition to distance measurements, determine grid sizes based on population density, venue density and transportation and transit demographics. For example, grids in sparsely populated areas of the entity space may be larger than grids in densely populated areas. For instance, although not shown in FIG. 33, the city of Boston itself may be separated into a multitude of grids based on the large amount of venues in and around the city. As described further below, this will ensure that an appropriate amount of venues or items of interest are processed by the system 100 when receiving requests from a user based on the user's location. Further, as described further herein and although not illustrated in FIG. 33, grid data is also determined for neighboring states (not shown) such that points of interest may be identified if a user was close enough to a grid within a neighboring state.

The segmentation of geographic data is not limited to areas containing land mass. For instance, grid areas, such as grid 3304, can be formed over locations containing water. These grids are formed as described above and may contain interest data such as particular spots to fish, whaling locations, diving locations and the like. Accordingly, and as previously described herein, interest data is not limited to venues such as restaurants but can include other types of interest information. This data is processed in a similar fashion as described herein to efficiently provide the user with personalized information based on his geographic location. Alternatively, in other selected embodiments, the system 100 may ignore non-land masses such as oceans, lakes and the like to greatly reduce the amount of area that has to be spatially segmented thereby increasing the efficiency of the spatial segmentation process.

Referring back to FIG. 32, after the system 100 has segmented the entity space into various grids, "keys" are assigned to each grid. Items of interest and reference points are then determined at Step S3204 for each grid. Accordingly, the system 100 processes each venue stored in the data repository 118 to determine which grid each venue is located within based on the venue location information such as coordinate values. In other words, based on the processing performed in Step S3202, the system 100 has location information identifying the boundaries of each grid. The system 100 then performs comparison matching by identifying the coordinates of each venue and matching that venue with a certain grid and grid key based on the corresponding coordinate values of that grid. Once the system 100 identifies a particular grid for a venue, the system 100 stores in data repository 118 venue information, such as ID or name, in association with a key value identifying the particular grid within which the venue is located. In selected embodiments, other information with respect to the venue can also be stored in association with the grid key value such as venue attribute data. This information as well as offset information is further described below and illustrated in FIG. 34. It should also be noted that venues located on a grid "border" may be identified by the system as being in both grids and will therefore be associated with multiple keys.

Once the items of interest or venues have been identified and stored in correspondence with their particular grid keys, a reference point is determined for each grid which was generated in Step S3202. The reference point is a geographic location within the grid from which all other item of interest data will be generated (i.e. venue location information). For example, the system 100 may determine reference point 3316 based on reference point 3316s location at a corner of grid 3300. Alternatively, in other selected embodiments, the reference point may be determined based on the starting point at which the grid was formed or may be determined uniformly with respect to the location of reference points in other grids in the entity space. For example, every reference point may be identified as a point in the center of each grid. Once the reference point is determined, the coordinate values of this location are identified by the system 100 and stored in data repository 118 in correspondence with the Key ID for that particular grid. In selected embodiments, the system 100 may only store the reference point coordinate values themselves as the keys so that each grid is identified by the reference point coordinate values.

Once a reference point is determined for a "keyed" grid, the system 100 identifies at Step S3206 all of the items of interest data within the grid and determines offset data for each item of interest. For example and as previously noted, each venue in the grid is associated with the particular key for that grid as well as an offset value based on the reference point previously determined for the grid. In selected embodiments, the offset value is based on a coordinate offset value from the reference point based on the location of the venue within the grid. For example, FIG. 6 illustrates a venue 3320 located within grid 3302 having a reference point 3318. Once the crawl and parse module 114 retrieves information identifying venue 3320 and the location of venue 3320, the location of venue 3320 is determined based on offset coordinate values from reference point 3318. To illustrate how the system 100 determines the offset values for venue 3320, it will be assumed, for the sake of example, that reference point 3318 is located at coordinates of (1.1001, 1.1001). Accordingly, if venue 3320 is located at coordinates (1.1005, 1.1005), then the offset value can be determined as (0.004, 0.004) for venue 3320. These coordinates values of venue 3320 are then stored in association with the key ID for grid 3322 and the reference coordinates 3318 of grid 3322.

Referring back to FIG. 32, once all of the offset data for each item of interest in a particular grid is identified, the offset data and corresponding venue ID information are stored in the data repository 118 at step S3208 in association with the particular key ID and reference point data. As an example and according to an exemplary embodiment, FIG. 34 is a chart illustrating keyed segmentation data for the city of Cambridge, MA The identification of three keys indicates that the system 100 spatially segmented the city of Cambridge into three grids rather than the segmentation being at the higher granularity of an overall "state" level. As described previously herein, this could be for a variety of different reasons but was most likely, in this instance, due to the volume of venues located within the city of Cambridge, MA As such, the recommendation engine 112, when making recommendations for someone in Cambridge, MA, would only want to look within smaller gridded areas to ensure that the system doesn't needlessly process locations that are far away and most likely outside the interest area of the user.

FIG. 34 also illustrates the reference point coordinate data assigned to each key which has been determined and stored in the data repository as described with respect to Steps S3204, S3206 and S3208. In this example, a grid assigned key 001 has a reference point coordinate value of (41.75, −71.25) and is associated with venue 003 and venue 005 (i.e. Restaurant 3 and Restaurant 5) illustrated in FIG. 29. Restaurant 3 and Restaurant 5 are associated with key 001 because they are geographically located within the grid assigned to key 001 as determined in step S3206. Further, based on the latitude and longitude coordinates of Restaurant 3 being (41.973, −71.1213), the offset coordinates for Restaurant 3 are determined by comparing these values to the reference coordinate values of (41.75, −71.25) to obtain offset data coordinates of (0.2230, 0.1298). In other words, with respect to the reference point coordinate data for the grid assigned to key 001, Restaurant 3 is geographically at a location offset from the reference point of the grid by a value of 0.2230 degrees in the longitude and 0.1298 degrees in the latitude within the city of Cambridge, MA.

Once all of the venues have been identified within a grid, a reference point has been determined for the grid and venue offset data within that grid has been determined, and all of the information is stored in association, the system 100 determines at S3210 whether there are more grids to be processed. If there are more remaining grids, the system 100 loops back to Step S3202 to perform the above-noted processing on any additional grids that have not yet been processed. Accordingly, once this is complete and before a user has even interacted with the system 100 via the user interface 110, the system 100 has spatially segmented all geographic data available to the system 100, identified venues or items of interest within each of the grids, and associated this venue information with a grid key and key offset data. At this point, the system 100 proceeds to perform data encoding of the various information to provide more efficiently stored and accessible data for processing by the system 100.

Data Encoding

Once the system 100 has obtained all of the information with respect to venue offset values, venue attributes and corresponding key data and reference point data, the system 100 performs encoding processing to generate a compilation of this information. This process encapsulates not only just ID data with respect to various stored items but also all other relevant information needed for the recommendation engine 112 to provide personalized recommendations to the user based on the user's location, attributes, and search filter requirements. In selected embodiments, this information can be encapsulated in a string but any other data structure could be utilized to encapsulate the information. As with the spatial segmentation processing, the data encoding process is done in advance before a user has even interacted with the system 100 via the user interface 110 to request a personalized search. However, in addition to or alternatively, the system 100 may generate all of this information at run time at the time of a request by the user or at predetermined intervals in order to provide up to date information while balancing with processing and storage considerations.

Figure 35:
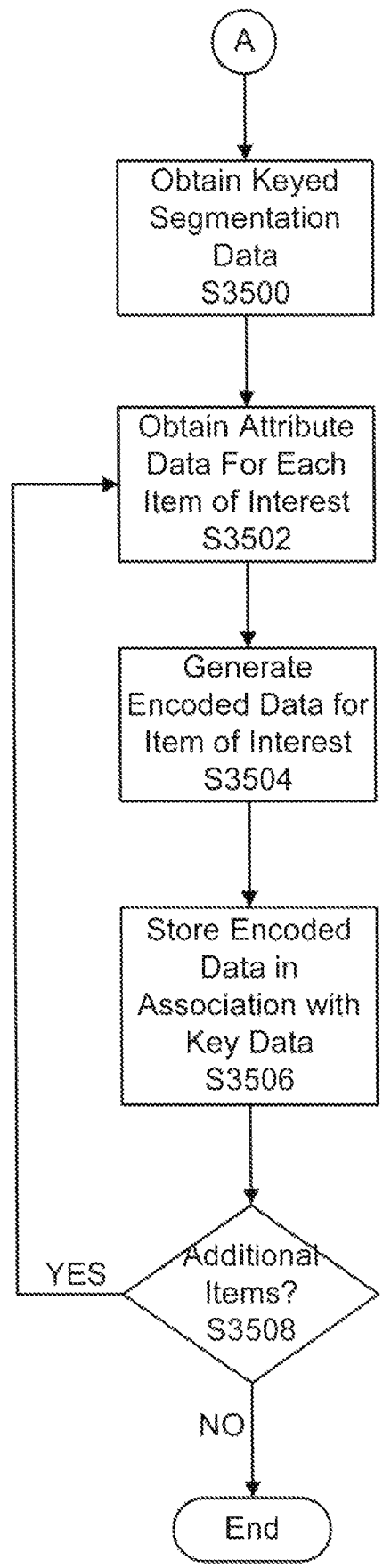
FIG. 35 is a flow chart illustrating data encoding according to one example.

FIG. 35 illustrates a flow chart describing the data encoding process according to one example. At Step S3500, the system 100 obtains from the data repository 118 all of the keyed segmentation data determined from the geo-spatial segmentation processing. This includes, but is not limited to, the data illustrated in FIG. 34 such as the key ID identifying each grid, the reference coordinate data for each grid and the venue ID and offset data with respect to the venues within particular grids.

The system 100 then at Step S3502 obtains from the data repository 118 all of the attribute data for each venue that was identified by the crawl and parsing module 114. This includes, but is not limited to, all of the attribute data illustrated in FIG. 29 such as name, price, genre, and coordinate data.

Data processing then proceeds to Step S3504 at which point the system 100 encodes some or all of the attribute data for each venue within the data repository 118. In selected embodiments and as noted above, this data can take the form of a string and includes encoded representations of the attribute data values. For example, the coordinate offset data of each restaurant can be represented as a series of numeric values without intervening decimal points or place holders. Referring to the example above with respect to the offset data determined for Restaurant 3, these coordinate offset values of (0.2230, 0.1298) could be represented simply as 2230_1298. Further, the reference point coordinate information of (41.75, −71.25) can be represented as 4175_−7125 without requiring the decimals or an indication of which value represents an abscissa or ordinate value based on the order of the numbers. This system 100 can store information indicated at what point the decimal value will be applied to the coordinate data. This information will be used to determine which restaurants are located within a reasonable distance from a user located in a particular grid.

Further, shorthand versions of important venue designation and attribute data, such as ID, price, genre and attire can be used within the string. Numeric information, such as price may be represented simply by a alphanumeric value such as 1-10 wherein 1 signifies a lower price and 10 signifies a higher price. Further, in selected embodiments, shorthand characters or the first character of a designation type could be used to identify that attribute. For example, various letters from the cuisine designations can be used in the string to represent the venue genre or the first letter could be used. For example, the first letter of the cuisine or genre type may be used to designate the cuisine type such that the letter "p" may designate pastries, the letter "j" may designate Japanese and the letter "w" may represent Western. The style may also be represented by various letters from style designations and in selected embodiments can be represented by the first letter in the style designation. For example, the letter "c" may represent casual, the letter "f" may represent formal and the letter "h" may represent hipster. In selected embodiments, hour of operation or any venue time related attribute information could be represented by the number and a letter for AM or PM. For example, the designation "10 a-10 p" or "10a10p" could be used to designate that a venue is open from 10:00 AM to 10:00 PM. It is noted that any other information, such as rating data and review data, can also be encoded in short hand and stored in association with the venue as described herein.

In selected embodiments, various characters can be used to separate the information within the string identifying the venue attributes. For example, any alphanumeric data separated by underscores may represent that it is a different venue attribute. However, any other character could also be used to separate the venue attribute data in such a fashion that the system 100 could parse the string and determine the various pieces of attribute data based on the particular character separator. Further, other characters can be used to designate that the venue has a plurality of designations for a particular venue attribute. For example, in selected embodiments, a dash could be used between attributes of the same type to designate that the venue has both characteristics. In other words, the letters A-W could be used to designate that the venue has both an American and Western motif.

Position within the string is also extremely important so that the system 100 can effectively and efficiently identify each piece of data when parsing or traversing the string. For example, in selected embodiments, the order in which the values are encoded is the ID of the restaurant, the price of the restaurant, the genre of the restaurant, the hours of operation, the attire and then the coordinate offset values. However, any order could be used. In the event that the data repository 118 does not contain certain attribute information about a particular venue, the system 100 can use a null value single character place holder such that the system 100 will not mistakenly mix up the order and miscalculate venue attribute information from the string. Accordingly, even with a shorthand representation for various attributes in which these attributes might utilize the same alphanumeric character, the system 100 will be able to identify the specific attribute based on the order.

The order in which the attributes are encoded is determined by the system in a variety of ways. In selected embodiments, the order in which the attributes are encoded within the string may indicate a ranking importance and/or weight of the property values which can be used when personalizing the recommendation described below. For instance, in selected embodiments, the quality of the attribute information may determine the order in which the attributes values are encoded. For example, if the crawl and parse module 114 has determined from a predetermined number of sources, the same information about a venue, such as the genre, the system 100 can identify this attribute value as a quality attribute value have a predetermined quality or reliability level as it has been confirmed from a variety of sources. Other attribute values that may not have as many confirming sources of information received via the crawl and parsing module 114 may not be determined to be as high in quality as the genre. Accordingly, the system 100 can utilize this information such that the attributes are encoded in an order based on their quality level.

FIG. 36 illustrates an encoding scheme applied by the system 100 according to selected embodiments. This encoding scheme may be stored in the data repository 118. As illustrated in FIG. 36, the data repository stores information representing an encoding scheme which identifies position information within a string, the data that is represented at that position in the string, the type of data at that position in the string and corresponding values of the information in the string. This information is used by the system 100 to encode and decode information with respect to venue attributes and location data. For example, in this encoding scheme, position 1 in a string numerically represents the restaurant ID, position two numerically represents the price and provides the system 100 with information such as what various numeric values represent. Therefore, the system 100 can identify that the value of 1 represents a low priced restaurant whereas the value of 10 represents a high priced restaurant. Further, values with respect to the data can take a variety of different forms based on the type of data. For example, FIG. 36 identifies the third position in the string as being represented by genre having a character type and corresponding values for the different characters such as "P" for pizza and "D" for desserts. In selected embodiments, other encoding schemes may be used in combination such as converting every value to a numeric value.

Once the encoded string data is generated for each venue of each grid known to the system 100, the encoded string data is stored at Step S3506 in the data repository 118 in association with the corresponding key data or reference point data. For example, any encoded string data for a venue within a particular grid is stored in association with the key and/or reference point information for that particular grid. FIG. 37 illustrates this storage scheme containing the key ID, the reference point coordinate data for each key (i.e. grid designation) and encoded data identifying venues within that particular grid as well as their attribute data. As illustrated in FIG. 37, Key 1 represents the first grid created within the city of Cambridge, MA having offset coordinate data (as determined above with respect to Step S3206 of FIG. 5) and encoded string data for venues within that grid. In this example, and as described previously and illustrated in FIG. 34, both Restaurants 3 and 4 were located within the grid identified by Key 1. Therefore, the encoded data for Restaurant 3 is represented as an encoded item of data containing 003_2_p_c2230_1298 or when parsed "003"=Restaurant ID, "2"=a price point of two, "p"=pastries, "c"=casual attire, and "2230 and 1298"=coordinate offset data determined previously during spatial segmentation as (0.2230, 0.1298). As illustrated in FIG. 37, the grid identified by Key 1 having reference coordinate data (41.75, −71.125) also includes encoded string data with respect to Restaurant 4 which has a price point of "3", a "chinese-japanese" cuisine, a casual-family motif and offset coordinates of (0.2420, 0.0005). If, as in selected embodiments, these attributes were encoded in order of quality, it may signify that the system 100 had the best information with respect to price such that this was the first attribute encoded into the string of venue attribute data.

The system 100 may also store the encoded data of various venues in association with one or more grid keys and/or corresponding reference point coordinate data in a particular order to designate certain qualities about the encoded data. For instance, in selected embodiments, the order in which the encoded venue data for each venue is stored may indicate a quality level of the venue itself. For example, if the crawl and parsing module 114 retrieved information from various sources indicating rating levels of various venues, this information could be used by the system 100 to determine an overall quality level for the venue. The particular quality value for a particular venue may therefore be in selected embodiments encoded with the other attribute data for the venue and can also be used when the system 100 stores the encoded data for each venue in association with corresponding key and/or reference point coordinate data such that venues having a higher quality rating are stored in order based on the ratings.

Referring back to FIG. 35, at Step S3508, the system determines whether there are additional grids that need to be processed in order to create encoded data for every known venue. If there are additional grids, the system 100 proceeds to create encoded string data for every venue within those remaining grids and store that information in the data repository 118 in association with the key and reference point coordinate data. If there are no more grids remaining to be processed, the process terminates.

In selected embodiments, the system 100 may also determine for each a grid, corresponding neighboring grids that should contemplated by the system 100 any time a user is located in a particular grid. For instance, a user in the grid designated by Key 2 may be geographically close enough to the grids represented by Keys 1 and 3 and therefore the system 100 may store Key 2 in association with Keys 1 and 3 to provide for efficient nested retrieval. Alternatively, the system 100 may store in the data repository 118 the reference point coordinate values as the key values themselves and therefore would store r_4200_-07125 in association with r_4175_-_07125, r_4225_-07125 and itself. This allows the system to easily locate and query these grids as well any time a query is made with respect to the grid identified by r_4200_-07125.

The number of grids to associate with a particular grid can be determined based on a number of different factors. The system 100 may systematically process each grid and for each grid store all neighboring grids in association with that particular grid. The system 100 may also have a predetermined distance amount set such that only neighboring grids within a predetermined coordinate range will be stored in association with each other. Further, the user may manually set in advance the range at which he is willing to travel thereby allowing the system to create grid associations tailored to the individual needs of each user. The user may also indicate particular areas in which he does not want to go to and the system 100 can automatically not include those grid areas in any search thereby further customizing the personalization results while also providing quicker results. Additionally, the system 100 may have information about the transit options in that area which will affect the distance at which neighboring grids are included within the key set. Further, if the system 100 knows from the user profile that the user does not have a car, the system 100 may limit the geographic boundaries at which neighboring grid data will be included in the key set.

At this point, the system 100 has retrieved attribute information about the user and a plurality of venues, geospatially segmented all of the geographic information available to the system 100 and identified which venues belong to which grids, encoded a plurality of the data and stored this data in corresponding associations in the data repository 118. Therefore, the system 100 has determined all of the information necessary for a user to interact with the system 100 via the user interface 110 to receive personalized recommendations for venues within a user locale.

Recommendation Processing

Either the system 100 or users 108 may trigger the recommendation engine 112. The users may do so by entering through a web portal via the network 120, client application or electronic message a request that a recommendation be generated based on provided venue attributes such as for example type, geography and/or price. The system 100 may access a user profile to collect the user attribute data identified in FIG. 30 from the user profile such as other venues liked, gender, profession, or age. The system 100 may also automatically generate recommendations for inclusion in electronic messages, such as text messages or email messages, sent to targeted users or for presentation on a web portal or client application accessed by users.

Figure 38:
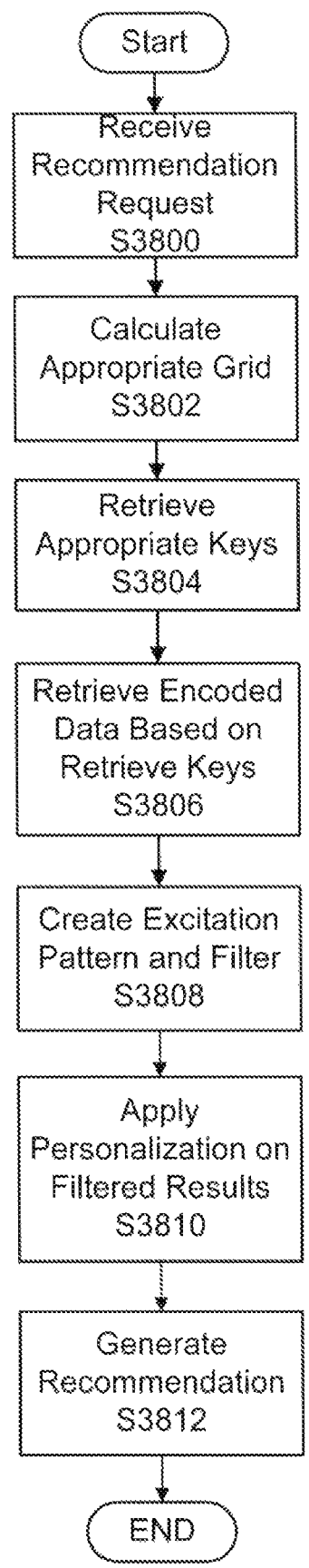
FIG. 38 is a flow chart illustrating the process of providing personalized recommendations according to one example.

FIG. 38 is a flow chart illustrating the steps taken by the system 100 to provide personalized recommendations to users 108. Initially, at Step S3800, the system 100 receives a recommendation request from a user for a personalized recommendation based on a location of the user and/or a predetermined location. When requesting a personalized recommendation, the system 100 receives recommendation requirements from the user as part of the request. Specifically, the user may request recommendations filtered by various venue attributes and may request a venue near particular coordinates. Alternatively, the system 100 may automatically provide a request based on information about a location of the user and/or habits of the user. For example, if the system 100 determines that the user crosses into a different grid, the recommendation engine 112 may automatically generate recommendations based on the users location within the new grid and likes and dislikes previously known to the system 100. For further discussions below and as an example, it will be assumed that the user has requested recommendations for an American restaurant having a four point price point located in or around coordinates (42.03, −71.10)

Once the system 100 has received the request or has decided to automatically provide a recommendation to the user, the system 100 determines at Step S3802 which grid the user is located in or which grid has location information pertaining to a particular request. As noted herein, the user may provide the system with particular coordinates or the system 100 may determine the location of the user via GPS based on a user's mobile devices and applications. To determine the grid the user is located in or of which the user has request information for, the system 100 uses the coordinates provided by the user and identifies the closest key coordinate data. Based on the example discussed above, the system 100 would determine that the closest reference point coordinate key data is the grid defined by (42.00, −71.25) or reference point r_4200_-07125. In order to determine the closest grid, the system 100 may poll the grid data contained within the data repository 118 and pick the grid with the smallest offset from the provided location data. The system 100 may reduce the time of such processing by only searching specific locations within the data repository 118. For example, if the system 100 knows that the user is located in Boston, Mass., United States based on the user profile, the system 100 may only compare the user location data with location data from that particular area. Further, if the user provides location data other than where the user is located, the system 100 may use the coordinates to determine the generalized location in the world and then only seek coordinate reference key data for that particular area in the data repository 118.

Once the system 100 has determined the closest key data for the user location data, the system 100 retrieves at Step S3804 all of the keys that are linked to that particular key data. For example and as described previously herein with respect to at least FIG. 8, Step S3508, each key will often be linked to other neighboring keys. Therefore, the system 100 may easily retrieve the appropriate key set based on the nested key data. The system 100 then retrieves from the data repository 118 at Step S3806 all of the encoded venue or item of interest data corresponding to the reference point coordinate key data determined in step S3804. At this point, the system 100 has identified every venue within a reasonable distance from the coordinate data provided by the user in the recommendation request.

The system 100 must then filter at Step S3808 this information based on specific request information provided in the recommendation request. For example, the user may request only American restaurants within a particular price range or the system 100, when auto-generating recommendations, may know particular user affinities and therefore filter the data set based on these affinities. Based on the example discussed above, the user only wants recommendations for American restaurants having a price point of four. To accomplish this feature, the system 100 generates a nodal excitation pattern based on the particularities of the specific request for the user. For example, the excitation pattern ([\\4]+)_(\\-?A\\-?)_([^_]+)_(.*) may be generated for this particular request by the recommendation engine 112. The excitation pattern indicates a value of "4" for the price point and a value "A" for American restaurants in an order in which the encoded data is stored and in a similar fashion in which the encoded data is stored. This pattern is then matched against all of the encoded data patterns that were determined in Step S3806. In this example, there would be matches for Restaurants 1 and 5 based on a match of the nodal excitation pattern with 101_4A-W_F-R_0123_1699 and 105_4_A-F-h_0950_2475.

Once the final filtered set is determined by the recommendation engine 112 as described in Step S3808, the recommendation engine 112 must then personalize at Step S3810 the recommendation by applying the user attribute weights illustrated in FIG. 31 to the venues and venue attributes identified in the final filter set. In order to apply the user attribute weights, the system 100 parses or decodes each encoded string in the final filter set to determine the particular venue attributes of the venues in the final filter set. Once these attributes are determined for each venue in the filter set, the recommendation engine 112 applies the user attribute weights to the appropriate attributes for each venue. The results for each attribute weighting value are then summed for each venue to provide a total excitation score for each venue in the final filter set. Attributes not having a corresponding attribute weight can be ignored or provided with a general attribute weight value. The venue having the highest score can then be recommended to the user as their personalized recommendation or a ranked listing of the venues can be provided to the user based on score. The recommendation engine 112 can also provide a plurality of venues to give the user some choice by always providing a predetermined amount of venues (determined automatically or set manually by the user) to the user. Alternatively, in other selected embodiments only venue scores passing a predetermined threshold value are provided to the user via the user interface 110. Once the recommendation engine 112 has determined which recommendations will be provided to the user, the recommendation engine 112 accesses the information stored in the data repository 118 and illustrated in FIG. 29 based on the parsed encoded data in the final filter set for each venue to provide all of the necessary venue information to the user. Therefore, as described further below, the system 100 does not have all of the full character object information (i.e. American, Price Point 4) ahead of time to provide personalized recommendations and can therefore operate more efficiently and effectively.

With respect to the example identified above of a user request for recommendations for an American restaurant at a price point of four dollars and located near (42.03, −71.10), the recommendation engine 112 has identified two matches and therefore will parse the encoded string data for Restaurant 1 and Restaurant 5 to determine the venue attributes therein. Accordingly, the recommendation engine 112 will identify for Restaurant 1 having an encoded pattern of 101_4_A-W_F-R_0123-1699 the following values: 101, 4, A-W, F-R, 0123, 1699 which signify, as discussed above for selected embodiments, restaurant ID "101," a price attribute value of "4," a genre attribute value of "American, Western," a dress code attribute of "Formal, Romantic" and offset coordinates for the location of Restaurant 1. For Restaurant 5 having an encoded pattern of 105_4_A-F-h_0950_2475 the recommendation engine 112 will parse the following values: 105, 4, A-F, h, 0950, 2475 signifying Restaurant "105," a price value of "4," a genre of "American, French," "hipster" attire, and offset coordinates for the location for the location of the restaurant.

Having parsed out the various attributes from the encoded data for Restaurants 1 and 5, the recommendation engine 112 applies the user weighting values illustrated in FIG. 32 for a particular user based on the venue attributes. For example, assuming User 1 made the request, for Restaurant 1 the attribute weight value for a price value of "4" is 0.5, the attribute weight value for American is 0.7, the attribute weight value for French=0.5, and the attribute weight value for a Formal dress code is 0.5. As there is no weighted attribute value for User 1 for romantic dress codes, the recommendation in selected embodiments may assign a value of 0.0 or a predetermined weighting value such as 0.2. Assuming a value of 0.2 is supplied for romantic dress code, an overall score for Restaurant 1 is (0.5+0.7+0.5+0.5+0.2)= 0.24.

With respect to Restaurant 5, the recommendation engine 112 applies the user weighting values illustrated in FIG. 32 for a particular user based on the venue attributes. With respect to User 1, the attribute weight value for a price of "4"=0.5, the attribute weight value for American=0.7, the attribute weight value for French=0.5, and the attribute weight value for hipster attire=0.7. Accordingly, an overall score for Restaurant 5 is (0.5+0.7+0.5+0.6)=0.23.

At this point, the system 100 has determined all of the venues in a location near the user, determined which venues best match the encoded values of each venue within the area, filtered the set of venues to a final filter set and determined overall scores for each venue in the filter set. The recommendation engine 112 may then provide at step S3812 a variety of outputs to the user such as supplying only Restaurant 1 to the user via user interface 110 as it has the highest overall score. In other selected embodiments, the recommendation engine 112 may provide both Restaurant 1 and Restaurant 5 but with Restaurant 1 ranked slightly higher than Restaurant 5 based on the overall scores. In selected embodiments, the recommendation engine 112 may set a predetermined recommendation threshold, such as 0.24, and only provide restaurants meeting or exceeding this value. In this case, only Restaurant 1 would be supplied to User 1 via the user interface 110. Assuming none of the recommendations are above threshold value, geometric contextualization could be implemented as described herein to resolve this issue.

Additional scoring methodologies are considered in selected embodiments such as assigning an additional weighting factor to venues in the final filter set which match venues which have been favorited by users as illustrated in FIG. 31. With respect to the example above in relation to User 1, an additional weighting value may be applied to the overall score of 0.24 based on the Restaurant ID value "001" because Restaurant 1 has been indicated by User 1 as one of his favorite venues. Additionally, weights can be added based on prior purchase history, prior visit history, how close a restaurant is to the user's current location, home location, or work location, or based on recommendations previously made to the user by the recommendation engine 112.

In combination with, or alternatively, with respect to the recommendation processing described above (S3812) relating to the overall scores, the recommendation processing described herein with respect to various link strengths can be used in selected embodiments to provide recommendations to the user based on the final filter set or the final set of venues each having an overall score. As such and in selected embodiments, the processing described herein with respect to determining a list of venues, encoding them, and identifying a final filter set and overall scores, provides the recommendation engine 112 with a smaller sample set of venues from which it will make recommendations based on link strength. In this embodiment, recommendations are made based on link strengths rather than overall score with respect to weighting values. Accordingly, if a user requests a search by providing a venue to which he has an affinity, the recommendation engine 112 will only provide recommendations based on overall link strengths with respect to the venues identified and ranked in the final filter set. The final filter set and/or overall scores of each venue in the final filter set may therefore, in selected embodiments, be used to identify the final set of venues to which the recommendation engine 112 will use to provide recommendations based on overall link strength as previously described herein. Further, based on the final filter set, the recommendation engine 112 may provide recommendations out of this set relating to venues of which have the strongest link strength to user attributes.

Alternatively, the final filter set of venues having overall scores for each venue may be applied to different recommendation systems. In other words, the methodology described at least in FIGS. 29-38 generates a final filtered set of candidates based on various factors which can then be used as a data set which is provided to the recommendation engine 112 described herein or to other recommendation systems. Those recommendation systems may then determine how to make use of the information to provide the user with various types of information such as rankings.

The systems and methodologies described above provide a variety of advantages over current systems and techniques. By efficiently segmenting areas into grids having corresponding key data and storing this information in association with efficiently encoded data, it provides the system 100 with the ability to efficiently and effectively retrieve particular information. Further, the enhanced encoding schemes described herein allow the system to rapidly encode and decode the data while saving on storage space and processing requirements. Under this system, data can be pre-calculated for all users and combinations with minimal memory requirements thereby allowing for faster retrieval and processing of user recommendations. Accordingly, one hit to the data repository 118 can return not only a list of all objects that fall into spatially segmented area but also all of the features of those objects at which point they can be readily operated on to determine personalized recommendations. This does not require the system to retrieve the full data objects such as restaurant name, genre, attire, etc as the encoded information is all that is required. Further, as the final filter set provides a reduced amount of venues which are relevant to the user, the recommendation engine 112 is able to more efficiently generate recommendations based on overall link strength with respect to the final filter set. Further, due to the various encoding and storing methodologies, the system 100 can determine from one storage table of information, the attributes of venues, where they are located, which grid they are located in, relative weights of each venue or venue attributes, and the relative quality of the venue.

The spatial segmentation further provides the ability for the system 100 to determine objects of interest accurately and efficiently while also allowing the system 100 to easily identify neighboring spatial segments that should be intermingled with each other. The segmentation size allows for decimal offset values thereby requiring only a small storage space and enabling efficient processing to determine key and offset data.

As previously described herein, it is noted that the techniques described herein are not limited to geographic data and may also be used for determining recommendations in other spaces. For example, the processing described herein could be applied to recommendations for a particular wine. In this case, segmentation may not be performed by coordinates but rather by "type" of wine (i.e. red, white, rose, etc). Segmentation can then be relied upon to filter various requests by ignoring certain segmented areas such as red wine and white wine when the user request recommendations for a rose. In this instance, a key would be assigned to each type of wine and then stored in association with all of the identified wines for that type. Attributes of each wine would then be encoded and stored in association with the corresponding key based on the type of wine. Excitation patterns would then be utilized based on the user request to identify a list of particular wines and then the wines identified in that final filter set would be decoded and ranked based on their attributes to identify an overall ranking based on individual scores. Link strengths could also be used as described herein to recommend wines having strong link strengths to those identified by the user or generated based on user attributes. By segmenting the keys based on this principle of axis and consideration for category, efficient access to relevant recommendations indexed by key can be provided.

Illustrative Implementation

One illustrative system implementation consistent with the foregoing teachings is discussed below. The discussion is generally organized into four sections: content collection, content organization, personalization and user interface.

The purpose of the Content Collection system is to perform 3 steps: 1) identify "objects" (venues, events, and other instances of interest to the user), 2) find/match electronic pages with deep information on those objects (object characteristics, reviews, associations with other objects), and 3) retrieve pages into the storage system.

The objects to be retrieval in this example constitute any set of web pages based on objects of interest. The objects may be selected based on category, filters for a particular category and the content sources that are targeted.

This type of retrieval can in turn be broken up into several Content Modes. Content Mode 1 is called "Global Grab." In this mode, the system seeks to identify and retrieve information on every object in a category (e.g., "all restaurants in San Diego"). In Content Mode 2, Keeping Current, the system seeks to focus the collection on either i) refreshing stale information on old objects, or ii) Identifying new objects that just arose for old categories. In Content Mode 3, known as Intelligent Browsing, the system seeks to have the data search update itself dynamically based on its real-time discoveries, to "zoom in" and focus on specific trends and objects.

One type of Global Grab is spidering. This is a conventional method used by Internet search engines according to which the system downloads: the page of a content provider's site, scans that page for links to other pages on the site, and then downloads those pages. By repeating this process an entire site can be covered. The system can also implement paginated searches in which the system actively seeks, for example, page 1 of a term like "Restaurants," then page 2, and so on.

A second type of Global Grab is crawling. Sometimes it is desirable not to have to get pages directly from a content site, such as where the site blocks automated indexing. In this case one can replicate the structure of a site from the cache of a search engine, which crawl and cache every page as a "second copy" of the internet. Here, the system uses a search engine to search for the URL of interest. Usually, the URL will be included in the first result, along with a "Cached Page" link to the cached copy of the page. The system can then download the link listed in the "Cached Page," which is the same as the original page. The system can then scan that page for links to other pages on the site, and repeat the process for those pages.

A third type of Global Grab involves getting a list of all objects and then finding them within a site. This is a method designed to be more holistic than spidering, to ensure that every single object of a category is retrieved from a given site if available. First, a complete list of target objects is created, such as by crawling an Internet directory like Yellowpages.com for "restaurants in San Diego." Then the system will have the complete list of objects for which data is desired. The next step is to search for each of these objects in turn in a search engine, restricting the search to the pages from the target website. Different combinations of data extracted from the internet directory can be used to seed the search query, and usually the business name, metro name, and phone number are useful ways to lock onto the object on the target site.

The search engine will retrieve pages that match these search query parameters on the target site of interest. Usually one of the first few pages in the results is the correct match. By repeating this search engine and retrieval process for every object in the Internet directory, the system is likely build, a complete replica of the target site's data on that category.

A fourth type of Global Grab involves third-party crawlers. It is contemplated that third party services will crawl the web and make the results of those crawls available for purchase. In this case, the first step of the global grab methodology is simplified because the system can query the service for every page arising from a certain set of websites. If such third party services also make the pages available for retrieval then the speed of the crawl is increased.

Turning to Content Mode 2, Keeping Current, it is assumed that the system has completed a global grab and has data on all objects for a given category. The task then becomes staying current, or up to date, with the objects as their data changes. New objects can be introduced, such as when restaurants open. Old objects can become outdated, such as when restaurants close. Data on objects can change, such as if the hours of operation or menu items change. New and old objects can be identified by doing a crawl on global directories (which is fast) and then focusing in on any changes to the list of objects. Alternatively, the system can discard old data and then run a new global grab. Finally, the system can rely on "update notifications" which can be acquired in several forms: I) some websites focus on these changes, such as "listings of new restaurants" in local papers, ii) many content provider APIs will notify of openings and closings of sites, iii) URLs and webpage titles will often receive a "CLOSED" stamp which can be rapidly screened. Each datum collected by the system is tagged with an expiration date, based on the type of the data (events expire immediately, restaurants may need to be refreshed every few months to check for major changes). Data that has expired can have associated pages re-retrieved for freshness. The re-retrieval process is simplified because the URL is already known.

Content Mode 3, Intelligent Coordinated Retrieval, involves "eating nodes," or retrieval computers, that can coordinate their searches based on real-time events to optimize content gathering in response to mass user behavior. In this implementation the retrieval computers are given "write" access to the retrieval queue. If the retrieval computers identify a trend that is similar to their original target, but stronger, the retrieval computers can recruit other computers to look more deeply at this phenomenon by writing the new target (or a set of targets within a target area) onto the retrieval queue. Retrieval computers can also interact intelligently in the collection process by alerting each others if a lead turns out to be faulty, and is indicative of more faulty leads (for example, if a region of a site is covered with spam or stale data). In this case, the retrieval computer(s) can scan the queue and delete similar jots on the queue so that future computers don't devote resources to exploration of a lower value target area. In this way, different search nodes again inform one another about what they learn by virtue of the shared queue to help guide their collective search, Turning next to matching objects to content pages, whenever the system is gathering data from target websites on an object of interest, the system should ensure that the data on the target site is actually referring to the object of interest. This is especially true when attempting to cross-reference objects across different sites. The system optionally utilizes a "likelihood of match" score to make this determination, taking into account multiple variables. For example, if the system is trying to match a venue on two different sites, the fact that they have the same phone number or address may tend to indicate that they are the same venue. Numeric identifiers on consistent scales are particularly valuable for this purpose, such as phone numbers, UPC symbols, and latitude/longitude. Non-numeric identifiers (strings) such as addresses can also be used, and one can check the similarity of the two sites' addresses by taking a Hamming distance on the characters, or parsing, out each one's street number, street name, etc.

Data is cross-referenced across multiple sites by using data from one site to choose objects to find on another site, then use the steps discussed above to find new content pages from those objects on a different site.

A fleet of retrieval computers may be created by building each from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc, The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task. These instructions tell it how to connect to the message queue with the URLs to retrieve, and also how to go about the retrieval process. Each one then launches the downloaded code (runs the JAR file, etc) and thus begins working. Finally, each computer in the fleet is assigned its own IP address (via Amazon's Elastic IP system, etc) so that they can be throttled by content sites independently from the other nodes and work in parallel.

Tasks are distributed amongst the fleet of retrieval computers by using a list of URLs (usually long, millions) of pages that the system wants to retrieve. This list might be a text file, database table, or other simple serial storage system. The goal is to distribute those URLs among the many computers. This process is best implemented through a queue service that lives independently from all the retrieval computers. As an example, Amazon offers the Simple Queuing Service (SQS) in which every URL is stored as a string message on the queue. Thus, the queue retains a memory of which URLs still are to be crawled. Each computer in the fleet can query the queue for the next item to be crawled. The queue then assigns the item to a particular retrieval computer, and marks the item as "locked" so that other retrieval computers do not also try to work on the item. Meanwhile, the system monitors whether the retrieval computer completes the task in a timely manner. If the retrieval computer does not check back with the queue to say that the job is done, then the queue restores the item to "unlocked" so that other computers can perform the task. Once a computer checks back with the queue and informs it that the task has been completed the queue removes the item from the queue. Thus, a workflow is established that can be shared between an arbitrary number of retrieval computers where they can operate simultaneously to work through a list of retrieval tasks.

Pages are retrieved by all computers in the fleet. Each retrieval computer is already armed with a URL to retrieve by taking the message from the messaging queue. The computer then executes a function to stream the contents of the remote file (webpage, etc) into memory (in PHP, fileget_contents; in Java, urLopenStream( ); etc). The computer then saves this file to the global storage system (see below). With respect to rate of repetition, it should be noted that no single computer hits a given content source too rapidly. Therefore, each computer is "throttled" to only complete one page request every 0.1-10 seconds. The use of third party crawlers, discussed above, may obviate the need to throttle in this manner. Every page request is checked to determine if it succeeded, and if failure occurs, a longer interval is used before the next attempt. The system can implement different schedules for the interval rollback, such as an exponential rollback.

The global storage system may be a distributed storage platform (Amazon S3, etc). In the case of Amazon S3, data is stored in buckets that are accessible from any computer as a URL. Each retrieval computer stores the contents of the retrieved file in a repository folder on S3 (or other service) as a file path string which is also URL. The file can thus be retrieved at a later date by entering the storage system URL. Access to these repository folders are private so that they can only be accessed by the system's Content Collection and Content Organization systems.

Turning now to content organization, the aim is to take content collected from the Internet and organize it for access through the Interface. The input may be a hard drive directory of the latest set of collected web pages. The output may be the data uploaded to a large-scale (but highly organized) database. The output may be generated by repeating the following process: 1) find a page, 2) parse the page for info, 3) match the page to an object in the database, and 4) update the database.

Another computer fleet may be deployed to organize the content. As noted above in the case of retrieval computers, content organization computers may be replicated by building them from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc. The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task.

Every computer in the Content Organization fleet receives 2 pieces of information (which it is programmed to seek out using in its boot instructions): 1) the storage space location of the code instructions to be its brain, 2) the location address of the job queue where it will receive the material to be processed. The system controls the Content Organization fleet by creating, and managing the content organization process. The system defines the storage directory of all the pages that need to be organized. The system thus turns this directory into a list of jobs, where each job is a file to be processed. The system then creates a task queue (see below), loads that queue up with the tasks, and sets the properties of the queue to determine the time allotted for task completion before tasks are recalled and given to other computers.

The task queue may be implemented using Amazon Simple Queue Service (SOS) or some other service that is external to individual computers. The system loads up the job queue with a list of pages that need to be organized. Each item in the queue is a URL address in global storage space to a page that needs to be organized. The goal is to distribute those URLs among the many computers. The queue allows computers to take URLs, and retains a memory of which URLs still must be organized. Each computer in the fleet can query the queue for the next item to be crawled. The queue then assigns the item to the computer, and marks the item as "locked" so that other computers do not also try to work on the item. Meanwhile, the system monitors the queue to determine whether the computer completes the task in a timely manner. If the computer does not indicate to the queue that the task is done within the allotted time the queue restores the item to "unlocked" so that other computers can take the task. Once a computer checks back with the queue to say that it has completed the task, the queue removes the task from the queue. Thus, a workflow is established that can be shared between an arbitrary number of computers where they can operate simultaneously to work through a list of retrieval tasks.

The global storage system for the Content Collection fleet may be a distributed storage platform (Amazon S3, etc.). In the case a Amazon S3, data is stored in buckets that are accessible from any computer as a URL. Each retrieval computer stores the contents of the retrieved file in a repository folder on S3 (or other service) as a filepath string which is also URL. The file can thus be retrieved at a later date by entering the storage system URL. Access to these repository folders is restricted so that they can only be accessed by the system's Content Collection, and Content Organization systems.

The system may utilize the following global structure for document namespaces: date_retrieved/dataformat/content-provider/city/category. For example: 2011-07-07/xml/google/boston/restaurants/. However, depending on the source of the crawl, the raw data files may not even be organized into this directory structure yet. In this case the crawl results should be sorted into files that are organized according to this structure.

To sorting raw crawl results, the system first inspects all the files retrieved during Content Collection and sort them according to the objects that they represent. One way to do so is inspect the URL of the crawl. The URL will disclose the content provider, the city/metro area, and category. For sites where this cannot be computed from the URL, the data can be extracted from elsewhere in the file (address field, etc.) The date of the crawl can be retrieved from the stored file's metadata. The crawl result file (or part of the crawl result file) that applies to the extracted object can then be saved in the directory structure described above. In this manner, all of the raw crawl results are placed in an organized directory structure to facilitate the subsequent organization to the database.

The queue is loaded by accessing the storage system directory where the sorted documents are located (see above). The system then spiders this directory to uncover the list of all files within that directory and its sub-directories. The system then creates a job queue (described above) to hold the list of files to parse. Next, the system uploads to the queue a list of file locations (URLs to the files), as an array of messages, to the queue. At this point the queue is loaded with a set of files to be parsed and organized.

Every time a computer in the fleet goes to the queue and retrieves a sorted page to organize, it first analyzes the following information from the URL: the "data format", which determines how to read the file's data; the "content provider", which determines which page parser to apply; and the "category", which determines what type of object to extract. The computer already has in its memory all of the different parsers that it downloaded when it was deployed. The computer picks one out based on the content provider and data format, and runs it on the file. Input is the file itself and the output is a data object in memory with values extracted from the file and stored in fields.

Every time a computer parses a file, and stores its data object in memory, the data is next added to the database. First, the computer has to identify the object's location in the database. This is accomplished by selecting the database table (in Amazon, a domain) based on the category of the object, and locating the row of the object by using, in descending order: i) the unique id of the object from the content provider (for example, restaurant id on local.yahoo.com), ii) another unique numerical identifier, such as the phone number, and iii) name, address, and latitude/longitude fuzzy matching. If the determined entry does not already exist, the computer creates a new row. The computer then runs an update on that row, updating every attribute (field) in a single database hit for efficiency. This is repeated for every sorted page that the computers come across in the queue, until all of the sorted pages have been organized into the database.

Next, the system personalizes the content by generating a neural network architecture that connects objects in the world as nodes within a network. The system activates a subset of the nodes based on what is known about the user's affinities. The activations are followed through the network to deduce what else the user will like.

The neural network may be implemented as follows. Connections TO a node a stored as a list of {N1, W1, N2, W2, . . . } where the connected nodes N are paired with their weights W. This list is saved in the database in the same row as the other properties of the node. Optionally, a list of connections FROM the node can also be stored. Subsets of nodes to be activated are identified by user-provided data regarding likes and dislikes. Users may be required to answer regarding their "favorites" in different categories. Users may also provide feedback on recommendations that they are given, which can be either binary (approve or disapprove) or they can be continuous (e.g., 1 to 10, or −10 to 10). The system assembles a list of "positive activation nodes" and assign an activation level, which were either favorites (e.g., 10× activation) or feedback-driven (e.g., 1-10× activation). Similarly, the system assembles a list of "negative activation nodes" and assigns an activation level (e.g., −1× to −10×).

Connections are established by, for every node in the user's list, accessing in the database the set of common co-occurrences with that object on the web. The system retrieves this list of objects and builds connections from our node to those objects with five positive synapses each.

Connections also may be based on feature similarity. For every node in the user's list, the system identifies nodes with similar properties. For the category to be matched, the system takes the most salient properties (e.g., for a restaurant, price, cuisine and ambiance) and searches the database for other restaurants that match that feature set. Each match generates two positive synapses.

Connections also may be established based on cross-visitation. For every node in the user's list, the system identifies nodes that have been cross-visited by other users. These users can be users of the system (e.g., users of a subscription service associated with the system) or activity elsewhere on the Internet about which the system has data. This may be accomplished by indexing the reviews and responses to all nodes. The system identifies strong responses to the node of interest, identifies the users that furnished those responses, and identifies other nodes to which those users had similarly strong responses. The system can connect those nodes to our node of interest, with one positive synapse for every similar response.

Negative synapses can facilitate the recommendation process by factoring in what the user does not like and the things that are not like things that the user does like. Both of these associates involve negative synapses, which add richness to the representation. For example, the system can identify strong responses to the node of interest, identify users that made those responses, and identify other nodes to which those users had opposite strong responses. Alternatively, the system can identify nodes that the user did not like, identify other people who did not like that node, identify nodes that those people did like and positively link those nodes to our user's preferences.

Sometimes the network may exhibit "runaway connectivity" where something gets more connected, which then gives it an advantage in getting further connected (e.g., more co-occurrences) which in turn tends to generate even further connections. Therefore the system may normalize connectivity by inspecting the list of existing connections to a node, determining their total value (e.g., # connections N×average weight W), and in the event that total value exceeds some threshold, divide all of the connection weights by a constant value to bring them back into range. This may be repeated for all nodes. Normalization alternatively can be accomplished by dividing based on the N*W term going TO the node, dividing based on the N*W term coming FROM the node, dividing by the total N*W term across the network. The implementation for this may involve reading the list of node weights in the database, performing the normalization on those weights, and writing the new weights back to the database.

The addition of a new synapse connecting nodes can also immediately impact other connections. Upon adding the connection to the list, the other connections to that node can be "taxed" by an amount equal to the inverse of their proportion of the new connection's strength—that is, adding a +1 synapse then taxes the other 10 synapses already on that node by $\frac{1}{10}=0.1$. When synapses become so weak that they are below a certain threshold (either through interaction taxing or through normalization), then they are removed (deleted from the list).

Connections from node to node can be constantly analyzed, updated and consolidated to take into account patterns that emerge between nodes. As a simple example, if A forms a strong link to B, and A forms a strong link to C, then a connection can be consolidated linking B and C. Such patterns can be searched for using specialized scripts that check the database entries for such patterns, and then write back consolidation changes to the affected nodes' lists.

The result of all of these processes is a rich information base that accurately links a huge variety of nodes to a user's established nodes of interest, with a significant dynamic range, and with substantial retrieval efficiency.

To retrieve the list of nodes related to a user, the system need only then "activate" the user's established nodes, and follow their connections to retrieve more nodes that if connected sufficiently strongly will also activate, and depending on the initial activation strength follow those connections to further nodes until the activation peters out with each connection hop depending on the connection strength. The connection strength is therefore the inverse of the resistance to the propagation of the activation through the network.

The total list of nodes that was effectively activated by this process (recommendation set) can then be stored in a list that is linked to the user in the database, for retrieval with a single database call whereupon the list can be cross-referenced against a set of presented results. Optionally, different sub-lists can be stored for different categories, or different presentation scenarios, caching the results for fast personalization.

The user interface may comprise i) a set of HTML files that define the look and feel of the web interface, with design elements styled using cascading style sheets (CSS), ii) a server-side set of scripts that dynamically generate those HTML files using a backend scripting language (PHP, etc) running on a web server (Apache, etc.), iii) a client-side set of scripts and interface libraries that allows rich user interaction within the browser (Javascript, j Query, etc.), and iv) a backend database that provides the data to the web application (Amazon SimpleDB, etc.).

The functionality of the user interface includes permitting the user to create an account and log in using secure credentials that are verified against an encrypted user table in our backend database. The interface also allows a user to browse objects and see whether they are recommended or not. The interface allows a user to filter those objects by city, by category, and then by a host of properties pertinent to those categories. The user can enter feedback on their recommendations by clicking on thumbs up/thumbs down or other feedback mechanisms. The interface allows a user to drag and drop recommendations onto a "being considered" area where they can be compared across different parameters using sortable headers, etc. The interface allows a user to drag an object onto their calendar in order to "action" it by going to the object at a certain time. The interface allows a user to build events, such as "My New York City Trip" where the user can create a group of restaurants, hotels, and other opportunities that have been recommended. The user can enter notes about their recommendations to remind themselves of various impressions, for example. The user can print out a copy of itineraries for their events, or email those itineraries to themselves. Their calendar is also synchronized with the global calendar on their smart phones, etc. The user can share their recommendations with others, or build events and share those with others.

The interface may be delivered via a scalable cloud architecture. Web servers run as Linux CPU nodes on Amazon's elastic cloud computing (EC2) system. Web servers receive independent IP addresses using Elastic IP or other IP address mediators. Web servers are monitored for load, and users are dynamically distributed among the servers. Excessive user load trips a threshold which leads to the creation of more EC2 nodes. When user load drops too low, that trips a threshold which leads to the delete of EC2 nodes to save cost.

A list of all recommended objects is pre-computed for the user. When tie user requests objects via the interface, the system simply checks to IDs of those objects prior to presentation to see whether the objects appear on the recommended list or not. In another iteration, the personalization is computed in real time with no pre-cached list of recommended objects. In this example, as objects were going to be presented through the interface, they are run through the personalization engine at that moment to compute if they are recommended or not.

In some examples, the server and/or client device (e.g. desktop computer or smart phone) are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for Interaction with a user, the features in some instances are implemented on a computer having a display device such as an LCD (liquid crystal display) monitor or screen for displaying information to the user and, in the case of a desktop computer, a keyboard and a pointing device such as a mouse or a trackball by which the user provides input to the computer.

In various implementations, the client device is a smart phone such as that described in U.S. Pat. No. 7,966,578, entitled "Portable Multifunction Device, Method, and Graphical User Interface for Translating Displayed Content," assigned to Apple, Inc., which is incorporated herein by reference.

The server functionality described above is optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A system for providing information to users of a neural network, the system comprising:
   the neural network stored to a data storage system, the neural network comprising
      a plurality of nodes including
         within a first subset of the plurality of nodes, nodes each corresponding to a respective entity of a plurality of entities,
         within a second subset of the plurality of nodes, nodes each corresponding to a respective individual of a plurality of individuals, and
         within a third subset of the plurality of nodes, nodes each corresponding to a respective attribute of a plurality of attributes, and
      a plurality of connections between respective selected ones of the plurality of nodes, each respective connection of the plurality of connections reflecting a strength of an interrelationship between at least two nodes of the plurality of nodes, wherein
         connections within a first portion of the plurality of connections each comprise a connection between a respective entity of the plurality of entities and a respective attribute of a set of entity attributes of the plurality of attributes characterizing the respective entity, and
         connections within a second portion of the plurality of connections each comprise a connection between a respective individual of the plurality of individuals and a respective attribute of a set of individual attributes of the plurality of attributes characterizing the respective individual; and
   at least one server configured to
      responsive to receiving a request from a remote computing device of a user, identify, using the neural network, one or more results for the user corresponding to one or more entities of the plurality of entities, wherein
         the one or more results are identified based in part on one or more entity attributes of the set of entity attributes that correspond to the request,
      transmit to the remote computing device of the user, for presentation within a user interface at the remote computing device of the user responsive to receiving the request, the one or more results,
      receive, from the remote computing device of the user, via the user providing information through the user interface, at least one feedback indication, each feedback indication of the at least one feedback indication corresponding to a respective result of the one or more results, wherein each feedback indication of the at least one feedback indication is characterized as either approving or disapproving of the respective result, and
      update the neural network responsive to the at least one feedback indication, wherein updating the neural network comprises, for each feedback indication of at least a portion of the at least one feedback indication,
         adjusting the strength of the interrelationship between one of the first subset of the plurality of nodes corresponding to the respective result and at least one of the third subset of the plurality of nodes.

2. The system of claim 1, wherein the plurality of entities comprises a plurality of medical conditions and/or medical treatments, and the plurality of individuals comprises a plurality of service providers.

3. The system of claim 1, wherein the plurality of entities comprises a plurality of items, and the plurality of attributes comprises a plurality of statuses.

4. The system of claim 1, wherein the user interface comprises a notes feature for accepting a user note corresponding to a given result of the one or more results.

5. The system of claim 1, wherein the at least one feedback indication corresponds to a given value selected from a set of values comprising a plurality of positive feedback values and a plurality of negative feedback values.

6. The system of claim 1, wherein the one or more entity attributes of the set of entity attributes corresponding to the request comprises a set of entity attributes corresponding to a particular entity of the plurality of entities identified in the request.

7. The system of claim 1, wherein the one or more results are identified based further in part on one or more individual attributes of the plurality of attributes, wherein the one or more individual attributes characterize the user.

8. The system of claim 7, wherein the plurality of individuals comprises the user.

9. The system of claim 1, wherein the request is received from the remote computing device via an application programming interface (API) for receiving a set of data from the remote computing device.

10. The system of claim 9, wherein the set of data comprises a type of request.

11. The system of claim 1, wherein:
the one or more entity attributes comprises at least two entity attributes; and
identifying the one or more results comprises assigning, to each entity attribute of the at least two entity attributes, a respective weight value.

12. The system of claim 11, wherein the respective weight value of a given attribute of the at least two entity attributes is assigned based at least in part on prior feedback received from the user.

13. The system of claim 1, wherein each connection of one portion of the plurality of connections reflects the strength of an interrelationship between three or more nodes of the plurality of nodes arranged in a content-collaborative link matrix.

14. The system of claim 1, wherein adjusting the strength of the interrelationship between one of the first subset of the plurality of nodes corresponding to the respective result and at least one of the third subset of the plurality of nodes comprises weakening the strength of the interrelationship based on the at least one feedback indication being characterized as disapproving of the respective result.

15. A method for providing information to users of a neural network, the method comprising:
providing the neural network, the neural network comprising
a plurality of nodes including
within a first subset of the plurality of nodes, nodes each corresponding to a respective entity of a plurality of entities,
within a second subset of the plurality of nodes, nodes each corresponding to a respective individual of a plurality of individuals, and
within a third subset of the plurality of nodes, nodes each corresponding to a respective attribute of a plurality of attributes, and
a plurality of connections between respective ones of the plurality of nodes, each respective connection of the plurality of connections reflecting a strength of an interrelationship between at least two nodes of the plurality of nodes, wherein
connections within a first portion of the plurality of connections each comprise a connection between a respective entity of the plurality of entities and a respective attribute of a set of entity attributes of the plurality of attributes characterizing the respective entity, and
connections within a second portion of the plurality of connections each comprise a connection between a respective individual of the plurality of individuals and a respective attribute of a set of individual attributes of the plurality of attributes characterizing the respective individual;
responsive to receiving a request from a remote computing device of a user, identifying, by processing circuitry using the neural network, one or more results for the user, the results corresponding to one or more entities of the plurality of entities, wherein
the one or more results are identified based in part on one or more entity attributes of the set of entity attributes that correspond to the request;
transmitting, by the processing circuitry and responsive to receiving the request, for presentation within a user interface at the remote computing device of the user, the one or more results;
receiving, from the remote computing device, via the user providing information through the user interface, at least one feedback indication, each feedback indication of the at least one feedback indication corresponding to a respective result of the one or more results, wherein each feedback indication of the at least one feedback indication is characterized as either approving or disapproving of the respective result; and
updating the neural network, by the processing circuitry, responsive to the at least one feedback indication, wherein updating the neural network comprises
for each feedback indication of the at least one feedback indication, adjusting the strength of the interrelationship between one of the first subset of the plurality of nodes corresponding to the respective result and at least one of the third subset of the plurality of nodes.

16. The method of claim 15, wherein the one or more results are identified based further in part on one or more individual attributes of the plurality of attributes, wherein the one or more individual attributes characterize the user.

17. The method of claim 15, wherein the request is received from the remote computing device via an application programming interface (API) for receiving a set of data from the remote computing device.

18. The method of claim 17, wherein the set of data comprises a type of request.

19. The method of claim 15, wherein:
the one or more entity attributes that correspond to the request comprises at least two entity attributes; and
identifying the one or more results comprises assigning, to each entity attribute of the at least two entity attributes, a respective weight value.

20. The method of claim 15, wherein adjusting the strength of the interrelationship between one of the first subset of the plurality of nodes corresponding to the respective result and at least one of the third subset of the plurality of nodes comprises weakening the strength of the interrelationship based on the at least one feedback indication being characterized as disapproving of the respective result.

* * * * *